(12) United States Patent
Paczkowski et al.

(10) Patent No.: US 7,169,864 B2
(45) Date of Patent: Jan. 30, 2007

(54) METALLOCENE CATALYSTS, THEIR SYNTHESIS AND THEIR USE FOR THE POLYMERIZATION OF OLEFINS

(75) Inventors: Nicola S. Paczkowski, Loveland, OH (US); Andreas Winter, Neuleiningen (DE); Franz Langhauser, Ruppertsberg (DE)

(73) Assignee: Novolen Technology Holdings, C.V., The Hague (NL)

( * ) Notice: Subject to any disclaimer, the term of this patent is extended or adjusted under 35 U.S.C. 154(b) by 123 days.

(21) Appl. No.: 11/001,272

(22) Filed: Dec. 1, 2004

(65) Prior Publication Data

US 2006/0116490 A1    Jun. 1, 2006

(51) Int. Cl.
*C08F 4/02*  (2006.01)
*C08F 4/6392*  (2006.01)

(52) U.S. Cl. ............. 526/129; 526/165; 526/963; 502/120; 502/110; 502/152

(58) Field of Classification Search ........... 526/165, 526/129, 943; 502/120, 104, 152, 110
See application file for complete search history.

(56) References Cited

U.S. PATENT DOCUMENTS

| | | |
|---|---|---|
| 4,530,914 A | 7/1985 | Ewen et al. |
| 4,542,199 A | 9/1985 | Kaminsky et al. |
| 4,752,597 A | 6/1988 | Turner |
| 4,808,561 A | 2/1989 | Welborn, Jr. |
| 4,871,705 A | 10/1989 | Hoel |
| 4,931,417 A | 6/1990 | Miya et al. |
| 4,933,403 A | 6/1990 | Kaminsky et al. |
| 4,937,299 A | 6/1990 | Ewen et al. |
| 5,017,714 A | 5/1991 | Welborn, Jr. |
| 5,026,798 A | 6/1991 | Canich |
| 5,057,475 A | 10/1991 | Canich et al. |
| 5,120,867 A | 6/1992 | Welborn, Jr. |
| 5,132,381 A | 7/1992 | Winter et al. |
| 5,145,819 A | 9/1992 | Winter et al. |
| 5,198,401 A | 3/1993 | Turner et al. |
| 5,239,022 A | 8/1993 | Winter et al. |
| 5,243,001 A | 9/1993 | Winter et al. |
| 5,276,208 A | 1/1994 | Winter et al. |
| 5,278,119 A | 1/1994 | Turner et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,328,969 A | 7/1994 | Winter et al. |
| 5,329,033 A | 7/1994 | Spaleck et al. |
| 5,350,723 A | 9/1994 | Neithamer et al. |
| 5,359,015 A | 10/1994 | Jejelowo |
| 5,374,752 A | 12/1994 | Winter et al. |
| 5,391,790 A | 2/1995 | Rohrmann et al. |
| 5,416,178 A | 5/1995 | Winter et al. |
| 5,436,305 A | 7/1995 | Alt et al. |
| 5,455,366 A | 10/1995 | Rohrmann et al. |
| 5,510,502 A | 4/1996 | Sugano et al. |
| 5,532,396 A | 7/1996 | Winter et al. |
| 5,543,373 A | 8/1996 | Winter et al. |
| 5,554,704 A | 9/1996 | Burkhardt et al. |
| 5,576,260 A | 11/1996 | Winter et al. |
| 5,612,428 A | 3/1997 | Winter et al. |
| 5,616,663 A | 4/1997 | Imuta et al. |
| 5,616,747 A | 4/1997 | Rohrmann et al. |
| 5,629,254 A | 5/1997 | Fukuoka et al. |
| 5,635,437 A | 6/1997 | Burkhardt et al. |
| 5,661,096 A | 8/1997 | Winter et al. |
| 5,672,668 A | 9/1997 | Winter et al. |
| 5,679,812 A | 10/1997 | Winter et al. |
| 5,723,640 A | 3/1998 | Bukuoka et al. |
| 5,739,366 A | 4/1998 | Imuta et al. |
| 5,741,868 A | 4/1998 | Winter et al. |
| 5,770,753 A | 6/1998 | Küber et al. |
| 5,786,432 A | 7/1998 | Küber et al. |
| 5,830,821 A | 11/1998 | Rohrmann et al. |
| 5,840,644 A | 11/1998 | Küber et al. |
| 5,840,948 A | 11/1998 | Rohrmann et al. |
| 5,852,142 A | 12/1998 | Rohrmann et al. |
| 5,929,264 A | 7/1999 | Rohrmann et al. |
| 5,932,669 A | 8/1999 | Rohrmann et al. |
| 6,017,841 A | 1/2000 | Winter et al. |
| 6,051,522 A | 4/2000 | Rohrmann et al. |
| 6,051,727 A | 4/2000 | Küber et al. |
| 6,057,408 A | 5/2000 | Winter et al. |
| 6,087,291 A | 7/2000 | Speca et al. |
| 6,100,214 A | 8/2000 | Walzer, Jr. et al. |
| 6,114,479 A | 9/2000 | Speca et al. |
| 6,117,955 A | 9/2000 | Agapiou et al. |

(Continued)

FOREIGN PATENT DOCUMENTS

EP    0 302 424    7/1991

(Continued)

*Primary Examiner*—Caixia Lu
(74) *Attorney, Agent, or Firm*—Dilworth & Barrese, LLP

(57) ABSTRACT

A process for the preparation of a catalyst system includes the steps of combining a support material with a first composition which includes at least one aluminoxane in a first solvent to provide an aluminoxane loaded support; and, contacting the aluminoxane loaded support with a second composition which includes at least one metallocene compound, a second solvent, and a cocatalyst, wherein the cocatalyst includes a second portion of the at least one aluminoxane alone or in combination with an ionic compound and/or a Lewis acid.

78 Claims, No Drawings

U.S. PATENT DOCUMENTS

| | | | |
|---|---|---|---|
| 6,124,229 A | 9/2000 | Becker et al. | |
| 6,124,230 A | 9/2000 | Speca et al. | |
| 6,140,432 A | 10/2000 | Agapiou et al. | |
| 6,194,341 B1 | 2/2001 | Canich et al. | |
| 6,211,109 B1* | 4/2001 | Shamshoum et al. | 502/152 |
| 6,218,558 B1 | 4/2001 | Kato et al. | |
| 6,228,795 B1 | 5/2001 | Vizzini | |
| 6,242,544 B1 | 6/2001 | Küber et al. | |
| 6,245,706 B1 | 6/2001 | Hlatky | |
| 6,252,097 B1 | 6/2001 | Sugano et al. | |
| 6,255,506 B1 | 7/2001 | Küber et al. | |
| 6,255,515 B1 | 7/2001 | Kato et al. | |
| 6,376,407 B1 | 4/2002 | Burkhardt et al. | |
| 6,376,408 B1 | 4/2002 | Burkhardt et al. | |
| 6,376,409 B1 | 4/2002 | Burkhardt et al. | |
| 6,376,410 B1 | 4/2002 | Burkhardt et al. | |
| 6,376,411 B1 | 4/2002 | Burkhardt et al. | |
| 6,376,412 B1 | 4/2002 | Burkhardt et al. | |
| 6,376,413 B1 | 4/2002 | Kuchta et al. | |
| 6,376,627 B1 | 4/2002 | Burkhardt et al. | |
| 6,380,120 B1 | 4/2002 | Burkhardt et al. | |
| 6,380,121 B1 | 4/2002 | Kuchta et al. | |
| 6,380,122 B1 | 4/2002 | Kuchta et al. | |
| 6,380,123 B1 | 4/2002 | Kuchta et al. | |
| 6,380,124 B1 | 4/2002 | Burkhardt et al. | |
| 6,380,330 B1 | 4/2002 | Burkhardt et al. | |
| 6,380,331 B1 | 4/2002 | Kuchta et al. | |
| 6,380,334 B1 | 4/2002 | Kuchta et al. | |
| 6,399,723 B1 | 6/2002 | Burkhardt et al. | |
| 6,444,606 B1 | 9/2002 | Bingel et al. | |
| 6,469,114 B1 | 10/2002 | Schottek et al. | |
| 6,583,242 B2* | 6/2003 | Wang et al. | 526/161 |
| 2001/0021755 A1 | 9/2001 | Kuber et al. | |
| 2003/0149199 A1 | 8/2003 | Schottek et al. | |
| 2003/0166457 A1 | 9/2003 | Peterson et al. | |
| 2003/0176275 A1 | 9/2003 | Praaije et al. | |
| 2003/0229186 A1 | 12/2003 | Mawson et al. | |
| 2004/0204311 A1 | 10/2004 | Guo et al. | |

FOREIGN PATENT DOCUMENTS

| | | |
|---|---|---|
| EP | 0 284 708 | 1/1996 |
| EP | 0 320 762 | 3/1996 |
| EP | 0 416 815 | 8/1997 |
| EP | 0 576 970 | 1/1998 |
| EP | 0 611 773 | 4/1998 |
| EP | 1 055 673 A1 | 11/2000 |
| EP | 0 669 340 | 11/2001 |
| EP | 1 153 944 A1 | 11/2001 |
| EP | 0 129 368 | 4/2002 |
| EP | 0 537 686 | 1/2005 |
| WO | WO 94/14856 | 7/1994 |
| WO | WO 94/28034 | 12/1994 |
| WO | WO 97/32906 | 9/1997 |
| WO | WO 98/01481 | 1/1998 |
| WO | WO 98/22486 | 5/1998 |
| WO | WO 00/05277 | 2/2000 |
| WO | WO 00/12565 | 3/2000 |
| WO | WO 2001 46271 A1 | 6/2001 |
| WO | WO 01/48034 | 7/2001 |
| WO | WO 03/045964 | 6/2003 |
| WO | WO 2003 089485 A1 | 10/2003 |
| WO | WO 03/106470 | 12/2003 |
| WO | WO 2004/029102 A1 | 4/2004 |

* cited by examiner

METALLOCENE CATALYSTS, THEIR SYNTHESIS AND THEIR USE FOR THE POLYMERIZATION OF OLEFINS

BACKGROUND

1. Field of the Invention

The present invention relates to highly active supported catalyst systems comprising metallocene(s) and cocatalyst(s) such as alumoxane(s), which can advantageously be used in olefin polymerization and to a process for the economical preparation of such catalyst systems, to a process using such catalyst systems for the polymerization and copolymerization of olefins and to polymers which are prepared using such catalyst systems.

2. Background of the Art

Metallocenes may be used as catalyst components for the polymerization and copolymerization of olefins, possibly in combination with one or more cocatalysts. In particular, halogen-containing metallocenes are used as catalyst precursors, which can be converted, for example, by an aluminoxane, to polymerization-active cationic metallocene complexes (EP 0 129 368, EP 0 284 708 or EP 0 302 424).

The synthesis of such metallocenes is well known (U.S. Pat. Nos. 4,752,597; 5,017,714; 5,391,790; 5,616,747 or EP Patent Nos. 0 320 762; 0 416 815; 0 537 686 and 0 669 340). They may be produced, for example, by reacting cyclopentadienyl metal compounds with halides of transition metals, such as titanium, zirconium, and hafnium.

It is also well known that basic properties of the metallocenes, such as polymerization activity, stereoselectivity, regioselectivity, and maximum achievable polymer molecular weight can be systematically controlled by specific substitution patterns of the ligand sphere. However, to use metallocenes for the stereoselective and regioselective polymerization of olefins, the preparation of the isomerically pure racemic form is absolutely necessary, since the corresponding meso form produces undesired atactic polymer, like atactic polypropylene. The isomerically pure racemic form is understood to mean a rac:meso ratio of at least 5, and preferably 10.

Such stereoselective and/or regioselective metallocenes for the polymerization of olefins to polyolefins especially for the polymerization of propylene or the copolymerization of propylene with other olefins and which are useful and preferred as metallocenes for the catalyst systems of the present invention, are well known in the literature. As an example, such metallocenes are disclosed in U.S. Pat. Nos. 4,530,914; 4,542,199; 4,769,910; 4,808,561; 4,871,705; 4,931,417; 4,933,403; 4,937,299; 5,017,714; 5,026,798; 5,057,475; 5,120,867; 5,132,381; 5,145,819; 5,155,180; 5,198,401; 5,239,022; 5,243,001; 5,276,208; 5,278,119; 5,296,434; 5,304,614; 5,324,800; 5,328,969; 5,329,033; 5,350,723; 5,374,752; 5,391,790; 5,416,178; 5,436,305; 5,455,366; 5,510,502; 5,532,396; 5,543,373; 5,554,704; 5,576,260; 5,612,428; 5,616,663; 5,629,254; 5,635,437; 5,661,096; 5,672,668; 5,679,812; 5,723,640; 5,739,366; 5,741,868; 5,770,753; 5,786,432; 5,830,821; 5,840,644; 5,840,948; 5,852,142; 5,929,264; 5,932,669; 6,017,841; 6,051,522; 6,051,727; 6,057,408; 6,087,291; 6,100,214; 6,114,479; 6,117,955; 6,124,230; 6,140,432; 6,194,341; 6,218,558; 6,228,795; 6,242,544; 6,245,706; 6,252,097; 6,255,506; 6,255,515; 6,376,407; 6,376,408; 6,376,409; 6,376,410; 6,376,411; 6,376,412; 6,376,413; 6,376,627; 6,380,120; 6,380,121; 6,380,122; 6,380,123; 6,380,124; 6,380,330; 6,380,331; 6,380,334; 6,399,723; 6,444,606; 6,469,114 and US Application Nos. 2001021755; 20030149199 and EP 576 970; EP 611 773, and WO 97/32906; WO 98/014585; WO 98/22486; WO 00/12565; WO 01/48034; WO 03/045964; WO 03/106470.

Processes for preparing polyolefins using soluble, homogeneous catalyst systems comprising a transition metal component of the metallocene type and a cocatalyst component of the type of an aluminoxane are well known. In polymerizations using such soluble, homogeneous catalyst systems, heavy deposits are formed on reactor walls and the stirrer if the polymer is obtained as a solid. These deposits are formed by agglomeration of the polymer particles whenever metallocene and/or cocatalyst are present in dissolved form in the suspension. The deposits in the reactor systems quickly reach considerable thickness and have a high strength. They prevent heat exchange to the cooling medium and therefore have to be removed regularly. Such homogeneous catalyst systems cannot be used industrially in liquid monomer or in the gas phase.

To avoid deposit formation in the reactor, supported catalyst systems in which the metallocene and/or the aluminum compound serving as cocatalyst is/are fixed on an inorganic support material have been proposed. As an example, in EP-A-0 576 970 or WO 01/48034 metallocenes and corresponding supported catalyst systems are disclosed. Such supported catalyst systems give polymers, in particular polypropylenes, having melting points of up to about 156° C.

A variety of different processes for preparing supported catalysts are known. As described in WO 94/28034 supported metallocene catalysts can, for example, be obtained by mixing a metallocene and aluminoxane containing solution with the support material and removing the solvent in vacuum. The solution volume of the impregnation solution is thereby greater than the pore volume of the support material.

In another process, the metallocene containing solution is mixed with the support material whereby the solution volume of the impregnation is equal or smaller than the pore volume of the support material (WO 94/14856). The solid catalyst can be isolated as a dry powder by removing the solvent under vacuum.

Other supported metallocene catalyst systems are disclosed in WO 98/01481. Here a metallocene is dissolved in a solvent and precipitated by addition of another solvent in which the metallocene compound is only slightly soluble in the presence of the support material. Thereby, the catalyst is immobilized on the surface and within the pores of the support.

Yet another supported metallocene catalyst can be obtained by impregnation of a support material with an impregnation solution comprising the metallocene component, wherein the impregnation solution flows through the support material (WO 00/05277).

In general, the main deficiency of such supported catalyst systems, developed up to now, is their low productivity under industrially relevant polymerization temperatures of from 50° C. to 100° C. As a consequence, the industrial usefulness of these catalysts is questionable as long as the commercial competitiveness against the established Ziegler-Natta titanium catalysts is not reached. As the necessary catalyst components like metallocenes and cocatalysts are in general expensive chemicals, improvements of the competitiveness by reducing the catalyst costs are limited and the only other option is to increase the catalyst productivity.

The object of the present invention is to address this main disadvantage of the state of the art catalyst systems and to provide supported catalyst systems with improved polymerization performance under industrially relevant polymerization conditions at temperatures of from 50° C. to 100° C.

Furthermore, it is an object of the present invention to provide an economical process for preparing supported metallocene catalysts, which is universally applicable e.g. with regard to different metallocene components and which results in catalyst systems with improved catalyst productivities. The resulting supported catalysts should be homogeneously loaded and should lead to good polymer particle morphologies.

Another object of the present invention is to provide supported metallocene catalysts obtained by the above described process and to provide an environmentally friendly and economical process for preparing polyolefins under industrially relevant polymerization conditions using the catalyst systems of this invention.

SUMMARY

A process is provided herein for the preparation of a catalyst system. The process comprises the steps of combining a support material with a first composition which includes at least one aluminoxane in a first solvent to provide an aluminoxane loaded support; and, contacting the aluminoxane loaded support with a second composition which includes at least one metallocene compound, a second solvent, and a cocatalyst, wherein the cocatalyst includes a second portion of at least one aluminoxane alone or in combination with an ionic compound and/or a Lewis acid.

DETAILED DESCRIPTION OF THE PREFERRED EMBODIMENT(S)

The objects of the invention are achieved by a certain process for preparing a supported catalyst system comprising at least one metallocene, at least one cocatalyst, at least one support and, if desired, at least one metal compound and further one additive component. According to the present invention, the catalyst system is prepared by combining at least one metallocene, at least one cocatalyst, at least one support and if desired at least one metal compound and one further additive component. More specifically, the catalyst system of the present invention is prepared by combining at least one support material with a first portion of an aluminumoxane or a mixture of aluminoxanes in a suitable solvent at elevated temperatures. In a subsequent impregnation step the aluminoxane loaded support material is brought into contact with the metallocene component and a second portion of the aluminoxane or a mixture of aluminoxanes or an ionic compound and/or a Lewis acid.

As metallocene component of the catalyst system of the present invention, use is made of at least one compound of the formula 1 below. The term metallocene component is thereby understood to be an organic transition metal compound as depicted in formula 1 that bears at least one substituted or unsubstituted cyclopentadienyl group.

where
n is 0 or 1,
m is 1, 2 or 3
q is 1, 2 or 3 and
the sum of m and q equals the oxidation state of $M^1$
$L^1$ are identical or different and are each a substituted or unsubstituted mononuclear or polynuclear hydrocarbon radical or (a) hetero atom(s) containing hydrocarbon radical (s), for example substituted or unsubstituted cyclopentadienyl, indenyl, tetrahydroindenyl, azurenyl, fluorenyl, azapentalenyl, thiapentalenyl or oxapentalenyl, that coordinates to $M^1$, $R^1$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and two or three $R^1$ can form one or more ring system(s), $M^1$ is a metal of group IVb of the Periodic Table of the Elements, $R^9$ is a bridging group linking two ligands $L^1$ wherein $R^9$ is selected from:

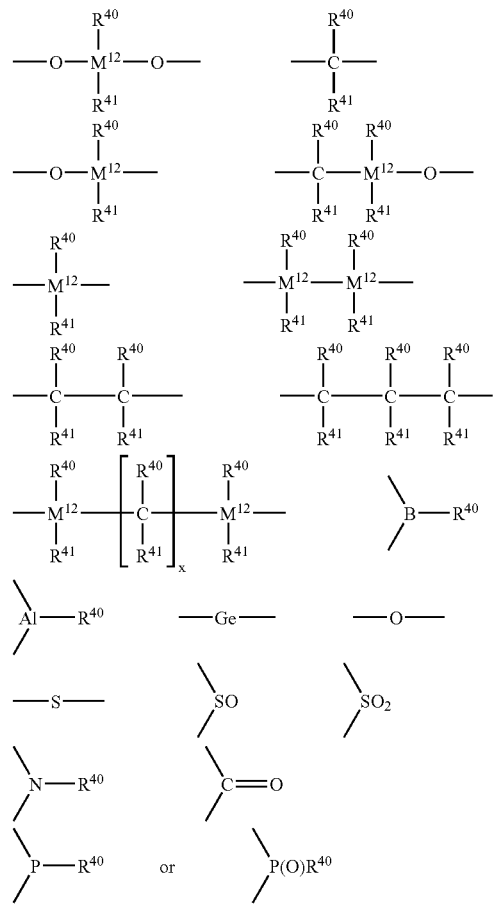

where
$R^{40}$ and $R^{41}$, even when bearing the same index, can be identical or different and are each a hydrogen atom, a $C_1$–$C_{40}$ group such as an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms. $R^{40}$ and $R^{41}$ together with the atoms connecting them can form one or more cyclic systems or $R^{40}$ and/or $R^{41}$ can contain additional hetero atoms (i.e., non-carbon atoms) like Si, B, Al, O, S, N or P or halogen atoms like Cl or Br, x is an integer from 1 to 18, $M^{12}$ is silicon, germanium or tin, and $R^9$ may also link two units of the formula 1 to one another, or $R^9$ forms a $R^9$-$Z^1$ group, with $R^9$ being linked to one $L^1$ group and $Z^1$ being linked to $M^1$, where $Z^1$ comprises nitrogen, phosphorus, oxygen or sulfur such as —O—, —S—, —$NR^{42}$ or $PR^{42}$—, where $R^{42}$ is a hydrogen atom, a $C_1$–$C_{40}$ group such as an alkyl group having from 1 to about 30 carbon atoms, a cycloalkyl group of from 3 to 10 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms.

As metallocene component of the catalyst system of the present invention, preference is given to use at least one compound of the formula 1a below, $$R^9L^1L^2M^1R^1R^2 \quad \text{(Formula 1a)}$$

where $L^1$ and $L^2$ are identical or different and are each a substituted mononuclear or polynuclear hydrocarbon radical or (a) hetero atom(s) containing hydrocarbon radical(s), for example substituted cyclopentadienyl, indenyl, tetrahydroindenyl, azurenyl, fluorenyl, azapentalenyl, thiapentalenyl or oxapentalenyl, which can form a sandwich structure with the central atom $M^1$, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and $R^1$ and $R^2$ can form one or more ring system(s), $M^1$ is a metal of group IVb of the Periodic Table of the Elements, $R^9$ is a bridge between the ligands $L^1$ and $L^2$, wherein $R^9$ is selected from:

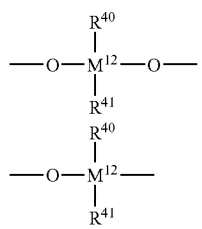
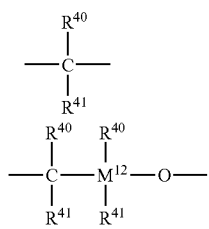
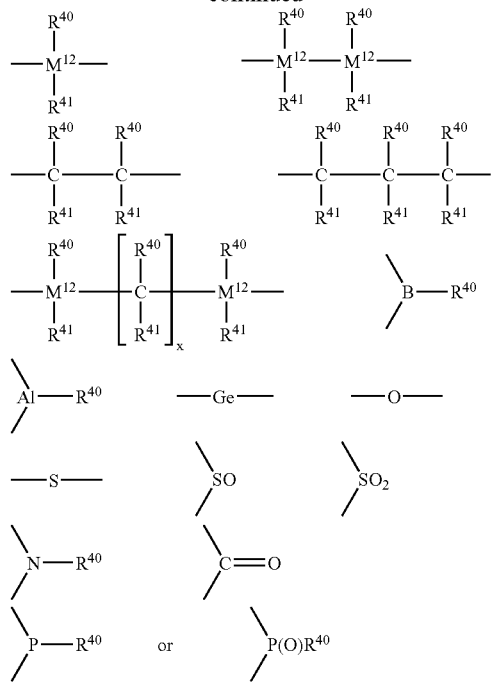

where $R^{40}$ and $R^{41}$, even when bearing the same index, can be identical or different and are each a hydrogen atom, a $C_1$–$C_{40}$ group such as an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms. $R^{40}$ and $R^{41}$ together with the atoms connecting them can form one or more cyclic systems or $R^{40}$ and/or $R^{41}$ can contain additional hetero atoms (i.e., non-carbon atoms) like Si, B, Al, O, S, N or P or halogen atoms like Cl or Br, x is an integer from 1 to 18, $M^{12}$ is silicon, germanium or tin, and $R^9$ may also link two units of the formula 1a to one another.

In formula 1a it is preferred that $M^1$ is zirconium or hafnium,

L1 and L2 are identical or different and are each a substituted cyclopentadienyl, indenyl, tetrahydroindenyl, azurenyl, fluorenyl, azapentalenyl, thiapentalenyl or oxapentalenyl, which can form a sandwich structure with the central atom $M^1$, $R^9$ is $R^{40}R^{41}Si$=, $R^{40}R^{41}Ge$=, $R^{40}R^{41}C$= or —($R^{40}R^{41}C$—$CR^{40}R^{41}$)—, where $R^{40}$ and $R^{41}$ are identical or different and are each a hydrogen atom, a hydrocarbon group of from 1 to about 30 carbon atoms, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl or an arylsilyl group.

In formula 1a it is very particularly preferred that $M^1$ is zirconium and $L^1$ and $L^2$ are identical or different and are each a substituted indenyl, azurenyl, fluorenyl, azapentalenyl, thiapentalenyl or oxapentalenyl, which can form a sandwich structure with the central atom $M^1$, and the bridging unit $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclo-pentyl, cyclo-pentadienyl, cyclohexyl, phenyl, benzyl, trimethylsilyl or 3,3,3-trifluoropropyl.

More preferred, as the metallocene component of the catalyst system of the present invention, use is made of at least one compound of the formula 1b below

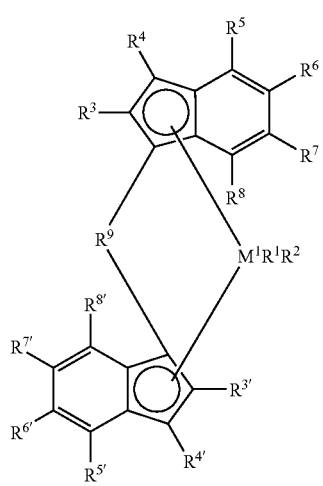

(Formula 1b)

where the substituents and indices have the following meanings:

$M^1$ is a metal of group IVb of the Periodic Table of the Elements, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms and $R^1$ and $R^2$ may form one or more ring system(s), $R^3$, $R^4$, $R^5$, $R^6$, $R^7$, $R^8$ and also $R^{3'}$, $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group, with the proviso that $R^3$ and $R^{3'}$ are not hydrogen. The groups may contain one or more hetero atoms like Si, B, Al, O, S, N or P, and/or may contain halogen atoms like F, Cl or Br, and/or two adjacent radicals $R^5$, $R^6$ or $R^{5'}$, $R^{6'}$, or $R^6$, $R^7$ or $R^{6'}$, $R^{7'}$, or $R^7$, $R^8$ or $R^{7'}$, $R^{8'}$ in each case may form a hydrocarbon ring system and the bridging unit $R^9$ has the meaning set forth above with respect to formula 1a.

The 4,5,6,7-tetrahydroindenyl and the (a) heteroatom(s) containing indenyl analogues corresponding to the compounds 1b are likewise of importance.

In formula 1b it is preferred that $M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, or $R^1$ and $R^2$ together may form one or more ring system(s), $R^3$ and $R^{3'}$, are identical or different and are each a linear, cyclic or branched hydrocarbon group which may be halogenated, for example an alkyl group of from 1 to 10 carbon atoms or an alkenyl group of from 2 to about 10 carbon atoms, $R^4$, $R^5$ $R^6$, $R^7$, $R^8$ and also $R^{4'}$, $R^{5'}$, $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 10 carbon atoms, which may contain one or more hetero atoms like Si, B, Al, O, S, N or P, and/or may contain halogen atoms like F, Cl or Br, and/or the two adjacent radicals $R^5$, $R^6$ and $R^{5'}$, $R^{6'}$ may form a hydrocarbon ring system, $R^9$ is $R^{40}R^{41}Si=$, $R^{40}R^{41}Ge=$, $R^{40}R^{41}C=$ or $—(R^{40}R^{41}C—CR^{40}R^{41})—$, where $R^{40}$ and $R^{41}$ are identical or different and are each a hydrogen atom, a $C_1$–$C_{30}$-hydrocarbon group, in particular an alkyl group of from 1 to 10 carbon atoms, an aryl group of from 6 to about 40 carbon atoms, an arylalkyl group of from 7 to about 14 carbon atoms or an alkylaryl group of from 7 to about 14 carbon atoms or a substituted or unsubstituted alkylsilyl group, an alkyl(aryl)silyl group or an arylsilyl group.

The 4,5,6,7-tetrahydroindenyl and the (a) heteroatom(s) containing indenyl analogues corresponding to the compounds 1b are likewise of importance.

In formula 1b it is very particularly preferred that $M^1$ is zirconium, $R^1$ and $R^2$ are identical or different and are methyl, chlorine or phenolate, $R^3$ and $R^{3'}$, are identical or different and are each a linear, cyclic or branched hydrocarbon group which may be halogenated, for example an alkyl group of from 1 to about 10 carbon atoms or an alkenyl group of from 2 to about 10 carbon atoms, $R^4$ and also $R^{4'}$ are hydrogen, $R^5$, $R^6$, $R^7$, $R^8$ and also $R^{5'}$, $R^{6'}$, $R^{7'}$, $R^{8'}$ are identical or different and are each a hydrogen atom or a linear, cyclic or branched alkyl group of from 1 to about 10 carbon atoms, or an aryl group of from 6 to about 10 carbon atoms and/or the two adjacent radicals $R^5$, $R^6$ and $R^{5'}$, $R^{6'}$ respectively together may form a ring system, $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, benzyl, trimethylsilyl or 3,3,3-trifluoropropyl.

Most preferred for the production of polypropylenes with high melting points for applications, where a high stiffness is required, as the metallocene component of the catalyst system of the present invention, use is made of at least one compound of the formula 1c below

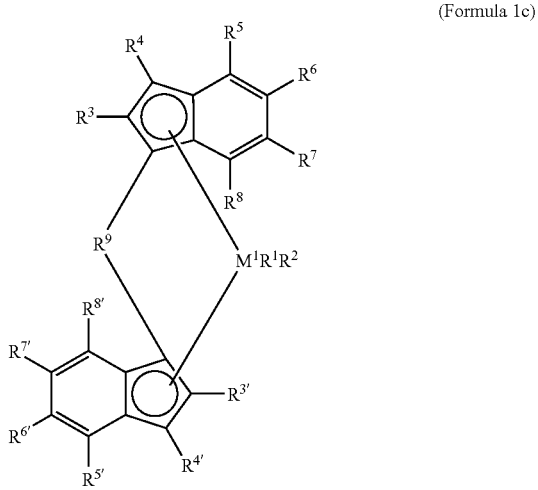

(Formula 1c)

where the substituents and indices have the following meanings:

$M^1$ is a metal of group IVb of the Periodic Table of the Elements, $R^1$ and $R^2$ are identical or different and are each a hydrogen atom, an alkyl group of from 1 to 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and $R^1$ and $R^2$ may form one or more ring system(s), $R^3$, $R^4$, $R^5$, $R^6$, $R^7$, $R^8$ and also $R^{3'}$, $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to 10 carbon atoms, an alkenyl group of from 2 to about 10 carbon atoms, an arenyl group of from 6 to about 20 carbon atoms, an arylalkyl group of from 7 to about 40 carbon atoms, an alkylaryl group of from 7 to about 40 carbon atoms, or an arylakenyl group of from 8 to about 40 carbon atoms, a substituted or unsubstituted alkylsilyl or arylsilyl group, with the proviso that $R^3$ and $R^{3'}$ are not hydrogen and that $R^5$ and $R^{5'}$ are identical or different and are each a substituted or unsubstituted aryl group of from 6 to about 40 carbon atoms. The hydrocarbon groups may contain one or more hetero atoms like Si, B, Al, O, S, N or P, and/or may contain halogen atoms like F, Cl or Br, and the bridging unit $R^9$ has the meaning set forth above with respect to formula 1a.

The 4,5,6,7-tetrahydroindenyl and the (a) heteroatom(s) containing indenyl analogues corresponding to the compounds 1c are likewise of importance.

In formula 1c it is preferred that $M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms, or a halogen atom, and $R^1$ and $R^2$ may form one or more ring system(s), $R^3$ and $R^{3'}$, are identical or different and are each a linear, cyclic or branched group which may be halogenated, for example an alkyl group of from 1 to about 10 carbon atoms or an alkenyl group of from 2 to about 10 carbon atoms, $R^4$, $R^6$, $R^7$, $R^8$ and also $R^{4'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are each a substituted or unsubstituted aryl group of from 6 to about 40 carbon atoms, $R^9$ is $R^{40}R^{41}Si=$, $R^{40}R^{41}Ge=$, $R\ R^{41}C=$ or $—(R^{40}R^{41}C—CR^{40}R^{41})—$, where $R^{40}$ and $R^{41}$ are identical or different and are each a hydrogen atom, a $C_1$–$C_{30}$-hydrocarbon group, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl or an arylsilyl group.

The 4,5,6,7-tetrahydroindenyl and the (a) heteroatom(s) containing indenyl analogues corresponding to the compounds 1c are likewise of importance.

In formula 1c it is very particularly preferred that $M^1$ is zirconium, $R^1$ and $R^2$ are identical and are methyl, chlorine, or phenolate, $R^3$ and $R^{3'}$ are identical or different and are each a linear, cyclic or branched methyl, ethyl, propyl, butyl, pentyl or hexyl, $R^4$ and also $R^{4'}$ are hydrogen, $R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are phenyl, naphthyl, para-($C_1$–$C_{10}$-alkyl)phenyl, para-($C_1$–$C_{10}$-fluoroalkyl)phenyl, meta-($C_1$–$C_{10}$-alkyl)phenyl, meta-($C_1$–$C_{10}$-alkyl)phenyl, meta, metá-($C_1$–$C_{10}$-alkyl)$_2$phenyl or meta, metá-($C_1$–$C_{10}$-fluoroalkyl)$_2$phenyl, $R^9$ is $R^{40}R^{41}Si=$ or $R^{40}R^{40}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, benzyl, trimethylsilyl or 3,3,3-trifluoropropyl.

Most preferred for the production of high molecular weight random copolymers or of copolymer rubber, for the production of impact copolymers comprising high molecular weight copolymers or for the production of polypropylenes with melting points higher than 155° C. for applications, where a high stiffness is required, as the metallocene component of the catalyst system of the present invention use is made of at least one compound of the formula 1d below,

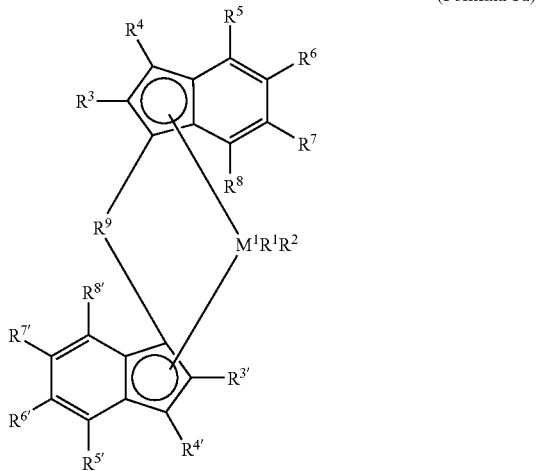

(Formula 1d)

where the substituents and indices have the following meanings:

$M^1$ is a metal of group IVb of the Periodic Table of the Elements, $R^1$ and $R^2$ are identical or different and are each a hydrogen atom, an alkyl group of from 1 to about 10 carbon atoms, an alkoxy group of from 1 to about 10 carbon atoms, an aryl group of from 6 to 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms, or an aryl group of from 6 to about 14 carbon atoms, or $R^1$ and $R^2$ together may form one or more ring system(s), $R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, a substituted or unsubstituted alkylsilyl or arylsilyl group, with the proviso that $R^5$ and $R^{5'}$ are identical or different and are each a substituted or unsubstituted aryl group of from 6 to about 40 carbon atoms. The hydrocarbon groups may contain one or more hetero atoms like Si, B, Al, O, S, N or P, and/or may contain halogen atoms like F, Cl or Br, $R^3$ is a hydrocarbon group, not cyclic or branched in the α-position, for example an alkyl group of from 1 to 20 carbon atoms, an aryl substituted alkyl group of from 7 to about 40 carbon atoms, or an aryl substituted alkenyl group of from 8 to about 40 carbon atoms. The hydrocarbon groups may contain one or more hetero atoms like Si, B, Al, O, S, N or P, and/or may contain halogen atoms like F, Cl or Br, $R^{3'}$ is a in α-position or in β-position cyclic or branched hydrocarbon group, for example an alkyl group of from 3 to about 20 carbon atoms, an alkenyl group of from 3 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms. The hydrocarbon groups may contain one or more hetero atoms like Si, B, Al, O, S, N or P, and/or may contain halogen atoms like F, Cl or Br, and the bridging unit $R^9$ has the meaning mentioned above with respect to formula 1a.

In formula 1d it is preferred that $M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, and $R^1$ and $R^2$ may form one or more ring system(s), $R^3$ is a linear alkyl group of from 1 to about 10 carbon atoms or an alkenyl group of from 2 to 10 carbon atoms, which can be halogenated, $R^{3'}$ is a in α-position or in β-position cyclic or branched alkyl group of from 3 to about 20 carbon atoms, an alkenyl group of from 3 to about 20 carbon atoms, an alkylaryl group of from 7 to about 20 carbon atoms, or a trimethylsilyl group, $R^4$, $R^6$, $R^7$, $R^8$ and also $R^{4'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are each a substituted or unsubstituted aryl group of from 6 to about 40 carbon atoms, like phenyl, naphthyl, para-($C_1$–$C_{10}$-alkyl)phenyl, meta-($C_1$–$C_{10}$-alkyl)phenyl, meta, metá-($C_1$–$C_{10}$-alkyl)$_2$phenyl, $R^9$ is $R^{40}R^{41}Si$=, $R^{40}R^{41}Ge$=, $R^{40}$ $R^{41}C$= or —($R^{40}R^{41}C$—$CR^{40}R^{41}$)—, where $R^{40}$ and $R^{41}$ are identical or different and are each a hydrogen atom, a $C_1$–$C_{30}$ group, in particular an alkyl group of from 1 to about 10 carbon atoms, an aryl group of from 6 to about 40 carbon atoms, an arylalkyl group of from 7 to 14 carbon atoms, an alkylaryl group of from 7 to 14 carbon atoms or a substituted or unsubstituted alkylsilyl group, an alkyl(aryl)silyl or an arylsilyl group.

The 4,5,6,7-tetrahydroindenyl and the (a) heteroatom(s) containing indenyl analogues corresponding to the compounds 1d are likewise of importance.

In formula 1d, it is very particularly preferred that $M^1$ is zirconium, $R^1$ and $R^2$ are identical and are methyl, chlorine, or phenolate, $R^3$ is methyl, ethyl, n-propyl, n-butyl, n-pentyl or n-hexyl, $R^{3'}$ is iso-propyl, iso-butyl, n-butyl, sec-butyl, cyclobutyl, 1-methyl-butyl, 1-ethyl-butyl, 1-methyl-pentyl, cyclopentyl, cyclohexyl, cyclopent-2-enyl, cyclopent-3-enyl, cyclohex-2-enyl, cyclohex-3-enyl, para-methyl-cyclohexyl or trimethylsilyl, $R^4$ and also $R^{4'}$ are hydrogen, and $R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are phenyl, p-isopropyl-phenyl, p-tert.-butyl-phenyl, p-s-butyl-phenyl, p-cyclohexyl, p-trimethylsilyl-phenyl, p-adamantyl-phenyl, p-(trisfluor)trimethyl-phenyl or m,m'-dimethyl-phenyl, $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclo-pentyl, cyclo-pentadienyl, cyclohexyl, phenyl, benzyl, trimethylsilyl or 3,3,3-trifluoropropyl.

Non-limiting examples for the particularly preferred metallocene compounds of the present invention are the following compounds of formulas 1a–1d:

A-(2-isopropyl-4-(p-isopropyl-phenyl)indenyl)(2-methyl-4-(p-isopropyl-phenyl)-indenyl)zirconiumdichloride,
A-(2-isopropyl-4-(p-tert. butyl-phenyl)indenyl)(2-methyl-4-(p-tert. butyl-phenyl)-indenyl)zirconiumdichloride,
A-(2-isopropyl-4-(p-tert. butyl-phenyl)indenyl)(2,7-dimethyl-4-(p-tert. butyl-phenyl)indenyl)zirconiumdichloride,
A-(2-isopropyl-4-(p-tert. butyl-phenyl)indenyl)(2,5,6,7-tetramethyl-4-(p-tert. butyl-phenyl)indenyl)zirconiumdichloride,
A-(2-isopropyl-6-methyl-4-(p-tert. butyl-phenyl)indenyl)(2,6-dimethyl-4-(p-tert. butyl-phenyl)indenyl)zirconiumdichloride,
A-(2-isopropyl-4-(p-sec. butyl-phenyl)indenyl)(2-methyl-4-(p-sec. butyl-phenyl)-indenyl)zirconiumdichloride,
A-(2-isopropyl-4-(p-cyclohexyl-phenyl)indenyl)(2-methyl-4-(p-cyclohexyl-phenyl)-indenyl)zirconiumdichloride,
A-(2-isopropyl-4-(p-trimethylsilyl-phenyl)indenyl)(2-methyl-4-(p-trimethylsilyl-phenyl)indenyl)zirconiumdichloride,
A-(2-isopropyl-4-(p-adamantyl-phenyl)indenyl)(2-methyl-4-(p-adamantyl-phenyl)-indenyl)zirconiumdichloride,
A-(2-isopropyl-4-(p-tris(trifluoromethyl)methyl-phenyl)indenyl)(2-methyl-4-(p-tris(trifluoromethyl)methyl-phenyl)indenyl)zirconiumdichloride,
A-(2-isopropyl-4-phenyl-indenyl)(2-methyl-4-(p-tert. butyl-phenyl)indenyl)-zirconiumdichloride;
A-(2-isopropyl-4-(p-tert. butyl-phenyl)indenyl)(2-methyl-4-phenyl-indenyl)-zirconiumdichloride,
A-(2-isopropyl-4-(p-tert. butyl-phenyl)indenyl)(2,7-dimethyl-4-phenyl-indenyl)-zirconiumdichloride,
A-(2-isopropyl-4-(p-tert. butyl-phenyl)indenyl)(2,5,6,7-tetramethyl-4-phenyl-indenyl)zirconiumdichloride,
A-(2-isopropyl-6-methyl-4-(p-tert. butyl-phenyl)indenyl)(2,6-dimethyl-4-phenyl-indenyl)zirconiumdichloride,
A-(2-isopropyl-4-phenyl-indenyl)(2,7-dimethyl-4-(p-tert. butyl-phenyl)indenyl)-zirconiumdichloride,
A-(2-isopropyl-4-phenyl-indenyl)(2,5,6,7-tetramethyl-4-(p-tert. butyl-phenyl)-indenyl)zirconiumdichloride,
A-(2-isopropyl-6-methyl-4-phenyl-indenyl)(2,6-dimethyl-4-(p-tert. butyl-phenyl)-indenyl)zirconiumdichloride,
A-(2-isopropyl-4-(p-tert. butyl-phenyl)indenyl)(2-methyl-4-(4-naphthyl)-indenyl)-indenyl)zirconiumdichloride,
A-(2-isopropyl-4-(4-naphthyl)-indenyl)indenyl)(2-methyl-4-(p-tert. butyl-phenyl)-indenyl)zirconiumdichloride,
A-bis(4-naphthyl-indenyl)zirconiumdichloride,
A-bis(2-methyl-benzo-indenyl)zirconiumdichloride
A-bis(2-methyl-indenyl)zirconiumdichloride,
A-bis(2-methyl-4-(1-naphthyl)-indenyl)zirconiumdichloride,
A-bis(2-methyl-4-(2-naphthyl)-indenyl)zirconiumdichloride,
A-bis(2-methyl-4-phenyl-indenyl)zirconiumdichloride,
A-bis(2-methyl-4-t-butyl-indenyl)zirconiumdichloride,
A-bis(2-methyl-4-isopropyl-indenyl)zirconiumdichloride,
A-bis(2-methyl-4-ethyl-indenyl)zirconiumdichloride,
A-bis(2-methyl-4-acenaphth-indenyl)zirconiumdichloride,
A-bis(2,4-dimethyl-indenyl)zirconiumdichloride,
A-bis(2-ethyl-indenyl)zirconiumdichloride,
A-bis(2-ethyl-4-ethyl-indenyl)zirconiumdichloride,
A-bis(2-ethyl-4-phenyl-indenyl)zirconiumdichloride,
A-bis(2-methyl-4,6-diisopropyl-indenyl)zirconiumdichloride,
A-bis(2-methyl-4,5-diisopropyl-indenyl)zirconiumdichloride,
A-bis(2,4,6-trimethyl-indenyl)zirconiumdichloride,
A-bis(2,5,6-trimethyl-indenyl)zirconiumdichloride,
A-bis(2,4,7-trimethyl-indenyl)zirconiumdichloride,
A-bis(2-methyl-5-isobutyl-indenyl)zirconiumdichloride,
A-bis(2-methyl-5-t-butyl-indenyl)zirconiumdichloride,
A-bis(2-methyl-4-(tert-butyl-phenyl)-indenyl)zirconiumdichloride,
A-bis(2-methyl-4-(4-methyl-phenyl)-indenyl)zirconiumdichloride,
A-bis(2-methyl-4-(4-ethyl-phenyl)-indenyl)zirconiumdichloride,
A-bis(2-methyl-4-(4-trifluoromethyl-phenyl)-indenyl)zirconiumdichloride,
A-bis(2-methyl-4-(4-methoxy-phenyl)-indenyl)zirconiumdichloride,
A-bis(2-ethyl-4-(4-tert-butyl-phenyl)-indenyl)zirconiumdichloride,
A-bis(2-ethyl-4-(4-methyl-phenyl)-indenyl)zirconiumdichloride,
A-bis(2-ethyl-4-(4-ethyl-phenyl)-indenyl)zirconiumdichloride,
A-bis(2-ethyl-4-(4-trifluoromethyl-phenyl)-indenyl)zirconiumdichloride,
A-bis(2-ethyl-4-(4-methoxy-phenyl)-indenyl)zirconiumdichloride,
A-bis(2-methyl-4-(4-tert-butyl-phenyl)-indenyl)zirconiumdimethyl,
A-bis(2-methyl-4-(4-methyl-phenyl)-indenyl)zirconiumdimethyl,
A-bis(2-methyl-4-(4-ethyl-phenyl)-indenyl)zirconiumdimethyl,
A-bis(2-methyl-4-(4-trifluoromethyl-phenyl)-indenyl)zirconiumdimethyl,
A-bis(2-methyl-4-(4-methoxy-phenyl)-indenyl)zirconiumdimethyl,
A-bis(2-ethyl-4-(4-tert-butyl-phenyl)-indenyl)zirconiumdimethyl,
A-bis(2-ethyl-4-(4-methyl-phenyl)-indenyl)zirconiumdimethyl,
A-bis(2-ethyl-4-(4-ethyl-phenyl)-indenyl)zirconiumdimethyl,
A-bis(2-ethyl-4-(4-trifluoromethyl-phenyl)-indenyl)zirconiumdimethyl,
A-bis(2-ethyl-4-(4-methoxy-phenyl)-indenyl)zirconiumdimethyl,
A-bis(2-isopropyl-4-(tert-butyl-phenyl)-indenyl)zirconiumdichloride,
A-bis(2-isopropyl-4-(4-methyl-phenyl)-indenyl)zirconiumdichloride,
A-bis(2-isopropyl-4-(4-ethyl-phenyl)-indenyl)zirconiumdichloride,
A-bis(2-isopropyl-4-(4-trifluoromethyl-phenyl)-indenyl)zirconiumdichloride,
A-bis(2-isopropyl-4-(4-methoxy-phenyl)-indenyl)zirconiumdichloride,
A-bis(2-isopropyl-4-(4'-tert.-butyl-phenyl)-indenyl)zirconiumdichloride,
A-bis(2-isopropyl-4-(4'-tert.-butyl-phenyl)-indenyl)hafniumdichloride,
A-bis(2-isopropyl-4-(4'-tert.-butyl-phenyl)-indenyl)titaniumdichloride, A-bis(2-isopropyl-4-(4'-methyl-phenyl)-indenyl)zirconiumdichloride,
A-bis(2-isopropyl-4-(4'-n-propyl-phenyl)-indenyl)zirconiumdichloride,
A-bis(2-isopropyl-4-(4'-n-butyl-phenyl)-indenyl)zirconiumdichloride,
A-bis(2-isopropyl-4-(4'-hexyl-phenyl)-indenyl)zirconiumdichloride,
A-bis(2-isopropyl-4-(4'-sec-butyl-phenyl)-indenyl)zirconiumdichloride,
A-bis(2-isopropyl-4-phenyl)-indenyl)zirconiumdichloride,
A-bis(2-isopropyl-4-(4'-methyl-phenyl)-indenyl)zirconiumdichloride,
A-bis(2-isopropyl-4-(4'-ethyl-phenyl)-indenyl)zirconiumdichloride,
A-bis(2-isopropyl-4-(4'-n-propyl-phenyl)-indenyl)zirconiumdichloride,
A-bis(2-isopropyl-4-(4'-n-butyl-phenyl)-indenyl)zirconiumdichloride,
A-bis(2-isopropyl-4-(4'-hexyl-phenyl)-indenyl)zirconiumdichloride,
A-bis(2-isopropyl-4-(4'-pentyl-phenyl)-indenyl)zirconiumdichloride,
A-bis(2-isopropyl-4-(4'-cyclohexyl-phenyl)-indenyl)zirconiumdichloride,
A-bis(2-isopropyl-4-(4'-sec-butyl-phenyl)-indenyl)zirconiumdichloride,
A-bis(2-isopropyl-4-(4'-tert.-butyl-phenyl)-indenyl)zirconiumdichloride,
A-bis(2-methyl-4-(4'-tert.-butyl-phenyl)-indenyl)zirconiumdichloride,
A-bis(2-methyl-4-(4'-tert.-butyl-phenyl)-indenyl)hafniumdichloride,
A-bis(2-methyl-4-(4'-tert.-butyl-phenyl)-indenyl)titaniumdichloride,
A-bis(2-methyl-4-(4'-methyl-phenyl)-indenyl)zirconiumdichloride,
A-bis(2-methyl-4-(4'-n-propyl-phenyl)-indenyl)zirconiumdichloride,
A-bis(2-methyl-4-(4'-n-butyl-phenyl)-indenyl)zirconiumdichloride,
A-bis(2-methyl-4-(4'-hexyl-phenyl)-indenyl)zirconiumdichloride,
A-bis(2-methyl-4-(4'-sec-butyl-phenyl)-indenyl)zirconiumdichloride,
A-bis(2-ethyl-4-phenyl-indenyl)zirconiumdichloride,
A-bis(2-ethyl-4-(4'-methyl-phenyl)-indenyl)zirconiumdichloride,
A-bis(2-ethyl-4-(4'-ethyl-phenyl)-indenyl)zirconiumdichloride,
A-bis(2-ethyl-4-(4'-n-propyl-phenyl)-indenyl)zirconiumdichloride,
A-bis(2-ethyl-4-(4'-n-butyl-phenyl)-indenyl)zirconiumdichloride,
A-bis(2-ethyl-4-(4'-hexyl-phenyl)-indenyl)zirconiumdichloride,
A-bis(2-ethyl-4-(4'-pentyl-phenyl)-indenyl)zirconiumdichloride,
A-bis(2-ethyl-4-(4'-cyclohexyl-phenyl)-indenyl)zirconiumdichloride,
A-bis(2-ethyl-4-(4'-sec-butyl-phenyl)-indenyl)zirconiumdichloride,
A-bis(2-ethyl-4-(4'-tert.-butyl-phenyl)-indenyl)zirconiumdichloride,
A-bis(2-n-propyl-4-phenyl-indenyl)zirconiumdichloride,
A-bis(2-n-propyl-4-(4'-methyl-phenyl)-indenyl)zirconiumdichloride,
A-bis(2-n-propyl-4-(4'-ethyl-phenyl)-indenyl)zirconiumdichloride,
A-bis(2-n-propyl-4-(4'-iso-propyl-phenyl)-indenyl)zirconiumdichloride,
A-bis(2-n-propyl-4-(4'-n-butyl-phenyl)-indenyl)zirconiumdichloride,
A-bis(2-n-propyl-4-(4'-hexyl-phenyl)-indenyl)zirconiumdichloride,
A-bis(2-n-propyl-4-(4'-cyclohexyl-phenyl)-indenyl)zirconiumdichloride,
A-bis(2-n-propyl-4-(4'-sec-butyl-phenyl)-indenyl)zirconiumdichloride,
A-bis(2-n-propyl-4-(4'-tert.-butyl-phenyl)-indenyl)zirconiumdichloride,
A-bis(2-n-butyl-4-phenyl-indenyl)zirconiumdichloride,
A-bis(2-n-butyl-4-(4'-methyl-phenyl)-indenyl)zirconiumdichloride,
A-bis(2-n-butyl-4-(4'-ethyl-phenyl)-indenyl)zirconiumdichloride,
A-bis(2-n-butyl-4-(4'-n-propyl-phenyl)-indenyl)zirconiumdichloride,
A-bis(2-n-butyl-4-(4'-iso-propyl-phenyl)-indenyl)zirconiumdichloride,
A-bis(2-n-butyl-4-(4'-n-butyl-phenyl)-indenyl)zirconiumdichloride,
A-bis(2-n-butyl-4-(4'-hexyl-phenyl)-indenyl)zirconiumdichloride,
A-bis(2-n-butyl-4-(4'-cyclohexyl-phenyl)-indenyl)zirconiumdichloride,
A-bis(2-n-butyl-4-(4'-sec-butyl-phenyl)-indenyl)zirconiumdichloride,
A-bis(2-n-butyl-4-(4'-tert.-butyl-phenyl)-indenyl)zirconiumdichloride,
A-bis(2-hexyl-4-phenyl-indenyl)zirconiumdichloride,
A-bis(2-hexyl-4-(4'-methyl-phenyl)-indenyl)zirconiumdichloride,
A-bis(2-hexyl-4-(4'-ethyl-phenyl)-indenyl)zirconiumdichloride,
A-bis(2-hexyl-4-(4'-n-propyl-phenyl)-indenyl)zirconiumdichloride,
A-bis(2-hexyl-4-(4'-iso-propyl-phenyl)-indenyl)zirconiumdichloride,
A-bis(2-hexyl-4-(4'-n-butyl-phenyl)-indenyl)zirconiumdichloride,
A-bis(2-hexyl-4-(4'-n-hexyl-phenyl)-indenyl)zirconiumdichloride,
A-bis(2-hexyl-4-(4'-cyclohexyl-phenyl)-indenyl)zirconiumdichloride,
A-bis(2-hexyl-4-(4'-sec-butyl-phenyl)-indenyl)zirconiumdichloride,
A-bis(2-hexyl-4-(4'-tert.-butyl-phenyl)-indenyl)zirconiumdichloride,
A-bis(2-methyl-4-(4'-tert.-butyl-phenyl)-indenyl)zirconiumbis(dimethylamine),
A-bis(2-ethyl-4-(4'-tert.-butyl-phenyl)-indenyl)zirconiumdibenzyl,
A-bis(2-methyl-4-(4'-tert.-butyl-phenyl)-indenyl)zirconiumdimethyl,
A-(2-methyl-4-azapentalene)(2-methyl-4-(4'-methyl-phenyl)-indenyl)zirconiumdichloride,
A-(2-methyl-5-azapentalene)(2-methyl-4-(4'-methyl-phenyl)-indenyl)zirconiumdichloride,
A-(2-methyl-6-azapentalene)(2-methyl-4-(4'-methyl-phenyl)-indenyl)zirconiumdichloride,
A-(2-methyl-4-azapentalene)(2-methyl-4-(4'-ethyl-phenyl)-indenyl)zirconiumdichloride,
A-(2-methyl-4-thiapentalene)(2-methyl-4-(4'-n-propyl-phenyl)-indenyl)-zirconiumdichloride,
A-(2-methyl-4-azapentalene)(2-methyl-4-(4'-isopropyl-phenyl)-indenyl)-zirconiumdichloride,
A-(2-methyl-6-azapentalene)(2-methyl-4-(4'-isopropyl-phenyl)-indenyl)-zirconiumdichloride, A-(2,5-dimethyl-6-thiapentalene)(2-methyl-4-(4'-isopropyl-phenyl)-indenyl)-zirconiumdichloride,
A-(2-methyl-6-oxapentalen)(2-methyl-4-(4'-isopropyl-phenyl)-indenyl)zirconiumdichloride,
A-(2-methyl-6-azapentalene)(2-methyl-4-(4'-n-butyl-phenyl)-indenyl)zirconiumdichloride,
A-(2-methyl-5-thiapentalene)(2-methyl-4-(4'-n-butyl-phenyl)-indenyl)zirconiumdichloride,
A-(2-methyl-4-oxapentalene)(2-methyl-4-(4'-n-butyl-phenyl)-indenyl)zirconiumdichloride,
A-(2-methyl-4-thiapentalene)(2-methyl-4-(4'-s-butyl-phenyl)-indenyl)zirconiumdichloride,
A-(2-methyl-4-oxapentalene)(2-methyl-4-(4'-s-butyl-phenyl)-indenyl)zirconiumdichloride,
A-(2-methyl-4-azapentalene)(2-methyl-4-(4'-tert-butyl-phenyl)-indenyl)-zirconiumdichloride,
A-(2-methyl-6-azapentalene)(2-methyl-4-(4'-tert-butyl-phenyl)-indenyl)-zirconiumdichloride,
A-(2-methyl-4-azapentalene)(2-methyl-4-(4'-n-pentyl-phenyl)-indenyl)-zirconiumdichloride,
A-(2-methyl-N-phenyl-6-azapentalene)(2-methyl-4-(4'-n-pentyl-phenyl)-indenyl)-zirconiumdichloride,
A-(2-methyl-4-oxapentalene)(2-methyl-4-(4'-n-pentyl-phenyl)-indenyl)-zirconiumdichloride,
A-(2-methyl-4-azapentalene)(2-methyl-4-(4'-n-hexyl-phenyl)-indenyl)-zirconiumdichloride,
A-(2-methyl-4-thiapentalene)(2-methyl-4-(4'-n-hexyl-phenyl)-indenyl)-zirconiumdichloride,
A-(2-methyl-6-thiapentalene)(2-methyl-4-(4'-n-hexyl-phenyl)-indenyl)-zirconiumdichloride,
A-(2,5-dimethyl-4-thiapentalene)(2-methyl-4-(4'-n-hexyl-phenyl)-indenyl)-zirconiumdichloride,
A-(2,5-dimethyl-6-thiapentalene)(2-methyl-4-(4-n-hexyl-phenyl)-indenyl)-zirconiumdichloride,
A-(2,5-dimethyl-6-thiapentalene)(2-methyl-4-(4'-cyclohexyl-phenyl)-indenyl)-zirconiumdichloride,
A-(2-methyl-4-azapentalene)(2-methyl-4-(4'-trimethylsilyl-phenyl)-indenyl)-zirconiumdichloride,
A-(2-methyl-4-thiapentalene)(2-methyl-4-(4'-trimethylsilyl-phenyl)-indenyl)-zirconiumdichloride,
A-(2-methyl-5-thiapentalene)(2-methyl-4-(4'-trimethylsilyl-phenyl)-indenyl)-zirconiumdichloride,
A-(2-methyl-6-thiapentalene)(2-methyl-4-(4'-trimethylsilyl-phenyl)-indenyl)-zirconiumdichloride,
A-(2,5-dimethyl-4-azapentalene)(2-methyl-4-(4'-adamantyl-phenyl)-indenyl)-zirconiumdichloride,
A-(2-methyl-4-thiapentalene)(2-methyl-4-(4'-adamantyl-phenyl)-indenyl)-zirconiumdichloride,
A-(2-methyl-6-thiapentalene)(2-methyl-4-(4'-adamantyl-phenyl)-indenyl)-zirconiumdichloride,
A-(2,5-dimethyl-4-thiapentalene)(2-methyl-4-(4'-adamantyl-phenyl)-indenyl)-zirconiumdichloride,
A-(2-methyl-4-azapentalene)(2-methyl-4-(4'-tris(trifluoromethyl)methyl-phenyl)-indenyl)-zirconiumdichloride,
A-(2,5-dimethyl-4-azapentalene)(2-methyl-4-(4'-tris(trifluoromethyl)methyl-phenyl)-indenyl)zirconiumdichloride,
A-(2-methyl-4-thiapentalene)(2-methyl-4-(4'-tris(trifluoromethyl)methyl-phenyl)-indenyl)zirconiumdichloride,
A-(2-methyl-6-thiapentalene)(2-methyl-4-(4'-tris(trifluoromethyl)methyl-phenyl)-indenyl)zirconiumdichloride,
A-(2-methyl-4-azapentalene)(2-ethyl-4-(4'-tert-butyl-phenyl)-indenyl)-zirconiumdichloride,
A-(2-methyl-5-azapentalene)(2-n-butyl-4-(4'-tert-butyl-phenyl)-indenyl)-zirconiumdichloride,
A-(2-methyl-N-phenyl-6-azapentalene)(2-methyl-4-(4'-tert-butyl-phenyl)-indenyl)-zirconiumdichloride,
A-(2-methyl-4-azapentalene)(2-methylindenyl)zirconiumdichloride,
A-(2-methyl-N-phenyl-4-azapentalene)(2-methylindenyl)zirconiumdichloride,
A-(2-methyl-4-thiapentalene)(2-methylindenyl)zirconiumdichloride,
A-(2-methyl-5-thiapentalene)(2-methylindenyl)zirconiumdichloride,
A-(2-methyl-6-thiapentalene)(2-methylindenyl)zirconiumdichloride,
A-(2-methyl-4-azapentalene)(indenyl)zirconiumdichloride,
A-(2-methyl-5-azapentalene)(indenyl)zirconiumdichloride,
A-(2-methyl-6-azapentalene)(indenyl)zirconiumdichloride,
A-(2-methyl-N-phenyl-4-azapentalene)(indenyl)zirconiumdichloride,
A-(2-methyl-N-phenyl-5-azapentalene)(indenyl)zirconiumdichloride,
A-(2-methyl-N-phenyl-6-azapentalene)(indenyl)zirconiumdichloride,
A-(2,5-dimethyl-N-phenyl-6-azapentalene)(indenyl)zirconiumdichloride,
A-(2-methyl-4-thiapentalene)(indenyl)zirconiumdichloride,
A-(2-methyl-5-thiapentalene)(indenyl)zirconiumdichloride,
A-(2-methyl-6-thiapentalene)(indenyl)zirconiumdichloride,
A-(2,5-dimethyl-4-thiapentalene)(indenyl)zirconiumdichloride,
A-(2-methyl-4-azapentalene)(2-methyl-4-phenyl-indenyl)zirconiumdichloride,
A-(2-methyl-5-azapentalene)(2-methyl-4-phenyl-indenyl)zirconiumdichloride,
A-(2-methyl-6-azapentalene)(2-methyl-4-phenyl-indenyl)zirconiumdichloride,
A-(2-methyl-N-phenyl-4-azapentalene)(2-methyl-4-phenyl-indenyl)zirconiumdichloride,
A-(2-methyl-N-phenyl-5-azapentalene)(2-methyl-4-phenyl-indenyl)zirconiumdichloride,
A-(2-methyl-4-thiapentalene)(2-methyl-4-phenyl-indenyl)zirconiumdichloride,
A-(2-methyl-5-thiapentalene)(2-methyl-4-phenyl-indenyl)zirconiumdichloride,
A-(2-methyl-6-thiapentalene)(2-methyl-4-phenyl-indenyl)zirconiumdichloride,
A-(2-methyl-4-oxapentalene)(2-methyl-4-phenyl-indenyl)zirconiumdichloride,
A-(2-methyl-4-azapentalene)(2-methyl-4,5-benzo-indenyl)zirconiumdichloride,
A-(2-methyl-N-phenyl-4-azapentalene)(2-methyl-4,5-benzo-indenyl)zirconiumdichloride,
A-(2-methyl-N-phenyl-5-azapentalene)(2-methyl-4,5-benzo-indenyl)zirconiumdichloride,
A-(2-methyl-N-phenyl-6-azapentalene)(2-methyl-4,5-benzo-indenyl)zirconiumdichloride,
A-(2-methyl-4-thiapentalene)(2-methyl-4,5-benzo-indenyl)zirconiumdichloride,
A-(2-methyl-5-thiapentalene)(2-methyl-4,5-benzo-indenyl)zirconiumdichloride,
A-(2-methyl-6-thiapentalene)(2-methyl-4,5-benzo-indenyl)zirconiumdichloride,
A-(2-methyl-4-oxapentalene)(2-methyl-4,5-benzo-indenyl)zirconiumdichloride,
A-(2-methyl-5-oxapentalene)(2-methyl-4,5-benzo-indenyl)zirconiumdichloride,
A-(2-methyl-6-oxapentalene)(2-methyl-4,5-benzo-indenyl)zirconiumdichloride,
A-bis(2-methyl-4-azapentalene)zirconiumdichloride,
A-bis(2-methyl-N-phenyl-4-azapentalene)zirconiumdichloride,
A-bis(2-methyl-4-thiapentalene)zirconiumdichloride.

A is Dimethylsilanediyl, Diethylsilanediyl, Dipropylsilanediyl, Dibutylsilanediyl, Dipentylsilanediyl, Dihexylsilanediyl, Diheptylsilanediyl, Dioctylsilanediyl, Dinonanylsilanediyl, Didecanylsilanediyl, Diundecanylsilanediyl, Didodecanylsilanediyl, Dimethylgermanediyl, Diethylgermanediyl, Dipropylgermanediyl, Dibutylgermanediyl, Dipentylgermanediyl, Dihexylgermanediyl, Diheptylgermanediyl, Dioctylgermanediyl, Dinonanylgermanediyl, Didecanylgermanediyl, Diundecanylgermanediyl or Didodecanylgermanediyl, Hexyl(methyl)germanediyl, Ethyl(methyl)germanediyl, Ethyl(methyl)silanediyl, Propyl(methyl)silanediyl, 3,3,3-trifluoropropyl(methyl)silanediyl, Propyl(ethyl)silanediyl, Butyl(methyl)silanediyl, Butyl(ethyl)silanediyl, Butyl(propyl)silanediyl, Pentyl(methyl)silanediyl, Pentyl(ethyl)silanediyl, Pentyl(propyl)silanediyl, Pentyl(butyl)silanediyl, Hexyl(methyl)silanediyl, Hexyl (ethyl)silanediyl or Hexyl(propyl)silanediyl, Hexyl(butyl) silanediyl or Hexyl(pentyl)silanediyl, such that the list of bridge elements A is to be understood in such a way that the naming of the substituents on the bridge atom is meant also to include all structural isomers as though they were explicitly named. For example, dibutylsilanediyl simultaneously includes di(n-butyl)silanediyl, di(sec-butyl)silanediyl, di(tert-butyl)silanediyl, or mixtures of these structural isomers. Similarly, the naming of dipentylsilanediyl also includes, for example, di(cyclopentyl)silanediyl or the naming of hexyl(methyl)silanediyl also includes, for example, cyclohexyl(methyl)silanediyl.

Instead of the preferred pure chiral bridged racemic or pseudoracemic metallocene compounds of formulas 1a to 1d, mixtures of the metallocenes of formulas 1a to 1d and the corresponding meso or pseudomeso metallocenes may be used in the catalyst preparation. However, the isomerically pure racemic form is especially preferred for the use of metallocenes in the polymerization of olefins to isotactic polyolefins, since the corresponding meso form may produce undesired atactic polypropylene (PP). The isomerically pure racemic form is understood to mean a rac:meso ratio of at least 5:1, preferably 10:1 and most preferred 20:1.

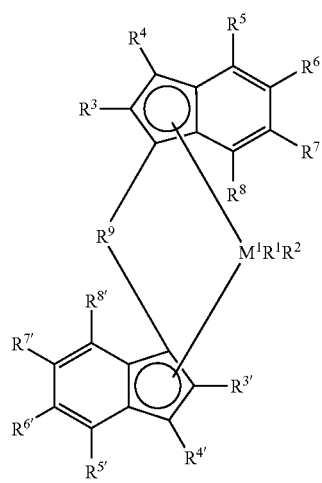

rac/pseudoracemic isomer

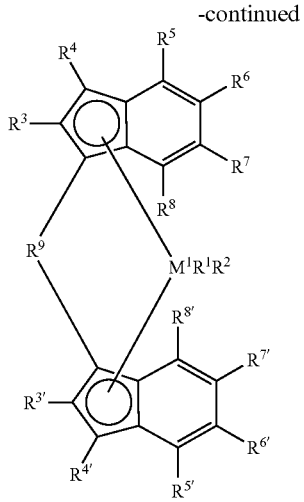

meso/pseudomeso isomer

As already outlined, the present invention relates to a catalyst system comprising at least one compound of formulas 1–1d, at least one support and at least one cocatalyst.

A suitable cocatalyst component which is present according to the present invention in the catalyst system comprises at least one compound of the type of an aluminoxane.

Aluminoxanes are oligomeric or polymeric aluminum oxy compounds, which may exist in the form of linear, cyclic, caged or polymeric structures. Although the exact structure(s) of aluminoxanes is still unknown, it is well accepted that alkylaluminoxanes have the general formula 2.

$(R-Al-O)_p$     (Formula 2).

Examples for cyclic, linear or cage structures of aluminoxanes are depicted in the formulas 3, 4 and 5:

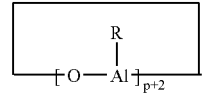 (Formula 3)

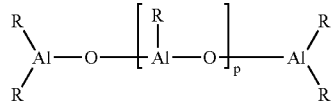 (Formula 4)

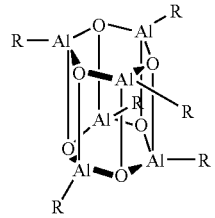 (Formula 5)

The radicals R in the formulas (2), (3), (4) and (5) can be identical or different and are each a hydrocarbon group such as an alkyl group of from 1 to about 10 carbon atoms, an aryl group of from 6 to about 18 carbon atoms, benzyl or hydrogen and p is an integer ranging from 2 to about 50, preferably at least about 4.

Preferably, the radicals R are identical and are methyl, ethyl, isobutyl, n-butyl, phenyl or benzyl, particularly preferably methyl.

If the radicals R are different, they are preferably methyl and hydrogen, methyl and isobutyl or methyl and n-butyl, with hydrogen, isobutyl or n-butyl preferably being present in a proportion of from 0.01 to 40% (number of radicals R).

The aluminoxane can be prepared in various ways by known methods. One of the methods comprises the reaction of an aluminum-hydrocarbon compound and/or a hydridoaluminum-hydrocarbon compound with water, which may be gaseous, solid, liquid or bound as water of crystallization, in an inert solvent such as toluene. To prepare an aluminoxane having different alkyl groups R, two different trialkylaluminums $(AlR_3+AlR'_3)$ corresponding to the desired composition and reactivity are reacted with water, cf. S. Pasynkiewicz, Polyhedron 9 (1990) 429 and EP-A-0 302 424.

Regardless of the method of preparation, all aluminoxane solutions have in common a variable content of unreacted aluminum starting compound which is present in free form or as an adduct.

Furthermore, instead of the aluminoxane compounds of the formulas 2, 3, 4 or 5, it is also possible to use modified aluminoxanes in which the hydrocarbon radicals or hydrogen atoms have been partly replaced by alkoxy, aryloxy, siloxy or amide radicals.

The amounts of aluminoxane and metallocene used in the preparation of the supported catalyst system can be varied within a certain range. However, it has been found to be advantageous to use the metallocene compound(s) of formulas 1–1d and the aluminoxane compound(s) in such amounts that the atomic ratio of aluminum from the aluminoxane compounds to the transition metal from the metallocene compound is in the range from 10:1 to 1000:1, preferably from 20:1 to 500:1 and in particular in the range from 30:1 to 400:1. In the case of methylaluminoxane, preference is given to using ≧30% strength toluene solutions, but the use of 10% strength solutions is also possible.

In accordance with the present invention, it is also possible to use mixtures comprising aluminoxanes and an ionic compound, and/or a Lewis acid.

The catalyst system of the present invention can further comprise, as additional component, a metal compound of the formula 6,

$M^5(R^{22})_r(R^{23})_s(R^{24})_t$ (Formula 6)

wherein

M$^5$ is an alkali, an alkali earth metal or a metal of Group 13 of the Periodic Table of the Elements, R$^{22}$ is a hydrogen atom, alkyl of from 1 to about 10 carbon atoms, aryl of from 6 to about 15 carbon atoms, or alkylaryl or arylalkyl each having from 1 to 10 carbon atoms in the alkyl part and from 6 to 20 carbon atoms in the aryl part, R$^{23}$ and R$^{24}$ are each a hydrogen atom, a halogen atom, alkyl of from 1 to about 10 carbon atoms, $C_6$–$C_{15}$-aryl of from about 6 to about 15 carbon atoms, or alkylaryl, arylalkyl or alkoxy, each having from 1 to 10 carbon atoms in the alkyl part and from 6 to 20 carbon atoms in the aryl radical, r is an integer from 1 to 3 and s and t are integers from 0 to 2, where the sum r+s+t corresponds to the valence of M$^5$, where this component is not identical with the above mentioned cocatalyst compounds. It is also possible to use mixtures of various metal compounds of the formula 6.

Among the metal compounds of the formula 6 preference is given to those in which M$^5$ is lithium, magnesium or aluminum and R$^{23}$ and R$^{24}$ are each alkyl of from 1 to about 10 carbon atoms. Particularly preferred metal compounds of the formula 6 are n-butyllithium, n-butyl-n-octyl-magnesium, n-butyl-n-heptylmagnesium, tri-n-hexylaluminum, triisobutylaluminum, diisobutylaluminum hydride, triethylaluminum, trimethylaluminum or mixtures thereof.

If a metal compound of the formula 6 is used, it is preferably present in the catalyst system in such an amount that the molar ratio of M$^5$ to the transition metal from the metallocene compound of formulas 1–1d is from 800:1 to 1:1, in particular from 200:1 to 2:1.

As Lewis acid, preference is given to using compounds of the formula 7

$M^2X^1X^2X^3$ (Formula 7)

where M$^2$ is an element of Group 13 of the Periodic Table of Elements, in particular B, Al or Ga, preferably B or Al, X$^1$, X$^2$ and X$^3$ are the same or different and each are a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6–20 carbon atoms in the aryl radical or fluorine, chlorine, bromine or iodine. Preferred examples for X$^1$, X$^2$ and X$^3$ are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl.

Preferred Lewis acids are trimethylaluminium, triethylaluminum, triisobutylaluminum, tributylaluminum, trifluoroborane, triphenylborane, tris(4-fluorophenyl)borane, tris (3,5-difluorophenyl)borane, tris(4-fluoromethylphenyl) borane, tris(2,4,6-trifluorophenyl )borane, tris(pentafluorophenyl)borane, tris(tolyl)borane, tris(3,5-dimethylphenyl)borane, tris(3,5-difluorophenyl)borane and/or tris (3,4,5-trifluorophenyl)borane.

Particular preference is given to tris(pentafluorophenyl) borane.

As ionic cocatalysts, preference is given to using compounds which contain a non-coordinating anion such as tetrakis(pentafluorophenyl)borate, tetraphenylborate, SbF$_6^-$, CF$_3$SO$_3^-$ or ClO$_4^-$. Suitable counterions are either Lewis acid or Broenstedt acid cation.

As Broensted acids, particular preference is given to protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyidiphenylammonium, pyridinium, p-bromo-N,N-dimethylanilinium or p-nitro-N,N-dimethylanilinium, Suitable Lewis-acid cations are cations of the formula 8

$[(Y^{a+})Q_1Q_2 \ldots Q_z]^{d+}$ (Formula 8)

where Y is an element of Groups 1 to 16 of the Periodic Table of the Elements,

Q$_1$ to Q$_1$ are singly negatively charged groups such as C$_1$–C$_{28}$-alkyl, C$_6$–C$_{15}$-aryl, alkylaryl, arylalkyl, haloalkyl, haloaryl each having from 6 to 20 carbon atoms in the aryl radical and from 1 to 28 carbon atoms in the alkyl radical, cycloalkyl groups of from 3 to about 10 carbon atoms, which may in turn bear alkyl groups of from 1 to about 10 carbon atoms as substitutents, halogen, alkoxy groups of from 1 to 28 carbon atoms, aryloxy groups of from 6 to 15 carbon atoms, silyl or mercaptyl groups.

a is an integer from 1–6, z is an integer from 0 to 5 and d corresponds to the difference a–z, but d is larger than or equal to 1

Particularly suitable cations are carbonium cations such as triphenylcarbenium, oxonium cations, sulfonium cations such as tetrahydrothiophenium, phosphonium cations such as triethylphosphonium, triphenylphosphonium and diphenylphosphonium, and also cationic transition metal complexes such as the silver cation and the 1,1'-dimethylferrocenium cation.

Preferred ionic compounds which can be used according to the present invention include:
triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tributylammoniumtetra(pentafluorophenyl)aluminate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate
N,N-dimethylaniliniumtetra(phenyl)borate,
N,N-diethylaniliniumtetra(phenyl)borate,
N,N-dimethylaniliniumtetrakis(pentafluorophenyl)borate,
N,N-dimethylaniliniumtetrakis(pentafluorophenyl)aluminate,
di(propyl)ammoniumtetrakis(pentafluorophenyl)borate,
di(cyclohexyl)ammoniumtetrakis(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
triphenylcarbeniumtetrakis(pentafluorophenyl)aluminate,
triphenylcarbeniumtetrakis(phenyl)aluminate,
ferroceniumtetrakis(pentafluorophenyl)borate and/or
ferroceniumtetrakis(pentafluorophenyl)aluminate, Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

It is also possible to use mixtures of all of the above and below mentioned cation-forming compounds. Preferred mixtures comprise aluminoxanes and an ionic compound, and/or a Lewis acid.

The amount of Lewis acids or ionic compounds having Lewis-acid or Broensted-acid cations is preferably from 0.1 to 20 equivalents, preferably from 1 to 10 equivalents, based on the metallocene compound of the formulas 1–1d.

The support component of the catalyst system of the present invention can be any organic or inorganic inert solid or a mixture of such solids, in particulate porous solids such as hydrotalcites, talc, inorganic oxides and finely divided polymer powders.

Suitable inorganic oxides, which are preferably employed include from the Periodic Table of Elements Groups 2, 3, 4, 5, 13, 14, 15 and 16 metal oxides such as silicon dioxide, aluminum oxide, aluminosilicates, zeolites, MgO, $ZrO_2$, $TiO_2$ or $B_2O_3$, CaO, ZnO, $ThO_2$, $Na_2O$, $K_2O$, $LiO_2$ or mixed oxides like Al/Si oxides, Mg/Al oxides or Al/Mg/Si oxides. Other suitable inorganic support materials are $Na_2CO_3$, $K_2CO_3$, $CaCO_3$, $MgCl_2$, $Na_2SO_4$, $Al_2(SO_4)_3$, $BaSO_4$, $KNO_3$, $Mg(NO_3)_2$ and $Al(NO_3)_3$.

Suitable polymer powders are homopolymers, copolymers, crosslinked polymers or polymer blends. Examples of such polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol.

The preferred support materials have a specific surface area in the range from 10 to 1000 $m^2/g$, a pore volume in the range from 0.1 to 5 $cm^3/g$ and a mean particle size of from 1 to 500 μm. Preference is given to supports having a specific surface area in the range from 50 to 500 $m^2/g$, a pore volume in the range from 0.5 to 3.5 $cm^3/g$ and a mean particle size in the range from 5 to 250 μm. Particular preference is given to supports having a specific surface area in the range from 200 to 400 $m^2/g$, a pore volume in the range from 0.8 to 3.0 $cm^3/g$ and a mean particle size of from 10 to 100 μm.

The support materials can be thermally and/or chemically be pretreated in order to adjust certain properties of the carrier such as the water and/or the hydroxyl group content.

If the support material has a low moisture content or residual solvent content, dehydration or drying before use can be omitted. If this is not the case, as when using silica gel as support material, dehydration or drying is advisable. Thermal dehydration or drying of the support material can be carried out under reduced pressure with or without simultaneous inert gas blanketing (nitrogen). The drying temperature is in the range from 80° C. to 1000° C., preferably from 150° C. to 800° C. and most preferred from 150° C. to 400° C. The duration of the drying process can be from 1 to 24 hours. But shorter or longer drying periods are also possible.

In a preferred embodiment of the present invention, support materials with a weight loss on dryness (LOD) of 0.5 wt. % or less, and even more preferred with a LOD of 0.3 wt % or less are used. Higher amounts of physically adsorbed water up to 1 wt % are possible, but result in reduced catalyst activities. The loss on ignition (LOI) of the support material is preferably 1 wt % or greater or even more preferred between 1.5 and 3.5 wt %. The weight loss on dryness (LOD) is thereby defined as the weight loss between room temperature and 300° C. and the weight loss on ignition (LOI) as the weight loss between 300° C. and 1000° C.

In addition or alternatively, dehydration or drying of the support material can also be carried out by chemical means, by reacting the adsorbed water and/or the surface hydroxyl groups with suitable passivating agents. Reaction with the passivating reagent can convert the hydroxyl groups completely or partially into a form, which does not show any adverse interaction with the catalytically active centers. Suitable passivating agents are silicon halides, silanes or amines, eg. silicon tetrachloride, chlorotrimethylsilane, dichlorodialkylsilanes, dimethylaminotrichlorosilane, N,N-dimethylanilin or N,N-dimethylbenzylamine or organometallic compounds of aluminum, boron and magnesium, eg.

aluminoxanes, trimethylaluminum, triethylaluminum, triisobutylaluminum, diisobutylaluminum hydride, triethylborane or dibutylmagnesium.

As outlined above, organic support materials such as finely divided polymer powders, can also be used and should, before use, likewise be freed from any adhering moisture, solvent residues or other impurities by means of appropriate purification and drying operations.

Preference is given to using silica gels having the defined parameters as support materials. Spray dried silica grades, which inherently exhibit meso and macro pores, cavities and channels are preferred over granular silica grades.

The present invention relates to a process for the preparation of supported metallocenes, which comprises as a first step contacting at least one support material with a first portion of at least one co-catalyst in a suitable solvent. In a second step (impregnation step), the co-catalyst loaded support is impregnated with a suspension or solution, which comprises at least one metallocene and a second portion of at least one co-catalyst in a suitable solvent. The preferred co-catalyst is an aluminoxane or a mixture of aluminoxanes. However, it is also possible to use mixtures comprising aluminoxanes and an ionic compound and/or a Lewis acid.

More specifically, the catalyst system of the present invention is prepared by contacting at least one support material with a first portion of an aluminoxane or a mixture of aluminoxanes in a suitable solvent at elevated temperatures. In a subsequent impregnation step the aluminoxane loaded support material is brought into contact with a suspension or solution of at least one of the above-described metallocene components of formulas 1–1d and a second portion of the aluminoxane or a mixture of aluminoxanes or an ionic compound and/or a Lewis acid in a suitable solvent as defined below. The thus obtained supported catalysts are homogeneously loaded, show high catalyst activities and result in good polymer particle morphologies.

In accordance with the present invention, the reaction of the support material with the first portion of an aluminumoxane or a mixture of aluminoxanes is carried out by mixing, under the exclusion of air and moisture, a suspension of the support material in a suitable solvent with the first portion of an aluminumoxane or a mixture of aluminoxanes dissolved in a suitable solvent like aliphatic or aromatic hydrocarbons such as pentane, hexane, isohexane, heptane, toluene or xylene. The reaction is carried out at temperatures from 30° C. to 200° C., preferably from 50° C. to 160° C., particularly preferred from 80° C. to 140° C. The duration of the reaction is from 30 minutes to 20 hours, preferably from 1 to 6 hours. Subsequently the aluminoxane loaded support material is isolated by filtration or by sedimentation of the solid and decantation of the solvent under inert conditions, and optionally washed one or more times with suitable inert solvents as described above. The aluminoxane loaded support material is subsequently dried in a stream of inert gas or under reduced pressure or is dispersed in a suitable solvent.

In the process for the preparation of supported metallocenes in accordance with the present invention preference is given to react the support material with a first portion of an aluminumoxane or of a mixture of aluminoxanes by suspending the support material, preferably a thermally pretreated silica, in a suitable solvent such as toluene and bringing the suspension into contact with a solution of a mixture of aluminoxanes or an aluminoxane, preferably methylaluminoxane, in a suitable solvent, at temperatures of 10 to 30° C. Once the aluminoxane addition is complete, the reaction mixture can be kept from 0 to 12 hours, preferably from 0.15 to 2 hours at 20° C. before heated to elevated temperatures. In a subsequent step the support/aluminoxane mixture is heated to temperatures from 30° C. to 200° C., preferably from 50° C. to 160° C., and most preferred to temperatures from 80° C. to 140° C. The duration of the reaction at these elevated temperatures is from 30 minutes to 20 hours, preferably from 1 to 6 hours.

In accordance with the present invention only part of the mixture of aluminoxanes or of the aluminoxane, preferably methylaluminoxane, is added in the first step of the catalyst preparation procedure. The employed amount can vary to a certain extent, however, it has been found to be advantageous to treat the support material with at least 5 mmole, preferably 7 mmole, most preferably 10 mmole of the aluminoxane or of the mixture of aluminoxanes per g support material.

The suspension or solution used in the impregnation step is generally prepared by suspending or dissolving at least one of the metallocene components of formulas 1–1d, the second portion of an aluminumoxane or of a mixture of aluminoxanes or an ionic compound and/or a Lewis acid and if desired other additives, as defined below, in a suitable solvent.

Suitable solvents are hydrocarbons and hydrocarbon mixtures, which are liquid at the selected reaction temperature and in which the individual components preferably dissolve. The solubility of the individual components is, however, not a prerequisite as long as it is ensured that once the impregnation process is completed, no further undissolved components are present in the solvent selected. Preferred solvents are alkanes such as pentane, isopentane, hexane, isohexane, heptane, octane and nonane, cycloalkanes such as cyclopentane and cyclohexane and aromatics such as benzene, toluene, ethylbenzene and diethylbenzene. Very particular preference is given to toluene, heptane and ethylbenzene.

The preparation of the impregnation suspension or solution used for the impregnation step is carried out at temperatures between from 0° C. to 100° C., preferably from 20° C. to 30° C. Higher and lower temperatures are possible. At least one of the metallocenes of formulas 1–1d in the form of a solid is dissolved in a solution of the co-catalyst such as an aluminoxane or a mixture of aluminoxanes or an ionic compound and/or a Lewis acid in a suitable solvent. It is also possible to dissolve the metallocene separately in a suitable solvent and subsequently to combine this solution with the co-catalyst solution. Preference is given to using toluene. If desired, the resultant suspension or solution can be preactivated. The preactivation time is from 1 minute to 200 hours. The preactivation can take place at temperatures from 10 to 100° C. preferably from 20 to 30° C. In individual cases, the use of higher temperatures can reduce the required preactivation time and give an additional increase in catalyst activity. Elevated temperatures in this case refer to a range from 30° C. to 100° C.

In the impregnation step of the present invention the cocatalyst loaded support material is brought into contact with the impregnation suspension or solution which comprises at least one of the above-described metallocene components of formulas 1–1d in a suitable solvent as defined above and a suitable co-catalyst such as an aluminoxane or a mixture of aluminoxanes or an ionic compound and/or a Lewis acid. The amount of co-catalyst employed in this step can vary to a certain extent. However, it has been found to be advantageous to use at least 0.5 mmole co-catalyst per g support material and preferably at least 1.0 mmole co-catalyst per g support material.

The total amount of co-catalyst such as an aluminoxane or mixtures of aluminoxanes employed in the catalyst preparation procedure of the present invention depends on the nature of the metallocene compound and on the physical properties of the support and is typically between 6 mmole and 24 mmole aluminoxane per g support material. Preference is given to use between 8 and 20 mmole aluminoxane per g support and particular preference is given to use between 11 mmole and 18 mmole aluminoxane per g support. Metallocene loadings may vary, depending on the type and performance features of the respective metallocene compound but are preferably between 0.1 and 1.7 mol % of employed aluminoxane per g support material.

The impregnation process itself can be carried out in various ways. In general, the impregnation suspension or solution as described above is combined with the cocatalyst loaded support material, which is in the form of a dry powder or as a suspension in one of the solvents mentioned above. Usually, the cocatalyt loaded support material is used as a dry powder or used as obtained after separation from the suspension medium. The impregnation suspension or solution can be either added to the cocatalyst loaded support material, or else the cocatalyst loaded support material can be introduced into the initially charged impregnation suspension or solution. The volume of the impregnation suspension or solution can exceed 100% of the total pore volume of the support material used or else be up to 100% of the total pore volume.

The temperature at which the impregnation suspension or solution is brought into contact with the co-catalyst loaded support material can vary within the range from 10° C. to 100° C. The time for which the impregnation suspension or solution is brought into contact with the co-catalyst loaded support material and for which they are allowed to react with each other is between 1 minute and 24 hours, preferably between 5 minutes and 6 hours.

In a preferred embodiment of the present invention, the impregnation process is carried out by having the impregnation suspension or solution flow through the co-catalyst loaded support material in a direct manner. Usually this procedure is carried out in a column-shaped or cylindrical or tubular or conical reaction vessel with inlet and outlet devices, which is filled with the co-catalyst loaded support material. The impregnation process can be performed in three different variants as described in U.S. Pat. No. 6,589,905 and WO00/05277 respectively, both of which are herein incorporated by reference.

In another preferred embodiment, the catalyst systems of the present invention are formed by an incipient wetness impregnation technique, where the volume of the impregnation suspension or solution or the total liquid volume used in the impregnation step, respectively, does not exceed 250% of the total pore volume of the support material.

According to the present invention particular preference is given to use at least 10 mmole of the aluminoxan or of the mixture of aluminoxanes per g support material in the first step of the catalyst preparation procedure and to carry out the impregnation step by passing the impregnation suspension or solution through the co-catalyst loaded support material in a direct flow.

In one embodiment of the present invention the resulting supported metallocene catalyst system is optionally washed and then dried to ensure that the solvent is completely or mostly removed from the pores of the support material. The supported catalyst is obtained as a free-flowing powder. In another embodiment of this invention the supported catalyst is recovered and optionally washed with an aromatic hydrocarbon and/or paraffinic hydrocarbon solvent. The isolated catalyst is then dispersed in a non-reactive suspension media such as a paraffinic hydrocarbon solvent, a mineral oil or a wax.

While the solvent is completely or mostly removed from the supported catalyst system, the mixture can be stirred and, if desired, also heated. Preferably, both the visible portion of the solvent and the portion in the pores of the support material are removed. The removal of the solvent can be carried out in a conventional way using reduced pressure and/or purging with inert gas. During the drying process, the mixture can be heated until the free solvent has been removed, which usually takes from 1 to 3 hours at a preferred temperature of from 30° C. to 60° C. The free solvent is the visible portion of the solvent in the mixture. For the purposes of the present invention, residual solvent is the portion present in the pores.

As an alternative to the complete removal of the solvent, the supported catalyst system can also be dried until only a certain residual solvent content is left, with the free solvent having been completely removed. Subsequently, the supported catalyst system can be washed with a low-boiling hydrocarbon such as pentane, hexane, isohexane or heptane and dried again.

Thus, the process for preparing a free-flowing supported catalyst system according to the present invention comprises the following steps:

a) Contacting a support material with a first composition which includes at least one aluminoxane in a first solvent at a temperature of about 10 to 30° C. followed by keeping the mixture at about 20° C. for 0 to 12 hours, subsequently heating the resulting mixture to a temperature of 30 to 200° C. and keeping the mixture at 30 to 200° C. for 30 minutes to 20 hours, optionally followed by removing all or part of the first solvent and/or optionally followed by one or more washing step(s) using a suitable solvent, b) Suspending and/or dissolving, respectively, at least one metallocene of formula 1–1d and a second portion of an aluminoxane or of a mixture of aluminoxanes or of an ionic compound and/or a Lewis acid in a second solvent or suspension medium at a temperature of 0 to 100° C., optionally followed by a preactivation time of 1 minute to 200 hours at a temperature of 10 to 100°, c) Applying the mixture prepared in b) to the aluminoxane loaded support material produced in a), at a temperature of 10 to 100° C. and a contact time of 1 minute to 24 hours, d) Removing the major part of the solvent from the resulting mixture and optionally washing the resulting supported catalyst with a suitable solvent, e) Isolating the supported catalyst system and f) Optionally prepolymerizing the resulting supported catalyst system with one or more olefinic monomer(s), to obtain a prepolymerized supported catalyst system.

More specifically, the process for preparing a free-flowing supported catalyst system according to the present invention comprises the following steps:

a) Contacting a support material with a first composition which includes at least 5 mmol of an aluminoxane or of a mixture of aluminoxanes per g support material in a first solvent at a temperature of about 20° C. followed by keeping the mixture at about 20° C. for 0.15 to 2 hours, subsequently heating the resulting mixture to a temperature of 50 to 160° C. and keeping the mixture at 50 to 160° C. for 1 to 6 hours, optionally followed by removing all or part of the first solvent and/or optionally followed by one or more washing step(s) using a suitable solvent, b) Suspending and/or dissolving, respectively, at least one metallocene of formula 1–1d and at least 0.5 mmole of a second portion of an aluminoxane or of a mixture of aluminoxanes per g support material in a second solvent or suspension medium, where the metallocene is used in an amount of at least 0.1 mol % of the total amount of aluminoxane or of a mixture of aluminoxane per g support material, at a temperature of 20 to 50° C., optionally followed by a preactivation time of 1 minute to 200 hours at a temperature of 20 to 30°, c) Applying the mixture prepared in b) to the aluminoxane loaded support material produced in a), at a temperature of 10 to 100° C. and a contact time of 1 minute to 24 hours, d) Removing the major part of the solvent from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a preferred embodiment the process for preparing a free-flowing supported catalyst system according to the present invention comprises the following steps:

a) Contacting an optionally thermally pretreated silica support material with at least 10 mmol of an aluminoxane per g support material in a suitable solvent such as toluene at a temperature of about 20° C. followed by subsequently heating the resulting mixture to a temperature of 80 to 140° C. and keeping the mixture at 80 to 140° C. for 1 to 6 hours, optionally followed by removing all or part of the suitable solvent such as toluene, and/or optionally followed by one or more washing step(s) using a suitable solvent, b) Suspending and/or dissolving, respectively, at least one metallocene of formula 1a-1d and at least 0.5 mmole of a second portion of aluminoxane per g support material in toluene, where the metallocene is used in an amount of at least 0.1 mol % of the total amount of aluminoxane or of a mixture of aluminoxane per g support material, at a temperature of 20 to 50° C., optionally followed by a preactivation time of 1 minute to 200 hours at a temperature of 20 to 30°, c) Applying the mixture prepared in b) to the aluminoxane loaded support material produced in a), at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a more preferred embodiment the process for preparing a free-flowing supported catalyst system according to the present invention comprises the following steps:

a) Contacting an optionally thermally pretreated silica support material with a weight loss on dryness (LOD) of 0.5 wt. % or less and a weight loss on ignition (LOI) of 1.0 wt. % or greater with a first composition which includes at least 10 mmol of methylaluminoxane per g support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a suitable solvent, b) Suspending and/or dissolving, respectively, at least one metallocene of formula 1b–1d and at least 1 mmole of a second portion of methylaluminoxane per g support material in toluene, where the metallocene is used in an amount of at least 0.1 mol % of the total amount of aluminoxane per g support material, at a temperature of 20 to 50° C., optionally followed by a preactivation time of 1 minute to 200 hours at a temperature of 20 to 30°, c) Applying the mixture prepared in b) to the methylaluminoxane loaded support material produced in a), by passing the impregnation suspension or solution b) through the methylaluminoxane loaded support material in a direct flow or by using an incipient wetness impregnation technique, where the volume of the impregnation suspension or solution or the total liquid volume used in the impregnation step, respectively, does not exceed 250% of the total pore volume of the support material, at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

In a particular preferred embodiment the process for preparing a free-flowing supported catalyst system according to the present invention comprises the following steps:

a) Contacting an optionally thermally pretreated silica support material with a weight loss on dryness (LOD) of 0.3 wt. % or less and a weight loss on ignition (LOI) between 1.5 and 3.5 wt. %, with at least 10 mmol of methylaluminoxane per g support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a suitable solvent, b) Suspending and/or dissolving, respectively, at least one metallocene of formula 1b–1d and at least 1 mmole of a second portion of methylaluminoxane per g support material in toluene, where the metallocene is used in an amount of at least 0.1 mol % of the total amount of aluminoxane per g support material, at a temperature of 20 to 50° C., optionally followed by a preactivation time of 1 minute to 200 hours at a temperature of 20 to 30°, c) Applying the mixture prepared in b) to the methylaluminoxane loaded support material produced in a), by passing the impregnation suspension or solution b) through the aluminoxane loaded support material a) in a direct flow or by using an incipient wetness impregnation technique, where the volume of the impregnation suspension or solution or the total liquid volume used in the impregnation step, respectively, does not exceed 250% of the total pore volume of the support material, at a temperature of 10 to 100° C. and a contact time of 1 minute to 24 hours, d) Removing the major part of the toluene from the resulting mixture and e) Optionally washing the resulting supported catalyst with a suitable solvent, and/or drying the resulting supported catalyst at temperatures of 30 to 60° C., and f) Optionally prepolymerizing the resulting supported catalyst system with one or more olefinic monomer(s), to obtain a prepolymerized supported catalyst system.

The supported catalyst system prepared according to the present invention can be used either directly for the polymerization of olefins or be prepolymerized with one or more olefinic monomers, with or without the use of hydrogen as molar mass regulating agent, prior to use in a polymerization process. The procedure for the prepolymerization of supported catalyst systems is described in WO 94/28034, which is herein incorporated by reference.

As additive, it is possible to add, during or after the preparation of the supported catalyst system, a small amount of an olefin, preferably an alpha-olefin such as styrene or phenyldimethylvinylsilane as activity-increasing component or an antistatic, as described in U.S. Ser. No. 08/365,280. The molar ratio of additive to metallocene component of formulas 1–1d is preferably from 1:1000 to 1000:1, very particularly preferably from 1:20 to 20:1.

The present invention also provides a process for preparing a polyolefin by polymerization of one or more olefins in the presence of the catalyst system of the present invention comprising at least one transition metal component of the formulas 1–1d, at least one support and at least one cocatalyst. For the purposes of the present invention, the term polymerization refers to both homopolymerization and copolymerization and the term copolymerization includes terpolymerization or copolymerization of more than three different monomers.

Preference is given to polymerizing olefins of the formula $R'''$—CH=CH—$R''$, where $R'''$ and $R''$ are identical or different and are each a hydrogen atom or a radical having from 1 to 20 carbon atoms, in particular from 1 to 10 carbon atoms, and $R'''$ and $R''$ together with the atoms connecting them can form one or more rings.

Suitable olefins are 1-olefins, eg. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene, ethylnorbornadiene and cyclic olefins such as norbornene, tetracyclododecene or methylnorbornene. In the process of the present invention, preference is given to homopolymerizing propene or ethene or copolymerizing propene with ethene and/or one or more 1-olefins having from 4 to 20 carbon atoms, eg. 1-butene, 1-pentene or hexene, and/or one or more dienes having from 4 to 20 carbon atoms, eg. 1,4-butadiene, norbornadiene, ethylidenenorbornene or ethylnorbornadiene. Very suitable copolymers are propene-ethene copolymers, propene-1-butene copolymers propene-1-pentene copolymers and propene-ethene-1-butene, propene-ethene-1-pentene or propene-ethene-1,4-hexadiene terpolymers.

The polymerization is carried out at from −60° C. to 300° C. preferably from 50° C. to 200° C., very particularly preferably from 50° C. to 100° C. The pressure is from 0.5 to 2000 bar, preferably from 5 to 100 bar.

The polymerization can be carried out in solution, in bulk, in suspension or in the gas phase, continuously or batchwise, in one or more stages and/or in a reactor with different reaction zones. As an example, impact copolymers are preferably produced in more than one stage. The homopolymer or random copolymer content of such a polymer can be produced in (a) first stage(s) and the copolymer rubber content can be produced in (a) consecutive stage(s). Homopolymers or random copolymers having a broad molecular weight distribution or homopolymers or random copolymers having bimodal or multimodal molecular weight distribution can be produced in two or multi reactor cascades by applying different hydrogen and/or different comonomer concentrations. In addition, by applying different comonomer contents in two or multi reactor cascades, polymers with broad, bimodal or multimodal melting behaviour can be realized.

The supported catalyst system prepared according to the present invention can be used as sole catalyst component for the polymerization of olefins or preferably in combination with at least one alkyl compound of elements of Main Groups I to III of the Periodic Table, for example an aluminum alkyl, magnesium alkyl or lithium alkyl or an aluminoxane. The alkyl compound is added to the monomer or suspension medium and serves to free the monomer of substances, which can impair the catalytic activity. The amount of alkyl compound added depends on the quality of the monomers used.

As an alternative to use more than one reactor to prepare olefin polymers having a broad, bimodal or multimodal molecular weight distribution or a broad, bimodal or multimodal melting range resp. melting behaviour, it is recommended to use a catalyst system comprising two or more different metallocenes. Alternatively two or more different catalyst systems of the present invention can be used as a mixture.

As molar mass regulator and/or to increase the activity, hydrogen is added if required.

The catalyst system may be supplied to the polymerization system as a solid, a paste or in the form of a suspension in a hydrocarbon or may be treated with inert components, such as paraffins, oils, or waxes, to achieve better metering. If the catalyst system is to be metered into the reactor together with the monomer to be polymerized or the monomer mixture to be polymerized, the mixing unit and the metering line are preferably cooled.

Furthermore, an additive such as an antistatic or an alcohol can be used in the process of the present invention, for example to improve the particle morphology of the olefin polymer. In general it is possible to use all antistatics, which are suitable in olefin polymerization processes. It is preferred to dose the antistatic directly into the polymerization system, either together with or separately from the catalyst system used.

The polymers prepared using the catalyst systems of the present invention display uniform particle morphology and contain no fines. No agglomerates or deposits are obtained in the polymerization using the catalyst system of the present invention.

The catalyst systems of the present invention give polymers such as polypropylene having a low content of catalyst residues, high molecular weight and cover a broad range of stereospecificity and regiospecificity.

The copolymers which can be prepared using the catalyst system based on metallocenes of formula 1d of the present invention have a significantly higher molar mass compared to the prior art. At the same time, such copolymers can be prepared using the catalyst system of the present invention at a high productivity and at industrially relevant process parameters without deposit formation.

The polymers prepared by the process of the present invention are suitable, in particular, for producing products such as fibers, filaments, injection-molded parts, films, sheets, caps, closures, bottles or large hollow bodies such as pipes with excellent properties.

The invention is further illustrated by, but not intended to be limited to, the following Examples.

EXAMPLES

General Procedures

All preparative work was carried out under argon using Schlenk techniques or in a glove box. All solvents were purged with argon and dried over molecular sieves before use.

The polymers produced and the metallocenes used were characterized by $^1$H-NMR, $^{13}$C-NMR, DSC, GPC and IR spectroscopy.

The following abbreviations are employed:

PP=polypropylene

MC=metallocene

Cat=supported catalyst system h=hour

VN=viscosity number in cm$^3$/g $M_w$=weight average molar mass of the polymer in g/mol $M_w/M_n$=polydispersity, determined by gel permeation chromatography (GPC)

MFR=melt flow rate, measured at 230° C. with a load of 2.16 kg (ISO 1133)

m.p.=polymer melting point in ° C., determined by differential scanning calorimetry (DSC, ISO 3146) with a $1^{st}$ heating/cooling/$2^{nd}$ heating rate of 20° C./min $T_g$=glass transition temperature in ° C., determined by differential scanning calorimetry (DSC, conditions see above)

Room temperature: 20° C.

The ethylene content of copolymers was determined by IR and $^{13}$C-NMR spectroscopy.

Example 1

Preparation of Di-n-hexylsilanediylbis(2-methyl-4-(4'-tert-butylphenyl)indene)

10.9 g (41.5 mmoles) of 2-methyl-4-(4'-tert-butylphenyl)-1-indene are introduced into 190 mL of toluene and 11 mL of THF, and 17.4 mL of n-butyllithium (2.5 M in toluene) are added without interruption at room temperature. After this addition is complete, the mixture is heated to 80° C. and stirred at this temperature for one hour. It is allowed to cool to 40° C., and then 5.8 mL (20.7 mmoles) of di-n-hexyldichlorosilane are slowly added dropwise. After this addition, the reaction solution is stirred for three hours at 60° C. and then overnight at room temperature. 60 mL of water are added, and the phases that form are separated. The organic phase is washed with 100 mL of water, and the aqueous phase is extracted three times with a total of 100 mL of toluene. The combined organic phases are dried over magnesium sulfate. After separation of the magnesium sulfate, the solvent is removed and the residue is purified by column chromatography. The desired product di-n-hexylsilanediyl-bis(2-methyl-4-(4'-tert-butylphenyl)indene) is isolated in a yield of 6.6 g (44%) (purity 98%).

$^1$H-NMR (400 MHz, CDCl$_3$): 7.42–7.04 (m, 14H, arom-H), 6.72 (s, br, 2H, olefin-H indene), 3.60, 3.48 (each s, each 1H, SiC—H), 2.04, 2.02 (each s, each 3H, CH$_3$), 1.33, 1.31 (each s, each 9H, tert-butyl), 1.20–1.02 (m, 16H, aliph-H), 0.78–0.72 (m, 6H, CH$_3$), 0.67–0.50 (m, 4H, aliph-H).

Example 2

Preparation of Di-n-hexylsilanediylbis(2-methyl-4-(4'-tert-butylphenyl)-indenyl)zirconium dichloride 7.3 g (10.1 mmoles) of di-n-hexylsilanediylbis(2-methy-4-(4'-tert-butylphenyl)indene are introduced into 80 mL of diethyl ether, and 8.1 mL of n-butyllithium solution (2.5 M in toluene) are added at room temperature. After this addition is complete, the mixture is stirred overnight at this temperature. It is cooled to 0° C., and then 2.36 g (10.1 mmoles) of zirconium tetrachloride are added in portions. After the addition of 20 mL of diethyl ether, the mixture is allowed to warm to room temperature and is then stirred for two hours at this temperature. The precipitate that forms is separated through a G3 fritted glass filter and washed once with 20 mL of diethyl ether. The residue is then dried in an oil-pump vacuum. The desired product is obtained in a yield of 4.9 g (55%) and a rac:meso ratio>20:1.

$^1$H-NMR (400 MHz, CDCl$_3$): 7.60–6.96 (m, 16H, arom-H), 2.22 (s, 6H, CH$_3$), 1.87–1.35 (m, 20H, aliph-H), 1.31 (s, 18H, tert-butyl), 0.92 (t, 6H, CH$_3$).

Example 3

Preparation of Dimethylsilanediylbis(2-methyl-4-(4'-tert-butyl-phenyl)indenyl)zirconium dichloride 143 g (0.54 moles) of 2-methyl-4-(4'-tert-butylphenyl)-1-indene are introduced into 2.4 L of toluene and 143 mL of tetrahydrofuran, and 234 mL of an n-butyllithium solution (2.5 M in toluene) are added without interruption at room temperature. After this addition is complete, the mixture is heated to 80° C. and stirred for one hour at this temperature. It is allowed to cool to 40° C., then 33.6 g (0.26 moles) of dimethyldichlorosilane are added dropwise to this reaction solution. The reaction solution is stirred for three hours at 60° C. It is cooled to room temperature, and then 218 mL of an n-butyllithium solution (2.5 M in toluene) are added dropwise. After this addition is complete, the solution is heated to 80° C. and stirred for one hour at this temperature. It is allowed to cool to room temperature, then 71.1 g (0.305 moles) of zirconium tetrachloride are added in portions. The solution is stirred for two hours at 45° C. and the precipitate that forms is separated by filtration through a G3 fritted glass filter and then carefully washed with 700-mL portions of tetrahydrofuran. The residue is dried in an oil-pump vacuum, and the product is obtained in a yield of 155 g (80%) and with a rac:meso ratio of 1:1. The isomers must be separated in an additional step to obtain selective catalysts for propylene polymerization.

$^1$H-NMR (400 MHz, CDCl$_3$): 7.63–6.85 (m, 16H, arom-H), 2.44 (s, 3H, meso-CH$_3$), 2.24 (s, 3H, rac-CH$_3$), 1.46 (s, 1.5H, meso-SiMe$_2$), 1.33–1.29 (m, 21 H, tert-butyl, rac-SiMe$_2$), 1.23 (s, 1.5H, meso-CH$_3$).

Example 4

Preparation of Dimethylbis(2-methyl-4,5-benzoindenyl)silane

A solution of 7.0 g (38.8 mmoles) of the isomeric mixture of 2-methyl-4,5-benzoindene and 2-methyl-6,7-benzoindene in 65 mL of tetrahydrofuran is treated with 15.6 mL of an n-butyllithium solution (2.5 M in hexane) and heated under reflux for one hour. The resulting red solution is then added dropwise at room temperature to a solution of 2.51 g (19.4 mmoles) of dimethyldichlorosilane in 10 mL of THF, and the resulting solution is heated under reflux for 5–6 hours. The reaction solution is then cooled to room temperature and poured into ice water. The aqueous phase is repeatedly extracted with 60 mL of diethyl ether. After the organic phase has been dried with magnesium sulfate, the solvent is removed and the residue is purified by column chromatography. The desired product is isolated in a yield of 4.85 g (60%).

$^1$H-NMR (400 MHz, CDCl$_3$): 8.01–7.36 (m, 12H, arom-H), 7.21 (s, br, 2H, olefin-H indene), 3.96 (s, 2H, SiC—H), 2.43 (s, 6H, CH$_3$), −0.22 (s, 6H, SiMe$_2$).

Example 5

Preparation of Dimethylsilanediylbis(2-methyl-4,5-benzoindenyl)zirconium dichloride A solution of 3.0 g (7.2 mmoles) of dimethylbis(2-methyl-4,5-benzo-indenyl)silane in 30 mL of tetrahydrofuran is treated with 5.8 mL of an n-butyllithium solution (2.5 M in hexane) and stirred for 16 hours at room temperature. The reaction solution is cooled to 0° C. and 1.68 g (7.2 mmoles) of zirconium tetrachloride are added in portions. After this addition, the solution is warmed to room temperature and stirred for two hours at this temperature. The precipitate that forms is filtered through a G3 fritted glass filter and the residue is washed once with 5 mL of diethyl ether. The residue is then dried in a vacuum, and the desired product is obtained in a yield of 2.32 g (56%) with a rac:meso ratio of about 1:1. The isomers must be separated in a subsequent step to obtain selective catalysts for propylene polymerization.

$^1$H-NMR (400 MHz, CDCl$_3$): 7.85–7.10 (m, 14H, arom-H), 2.25 (s, 6H, CH$_3$), 1.30 (s, 6 H, CH$_3$).

Example 6

Preparation of Dimethylbis(2-methylindenyl)silane 8.0 g (61.4 mmoles) of 2-methylindene are introduced into 175 mL of toluene and 13 mL of THF, and 24.6 mL of n-butyllithium (2.5 M in toluene) are added without interruption at room temperature. After this addition is complete, the mixture is heated to 80° C. and stirred at this temperature for one hour. It is allowed to cool to 40° C., then 3.96 g (30.7 mmoles) of dimethyldichlorosilane are slowly added dropwise. After this addition, the reaction solution is stirred for three hours at 60° C. and then overnight at room temperature. 70 mL of water are added and the phases that form are separated. The organic phase is washed with 100 mL of water, and the aqueous phase is extracted three times with a total of 100 mL of toluene. The combined organic phases are dried over magnesium sulfate. After separation of the magnesium sulfate, the solvent is removed and the residue is purified by column chromatography. The desired product is isolated in a yield of 8.16 g (84%) (purity 99%).

$^1$H-NMR (400 MHz, CDCl$_3$): 7.55–7.12 (m, 8H, arom-H), 6.40 (s, br, 2H, olefin-H indene), 3.51, 3.48 (each s, each 1H, SiC—H), 2.09, 2.04 (each s, each 3H, CH$_3$), 1.71 (s, 6H, CH$_3$), 0.08 (s, 6H, SiMe$_2$)

Example 7

Preparation of Dimethylsilanediylbis(2-methylindenyl)zirconium dichloride

A solution of 5.0 g (15.8 mmoles) of dimethylbis(2-methylindenyl)silane in 45 mL of tetrahydrofuran is treated with 12.6 mL of an n-butyllithium solution (2.5 M in hexane) and stirred for 16 hours at room temperature. The reaction solution is cooled to 0° C. and 1.84 g (7.9 mmoles) of zirconium tetrachloride are added in portions. After this addition, the solution is heated to room temperature and stirred for two hours at this temperature. The precipitate that forms is filtered through a G3 fritted glass filter, and the residue is washed once with 10 mL of diethyl ether. The residue is then dried in a vacuum, and the desired product is obtained in a yield of 1.89 g (50%) with a rac:meso ratio close to 1:1. The isomers must be separated in a subsequent step to obtain selective catalysts for propylene polymerization.

$^1$H-NMR (400 MHz, CDCl$_3$): 7.75–6.85 (m, 10H, arom-H), 2.24 (s, 6H, CH$_3$), 1.25 (s, 6H, aliph-H).

Example 8

Preparation of Dimethylbis(2-methyl-4-phenylindenyl)silane 8.0 g (38.8 mmoles) of 2-methyl-4-phenylindene are introduced into 180 mL of toluene and 10 mL of THF, then 15.5 mL of n-butyllithium solution (2.5 M in toluene) are added without interruption at room temperature. After this addition is complete, the mixture is heated to 80° C. and stirred at this temperature for one hour. It is allowed to cool to 40° C., then 2.5 g (19.4 mmoles) of dimethyldichlorosilane are slowly added dropwise. After this addition, the reaction solution is stirred for three hours at 60° C. and then overnight at room temperature. 80 mL of water are added and the phases that form are separated. The organic phase is washed with 80 mL of water, and the aqueous phase is extracted three times with a total of 80 mL of toluene. The combined organic phases are dried over magnesium sulfate. After separation of the magnesium sulfate, the solvent is removed and the residue is purified by column chromatography. The desired product is isolated in a yield of 7.27 g (80%) (purity 97%).

$^1$H-NMR (400 MHz, CDCl$_3$): 7.73–7.12 (m, 16H, arom-H), 6.75 (s, br, 2H, olefin-H indene), 3.76 (s, 2H, SiC—H), 2.17 (s, 6H, CH$_3$), −0.20 (m, 6H, SiMe$_2$).

Example 9

Preparation of Dimethylsilanediylbis(2-methyl-4-phenylindenyl)zirconium dichloride 5.0 g (10.7 mmoles) of dimethylsilanediylbis(2-methyl-4-phenyl)indene are introduced into 80 mL of diethyl ether, and 8.6 mL of an n-butyllithium solution (2.5 M in toluene) are added at room temperature. After this addition is complete, the mixture is stirred overnight at this temperature. It is cooled to 0° C., then 2.49 g (10.7 mmoles) of zirconium tetrachloride are added in portions. 20 mL of diethyl ether are added, then the solution is heated to room temperature and stirred for two hours at this temperature. The precipitate that forms is filtered through a G3 fritted glass filter and washed once with 20 mL of diethyl ether. The residue is then dried in an oil-pump vacuum, and the desired product is obtained in a yield of 3.70 g (55%) with a rac:meso ratio close to 1:1. The isomers must be separated in a subsequent step to obtain selective catalysts for propylene polymerization.

$^1$H-NMR (400 MHz, CDCl$_3$): 7.69–6.93 (m, 18H, arom-H), 2.24 (s, 6H, CH$_3$), 1.30 (s, 6H, SiMe$_2$)

Example 10

Preparation of Di-n-hexylgermanediylbis(2-methyl-4-(4'-tert-butylphenyl)indene)

12.3 g (46.9 mmoles) of 2-methyl-4-(4'-tert-butylphenyl)-1-indene are introduced into 190 mL of toluene and 11 mL of THF, and 18.8 mL of n-butyllithium (2.5 M in toluene) are added without interruption at room temperature. After this addition is complete, the mixture is heated to 80° C. and stirred at this temperature for one hour. It is allowed to cool to 40° C., then 7.4 g (23.5 mmoles) of di-n-hexyldichlorogermane are slowly added dropwise. After this addition, the reaction solution is stirred for three hours at 60° C. and then overnight at room temperature. 70 mL of water are added and the phases that form are separated. The organic phase is washed with 100 mL of water, and the aqueous phase is extracted three times with a total of 100 mL of toluene. The combined organic phases are dried over magnesium sulfate. After separation of the magnesium sulfate, the solvent is removed, and the residue is purified by column chromatography. The desired product, i.e., di-n-hexylgermanediylbis(2-methyl-4-(4'-tert-butylphenyl)indene), is isolated in a yield of 11.0 g (61%) (purity 95%).

$^1$H-NMR (400 MHz, CDCl$_3$): 7.50–7.14 (m, 14H, arom-H), 6.75 (s, br, 2H, olefin-H indene), 3.63, 3.50 (each s, each 1H, SiC—H), 2.06, 2.02 (each s, each 3H, CH$_3$), 1.36, 1.33 (each s, each 9H, tert-butyl), 1.23–1.07 (m, 16H, aliph-H), 0.79–0.71 (m, 6H, CH$_3$), 0.65–0.50 (m, 4H, aliph-H).

Example 11

Preparation of Di-n-hexylgermanediylbis(2-methyl-4-(4'-tert-butylphenyl)-indenyl)zirconium dichloride 6.3 g (8.2 mmoles) of di-n-hexylgermanediylbis(2-methyl-4-(4'-tert-butylphenyl)indene are introduced into 80 mL of diethyl ether, and 6.6 mL of n-butyllithium solution (2.5 M in toluene) are added at room temperature. After this addition is complete, the mixture is stirred overnight at this temperature. It is cooled to 0° C., and then 1.9 g (8.2 mmoles) of zirconium tetrachloride are added in portions. After the addition of 20 mL of diethyl ether, the mixture is allowed to warm to room temperature and is then stirred for two hours at this temperature. The precipitate that forms is separated through a G3 fritted glass filter and washed once with 10 mL of diethyl ether. The residue is then dried in an oil-pump vacuum. The desired product is obtained in a yield of 3.6 g (47%) and a rac:meso ratio>20:1.

$^1$H-NMR (400 MHz, CDCl$_3$): 7.74–7.03 (m, 16H, arom-H), 2.23 (s, 6H, CH$_3$), 1.92–1.40 (m, 20 H, aliph-H), 1.36 (s, 18H, tert-butyl), 0.94 (t, 6H, CH$_3$).

Example 12

Preparation of Cyclohexyl(methyl)silanediylbis(2-methyl-4-(4'-tert-butyl-phenyl)indene)

4.0 g (15.2 mmoles) of 2-methyl-4-(4'-tert-butylphenyl)-1-indene are introduced into 68 mL of toluene and 4 mL of THF, and 6.5 mL of n-butyllithium (2.5 M in toluene) are added without interruption at room temperature. After this addition is complete, the mixture is heated to 80° C. and stirred at this temperature for one hour. It is allowed to cool to 40° C., then 5.8 mL (20.7 mmoles) of cyclohexyl(methyl) dichlorosilane are slowly added dropwise. After this addition, the reaction solution is stirred for three hours at 60° C. and then overnight at room temperature. 50 mL of water are added and the phases that form are separated. The organic phase is washed with 25 mL of water, and the aqueous phase is extracted twice with a total of 20 mL of toluene. The combined organic phases are dried over magnesium sulfate. After separation of the magnesium sulfate, the solvent is removed, and the residue is purified by column chromatography. The desired product, i.e., cyclohexyl(methyl)silanediylbis(2-methyl-4-(4'-tert-butylphenyl)indene) is isolated in a yield of 2.35 g (48%) (purity 97%).

$^1$H-NMR (400 MHz, CDCl$_3$): 7.45–7.02 (m, 14H, arom-H), 6.76 (s, 1H, olefin-H indene), 3.61 (s, 1H, SiC—H), 3.50 (s, 2H, benzyl-H), 2.21, 2.06 (each s, each 3H, CH$_3$), 1.81–1.23 (m, 11H, aliph-H), 1.38, 1.37 (each s, each 9H, tert-butyl), 0.18 (s, 3H, Me).

Example 13

Preparation of Cyclohexyl(methyl)silanediylbis(2-methyl-4-(4'-tert-butyl-phenyl)indenyl)zirconium dichloride 7.0 g (10.8 mmoles) of cyclohexyl(methyl)silanediylbis(2-methyl-4-(4'-tert-butylphenyl)indene) are introduced into 70 mL of diethyl ether, and 8.6 mL of an n-butyllithium solution (2.5 M in toluene) are added at room temperature. After this addition is complete, the mixture is stirred overnight at this temperature. It is cooled to 0° C., and then 2.51 g (10.8 mmoles) of zirconium tetrachloride are added in portions. The solution is stirred for two hours at room temperature. The precipitate that forms is separated by filtration through a G3 fritted glass filter and washed twice with 6 mL of diethyl ether. The residue is then dried in an oil-pump vacuum, and the desired product is obtained in a yield of 4.66 g (53%) with a rac:meso ratio>20:1.

$^1$H-NMR (400 MHz, CDCl$_3$): 7.40–6.97 (m, 16H, arom-H), 2.22 (s, 6H, CH$_3$), 2.19–1.46 (m, 11 H, aliph-H), 1.32 (s, 18H, tert-butyl), 1.27 (s, 3H, CH$_3$).

Example 14

Preparation of (2-methyl-4-(4'-tert-butylphenyl)-1-indenyl)dimethylchloro-silane 20 g (76 mmoles) of 2-methyl-4-(4'-tert-butylphenyl)-1-indene are introduced into 160 mL of toluene and 5.0 mL of DME, and 28.4 mL of an n-butyllithium solution (2.68 M in toluene) are added dropwise at room temperature. After this addition is complete, the mixture is heated to 80° C. and stirred for one hour at this temperature. It is then slowly added to a solution of 27.7 mL (229 mmoles) of dimethylsichlorosilane in 260 mL of THF, which has been cooled to −40° C. The mixture is allowed to warm to room temperature and is stirred overnight. The solvent is removed in an oil-pump vacuum and the residue is dissolved in 100 mL of toluene. The insoluble lithium chloride is filtered through a G4 glass filter. The solvent is removed in an oil-pump vacuum. The desired product is obtained in a yield of 24.8 g (98%).

$^1$H-NMR(400 MHz, CDCl$_3$) 7.3–7.0 (m, 7H, arom-H), 6.7 (s, 1H, olefin-H-indene) 3.5 (s, 1H, H-indene), 2.1 (s, 3H, CH3), 1.3 (s, 9H, tert-butyl), 0.3, 0.05 (each s, each 3H, CH$_3$—Si).

Example 15

Preparation of Dimethylsilanediyl(2-methyl-4-(4'-tert-butylphenyl)-1-indene)(2-isopropyl-4-(4'-tert-butylphenyl)-1-indene)

16.8 g (57.7 mmoles) of 2-isopropyl-4-(4'-tert-butylphenyl)-1-indene are introduced into 131 mL of toluene and 5.0 mL of THF, and 21.5 mL of an n-butyllithium solution (2.68 M in toluene) are added without interruption at room temperature. After this addition is complete, the mixture is heated to 80° C. and stirred for one hour at this temperature. It is then allowed to cool to room temperature. The resulting reaction solution is added dropwise to a solution of 20.5 g (57.7 mmoles) of (2-methyl-4-(4'-tert-butylphenyl)-1-indenyl)dimethylchlorosilane in 246 mL of toluene over a period of one hour. The mixture is stirred overnight at room temperature. Then 60 mL of water are added and the phases which form are separated. The organic phase is washed with 100 mL of water and the combined aqueous phases are extracted twice with a total of 100 mL of toluene. The combined organic phases are dried over magnesium sulfate. After filtering off the magnesium sulfate, the solvent is removed and the residue is dried in an oil pump vacuum. The desired product is isolated in a yield of 31.6 g (90%) (purity: 90%).

$^1$H-NMR (400 MHz, CDCl$_3$): 7.51–7.1 (m, 14H, arom-H), 6.71, 6.62 (each s, each 1 H, olefin-H-indene), 3.35, 3.31 (each s, each 2H, CH$_2$—H), 2.65 (m, 1H, CH-isopropyl), 2.41 (s, 3H CH$_3$—H), 1.35, 1.33 (each s, each 9H, tert-butyl), 1.15 (d, 6H, isopropyl-CH$_3$), 0.2, 0.0 (each d, each 3H, SiCH$_3$).

Example 16

Preparation of Dimethylsilanediyl(2-methyl-4-(4'-tert-butylphenyl)indenyl)(2-isopropyl-4-(4'-tert-butylphenyl)indenyl)zirconium dichloride 36.6 g (60 mmoles) of dimethylsilanediyl(2-methyl-4-(4'-tert-butylphenyl)-1-indene)(2-isopropyl-4-(4'-tert-butylphenyl)-1-indene) are introduced into 366 ml of diethyl ether, and 44.9 mL of an n-butyllithium solution (2.68 M in toluene) are added without interruption at room temperature. After this addition is complete, the mixture is stirred over night at this temperature. It is then cooled to 0° C. and 14.0 g (60 mmoles) of zirconium tetrachloride are added in portions. The mixture is allowed to warm to room temperature and is stirred for another two hours at this temperature. The precipitate that forms is separated by filtration through a G3 fritted glass filter and is washed with two 50 mL portions of tetrahydrofuran and with one 70 mL portion of pentane. The residue is dried in an oil-pump vacuum, and the product is obtained in a yield of 23.5 g (50%) and with a rac:meso ratio of about 1:1. The isomers must be separated in a subsequent step to obtain selective catalysts for propylene polymerization.

$^1$H-NMR (400 MHz, CDCl$_3$): 7.7–6.9 (m, 14H, arom-H), 3.26 (m, 1H, CH-isopropyl), 2.23 (s, 3H, CH$_3$), 1.31 (s, 18H, tert-butyl), 1.33, 1.32 (each s, each 3H, Si—CH$_3$), 1.08, 1.03 (each d, each 3H, isopropyl-CH$_3$).

Example 17a

Preparation of Methylaluminoxane Treated Silica

To a stirred suspension of 22.4 g of silica (Grace XPO2107, dried at 180° C. and 1 mbar for 16 hours, LOD<0.5 wt % and LOI=2.6 wt %) in 112 mL of toluene is added slowly 57 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 112 mL portions of toluene and three 112 mL portions of isohexane and dried in vacuum to constant weight. The methylaluminoxane treated silica is obtained as a free-flowing powder in a yield of 36.2 g.

Example 17b

Preparation of Methylaluminoxane Treated Silica

To a stirred suspension of 29.0 g of silica (Grace XPO2107, dried at 90° C. and 1 mbar for 16 hours, LOD=0.9 wt % and LOI=2.6 wt %) in 145 mL of toluene is added slowly 73 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 145 mL portions of toluene and three 145 mL portions of isohexane and dried in vacuum to constant weight. The methylaluminoxane treated silica is obtained as a free-flowing powder in a yield of 53.7 g.

Example 17c

Preparation of Methylaluminoxane Treated Silica

To a stirred suspension of 28.1 g of silica (Grace XPO2107, evacuated and purged five times with argon, LOD>2wt %) in 140 mL of toluene is added slowly 71 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 140 mL portions of toluene and three 140 mL portions of isohexane and dried in vacuum to constant weight. The methylaluminoxane treated silica is obtained as a free-flowing powder in a yield of 49.8 g. In comparison to Examples 17a and 17b, a more violent reaction can be observed while adding the MAO. The obtained methylaluminoxane treated silica exhibits a large amount of small particles (fragments).

Example 18a

Preparation of Supported Metallocene Catalyst 17.5 g of the methylaluminoxane treated silica prepared in Example 17a are placed in a fritted glass filter as a column with a smooth surface. In a separate flask 313 mg of rac-dimethylsilanediylbis(2-methyl-4,5-benzoindenyl)zirconium dichloride are mixed with 44 mL of toluene and 4.9 mL of a 30 wt-% solution of methylaluminoxane in toluene (Albemarle Corporation). The slurry is stirred at room temperature for one hour to give a deeply red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 17.1 g.

Example 18b

Preparation of Supported Metallocene Catalyst 17.0 g of the methylaluminoxane treated silica prepared in Example 17b are placed in a fritted glass filter as a column with a smooth surface. In a separate flask 265 mg of rac-dimethylsilanediylbis(2-methyl-4,5-benzoindenyl)zirconium dichloride are mixed with 40 mL of toluene and 4.2 mL of a 30 wt-% solution of methylaluminoxane in toluene (Albemarle Corporation). The slurry is stirred at room temperature for one hour to give a deeply red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 16.2 g.

Example 18c

Preparation of Supported Metallocene Catalyst 15.4 g of the methylaluminoxane treated silica prepared in Example 17c are placed in a fritted glass filter as a column with a smooth surface. In a separate flask 251 mg of rac-dimethylsilanediylbis(2-methyl-4,5-benzoindenyl)zirconium dichloride are mixed with 36 mL of toluene and 4.0 mL of a 30 wt-% solution of methylaluminoxane in toluene (Albemarle Corporation). The slurry is stirred at room temperature for one hour to give a deeply red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 20.1 g.

Comparative Example 19

Preparation of Methylaluminoxane Treated Silica

To a stirred suspension of 8.3 g of silica (Grace XPO2107, dried at 180° C. and 1 mbar for 16 hours, LOD<0.5 wt % and LOI=2.6 wt %) in 41 mL of toluene is added slowly 20.9 mL of a 30 wt-% solution of methylaluminoxane in toluene (Albemarle Corporation) at room temperature. During the addition the temperature must not exceed 30° C. After the addition is complete, the mixture is stirred for two hours at room temperature. The solvent is filtered off and the MAO treated silica is dried in a stream of nitrogen.

Comparative Example 20

Preparation of Supported Metallocene Catalyst

The methylaluminoxane treated silica prepared in Comparative Example 19 is placed in a fritted glass filter as a column with a smooth surface. In a separate flask 239 mg of rac-dimethylsilanediylbis(2-methyl-4,5-benzoindenyl)zirconium dichloride are mixed with 34 mL of toluene and 3.9 mL of a 30 wt-% solution of methylaluminoxane in toluene (Albemarle Corporation). The slurry is stirred at room temperature for one hour to give a deep red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 14.5 g.

Comparative Example 21

Preparation of Methylaluminoxane Treated Silica

To a stirred suspension of 19.7 g of silica (Grace XPO2107, dried at 180° C. and 1 mbar for 16 hours, LOD<0.5 wt % and LOI=2.6 wt %) in 98 mL of toluene is added slowly 20 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 100 mL portions of toluene and three 100 mL portions of isohexane and dried in vacuum to constant weight. The methylaluminoxane treated silica is obtained as a free-flowing powder in a yield of 24.3 g.

Comparative Example 22

Preparation of Supported Metallocene Catalyst 10.3 g of the methylaluminoxane treated silica prepared in Comparative Example 21 are placed in a fritted glass filter as a column with a smooth surface. In a separate flask 243 mg of rac-dimethylsilanediylbis(2-methyl-4,5-benzoindenyl)zirconium dichloride are mixed with 34 mL of toluene and 16.4 mL of a 30 wt-% solution of methylaluminoxane in toluene (Albemarle Corporation). The slurry is stirred at room temperature for one hour to give a deep red solution.

This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as a free-flowing powder in a yield of 14.4 g.

Comparative Example 23

Preparation of Methylaluminoxane Treated Silica

To a stirred suspension of 16.0 g of silica (Grace XPO2107, dried at 180° C. and 1 mbar for 16 hours, LOD<0.5 wt % and LOI=2.6 wt %) in 80 mL of toluene is added slowly 16.3 mL of a 30 wt-% solution of methylaluminoxane in toluene (Albemarle Corporation) at room temperature. During the addition the temperature must not exceed 30° C. After the addition is complete, the mixture is stirred for two hours at room temperature. The solvent is filtered off and the MAO treated silica is dried in a stream of nitrogen.

Comparative Example 24

Preparation of Supported Metallocene Catalyst

The methylaluminoxane treated silica prepared in Comparative Example 23 is placed in a fritted glass filter as a column with a smooth surface. In a separate flask 464 mg of rac-dimethylsilanediylbis(2-methyl-4,5-benzoindenyl)zirconium dichloride are mixed with 65 mL of toluene and 31.6 mL of a 30 wt-% solution of methylaluminoxane in toluene (Albemarle Corporation). The slurry is stirred at room temperature for one hour to give a deep red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as a free-flowing powder in a yield of 26.5 g.

Comparative Example 25

Preparation of Methylaluminoxane Treated Silica

To a stirred suspension of 9.8 g of silica (Grace XPO2107, dried at 180° C. and 1 mbar for 16 hours, LOD<0.5 wt % and LOI=2.6 wt %) in 49 mL of toluene is added slowly 10.0 mL of a 30 wt-% solution of methylaluminoxane in toluene (Albemarle Corporation) at room temperature. During the addition the temperature must not exceed 30° C. After the addition is complete, the mixture is stirred for two hours at room temperature. The solvent is filtered off, the MAO treated silica is washed three times with 75 ml-portions of isohexane and dried in a stream of nitrogen.

Comparative Example 26

Preparation of Supported Metallocene Catalyst

The methylaluminoxane treated silica prepared in Comparative Example 25 is placed in a fritted glass filter as a column with a smooth surface. In a separate flask 283 mg of rac-dimethylsilanediylbis(2-methyl-4,5-benzoindenyl)zirconium dichloride are mixed with 40 mL of toluene and 19.3 mL of a 30 wt-% solution of methylaluminoxane in toluene (Albemarle Corporation). The slurry is stirred at room temperature for one hour to give a deep red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 16.6 g.

Comparative Example 27

Preparation of Supported Metallocene Catalyst 13.1 g of the methylaluminoxane treated silica prepared in Example 17a are suspended in 80 mL of toluene. In a separate flask 234 mg of rac-dimethylsilanediylbis(2-methyl-4,5-benzoindenyl)zirconium dichloride are mixed with 20 mL of toluene and 3.8 mL of a 30 wt-% solution of methylaluminoxane in toluene (Albemarle Corporation). The slurry is stirred at room temperature for one hour to give a deep red solution and then added to the methylaluminoxane treated silica suspension. The metallocene flask is rinsed with 20 mL of toluene. The catalyst mixture is stirred for two hours at room temperature. Then the solvent is filtered off, the catalyst is washed with three 140 mL portions of isohexane and dried to constant weight in a stream of nitrogen. The catalyst is obtained as free-flowing powder in a yield of 14.0 g.

Comparative Example 28

Preparation of Methylaluminoxane Treated Silica

To a stirred suspension of 21.0 g of silica (Grace XPO2107, dried at 180° C. and 1 mbar for 16 hours, LOD<0.5 wt % and LOI=2.6 wt %) in 105 mL of toluene is added slowly 62.5 mL of a 30 wt-% solution of methylaluminoxane in toluene (Albemarle Corporation) at room temperature. During the addition the temperature must not exceed 30° C. After the addition is complete, the mixture is stirred for two hours at room temperature. The solvent is filtered off, the residue washed with two 100 mL portions of toluene and three 100 mL portions of isohexane and dried in vacuum to constant weight. The MAO treated silica is obtained as free-flowing powder in a yield of 30.9 g.

Comparative Example 29

Preparation of Supported Metallocene Catalyst 12.2 g of the methylaluminoxane treated silica prepared in Comparative Example 28 are suspended in 41 mL of toluene. In a separate flask 240 mg of rac-dimethylsilanediylbis(2-methyl-4,5-benzoindenyl)zirconium dichloride are mixed with 41 mL of toluene. The metallocene suspension is stirred for 5 minutes and then added to the methylaluminoxane treated silica suspension. The metallocene flask is rinsed with 5 mL of toluene. The catalyst mixture is stirred for two hours at room temperature. Then the solvent is filtered off, the catalyst is washed with three 115 mL portions of isohexane and dried to constant weight in a stream of nitrogen. The catalyst is obtained as free-flowing powder in a yield of 14.9 g.

Comparative Example 30

Preparation of Methylaluminoxane Treated Silica

To a stirred suspension of 28.3 g of silica (Grace XPO2107, dried at 180° C. and 1 mbar for 16 hours, LOD<0.5 wt % and LOI=2.6 wt %) in 141 mL of toluene is added slowly 84.5 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 280 mL portions of toluene and three 280 mL portions of isohexane and dried in vacuum to constant weight. The methylaluminoxane treated silica is obtained as a free-flowing powder in a yield of 41.8 g.

Comparative Example 31

Preparation of Supported Metallocene Catalyst 11.5 g of the methylaluminoxane treated silica prepared in Example 30 are suspended in 69 mL of toluene. In a separate flask 231 mg of rac-dimethylsilanediylbis(2-methyl-4,5-benzoindenyl)zirconium dichloride are mixed with 20 mL of toluene. The metallocene suspension is stirred for 5 minutes and then added to the methylaluminoxane treated silica suspension. The metallocene flask is rinsed with 5 mL of toluene. The catalyst mixture is stirred for two hours at room temperature. Then the solvent is filtered off, the catalyst is washed with three 115 mL portions of isohexane and dried to constant weight in a stream of nitrogen. The catalyst is obtained as free-flowing powder in a yield of 11.4 g.

Comparative Example 32

Preparation of Methylaluminoxane Treated Silica

To a stirred suspension of 25.0 g of silica (Grace XPO2107, dried at 180° C. and 1 mbar for 16 hours, LOD<0.5 wt % and LOI=2.6 wt %) in 250 mL of toluene is added slowly 80.0 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 250 mL portions of toluene and three 250 mL portions of isohexane and dried in vacuum to constant weight. The methylaluminoxane treated silica is obtained as a free-flowing powder in a yield of 42.1 g.

Comparative Example 33

Preparation of Supported Metallocene Catalyst 11.8 g of the methylaluminoxane treated silica prepared in Example 32 are suspended in 34 mL of toluene and cooled to 0° C. by means of an ice bath. In a separate flask 203 mg of rac-dimethylsilanediylbis(2-methyl-4,5-benzoindenyl)zirconium dichloride are mixed with 34 mL of toluene and also cooled to 0° C. The metallocene suspension is stirred for 5 minutes and then added to the methylaluminoxane treated silica suspension. The catalyst mixture is stirred for two hours at 0° C. Then the solvent is filtered off, the catalyst is washed with three 120 mL portions of isohexane and dried to constant weight in a stream of nitrogen. The catalyst is obtained as free-flowing powder in a yield of 11.4 g.

Example 34

Preparation of Supported Metallocene Catalyst 16.5 g of the methylaluminoxane treated silica prepared in Example 17a are placed in a fritted glass filter as a column with a smooth surface. In a separate flask 296 mg of rac-dimethylsilanediylbis(2-methyl-4,5-benzoindenyl)zirconium dichloride are mixed with 40 mL of toluene and 4.8 mL of a 30 wt-% solution of methylaluminoxane in toluene (Albemarle Corporation). The slurry is stirred at room temperature for one hour to give a deep red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off, the catalyst is washed three times with 50 mL portions of isohexane and dried in vacuum to constant weight. The catalyst is obtained as free-flowing powder in a yield of 18.5 g.

Example 35

Preparation of Supported Metallocene Catalyst 12.7 g of the methylaluminoxane treated silica prepared in Example 17a are placed in a fritted glass filter. In a separate flask 228 mg of rac-dimethylsilanediylbis(2-methyl-4,5-benzoindenyl)zirconium dichloride are mixed with 33 mL of toluene and 3.7 mL of a 30 wt-% solution of methylaluminoxane in toluene (Albemarle Corporation). The slurry is stirred at room temperature for one hour to give a deep red solution. This solution is then added to the methylaluminoxane treated silica. The mixture is thoroughly stirred by means of a spatula until all solid particles show the same color. The catalyst is then allowed to rest for one hour. The residual solvent is slowly filtered off and the catalyst is dried to constant weight in a stream of nitrogen. The catalyst is obtained as free-flowing powder in a yield of 13.8 g.

Example 36

Preparation of Methylaluminoxane Treated Silica

To a stirred suspension of 30.3 g of silica (Grace XPO2107, dried at 180° C. and 1 mbar for 16 hours, LOD<0.5 wt % and LOI=2.6 wt %) in 156 mL of toluene is added slowly 79 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for one hour. After cooling down to room temperature the solvent is separated by filtration. The residue is washed with two 155 mL portions of toluene and three 155 mL portions of isohexane and dried in vacuum to constant weight. The methylaluminoxane treated silica is obtained as a free-flowing powder in a yield of 55.0 g.

Example 37

Preparation of Supported Metallocene Catalyst 16.5 g of the methylaluminoxane treated silica prepared in Example 36 are placed in a fritted glass filter as a column with a smooth surface. In a separate flask 262 mg of rac-dimethylsilanediylbis(2-methyl-4,5-benzoindenyl)zirconium dichloride are mixed with 37 mL of toluene and 4.2 mL of a 30 wt-% solution of methylaluminoxane in toluene (Albemarle Corporation). The slurry is stirred at room temperature for one hour to give a deep red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 17.0 g.

Example 38

Preparation of Methylaluminoxane Treated Silica

To a stirred suspension of 29.0 g of silica (Grace XPO2107, dried at 180° C. and 1 mbar for 16 hours, LOD<0.5 wt % and LOI=2.6 wt %) in 145 mL of toluene is added slowly 62.1 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for 4 hours. After cooling down to room temperature the solvent is separated by filtration. The residue is washed with two 145 mL portions of toluene and three 145 mL portions of isohexane and dried in vacuum to constant weight. The methylaluminoxane treated silica is obtained as a free-flowing powder in a yield of 49.8 g.

Example 39

Preparation of Supported Metallocene Catalyst 16.5 g of the methylaluminoxane treated silica prepared in Example 38 are placed in a fritted glass filter as a column with a smooth surface. In a separate flask 277 mg of rac-dimethylsilanediylbis(2-methyl-4,5-benzoindenyl)zirconium dichloride are mixed with 40 mL of toluene and 6.5 mL of a 30 wt-% solution of methylaluminoxane in toluene (Albemarle Corporation). The slurry is stirred at room temperature for one hour to give a deep red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 17.2 g.

Example 40

Preparation of Methylaluminoxane Treated Silica

To a stirred suspension of 29.2 g of a spray-dried silica (mean particle diameter: 20 microns; specific surface: 310 m²/g; pore volume: 1.5 ml/g; dried at 180° C. and 1 mbar for 16 hours, LOD<0.3 wt % and LOI=2.5 wt %) in 146 mL of toluene is added slowly 74 mL of a 30 wt-% solution of methylaluminoxane in toluene (Albemarle Corporation) at room temperature. During the addition the temperature must not exceed 30° C. After the addition is complete, the mixture is stirred for half an hour at room temperature and then heated and allowed to reflux for four hours. After cooling down to room temperature the solvent is separated by filtration. The residue is washed with two 150 mL portions of toluene and three 150 mL portions of isohexane and dried in vacuum to constant weight. The methylaluminoxane treated silica is obtained as a free-flowing powder in a yield of 53.2 g.

Example 41

Preparation of Supported Metallocene Catalyst 14.9 g of the methylaluminoxane treated silica prepared in Example 40 are placed in a fritted glass filter as a column with a smooth surface. In a separate flask 236 mg of rac-dimethylsilanediylbis(2-methyl-4,5-benzoindenyl)zirconium dichloride are mixed with 34 mL of toluene and 3.8 mL of a 30 wt-% solution of methylaluminoxane in toluene (Albemarle Corporation). The slurry is stirred at room temperature for one hour to give a deep red solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 14.7 g.

Example 42

Production of Supported Metallocene Catalyst 20 kg of a supported catalyst are prepared according to Examples 17a and 18a in a pilot plant.

Example 43

Preparation of Supported Metallocene Catalyst 12.7 g of the methylaluminoxane treated silica prepared in Example 17a are placed in a fritted glass filter as a column with a smooth surface. In a separate flask 303 mg of rac-dimethylsilanediyl(2-methyl-4-(4'-tert-butylphenyl)indenyl)(2-isopropyl-4-(4'-tert-butyl-phenyl)indenyl)zirconium dichloride are mixed with 32 mL of toluene and 3.7 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a nitrogen purge. The catalyst is obtained as free-flowing powder in a yield of 14.4 g.

Example 44

Preparation of Supported Metallocene Catalyst 16.7 g of the methylaluminoxane treated silica prepared in Example 17a are placed in a fritted glass filter as a column with a smooth surface. In a separate flask 320 mg of rac-dimethylsilanediyl(2-methyl-4-(4'-tert-butylphenyl)indenyl)(2-isopropyl-4-(4'-tert-butyl-phenyl)indenyl)zirconium dichloride are mixed with 42 mL of toluene and 4.8 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 18.2 g.

Example 45

Preparation of Supported Metallocene Catalyst 14.3 g of the methylaluminoxane treated silica prepared in Example 17a are placed in a fritted glass filter as a column with a smooth surface. In a separate flask 205 mg of rac-dimethylsilanediyl(2-methyl-4-(4'-tert-butylphenyl)indenyl)(2-isopropyl-4-(4'-tert-butyl-phenyl)indenyl)zirconium dichloride are mixed with 35 mL of toluene and 4.1 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 15.6 g.

Comparative Example 46

Preparation of Methylaluminoxane Treated Silica

The methylaluminoxane treated silica is prepared according to Comparative Example 19 employing 8.4 g of silica, 42 mL of toluene and 8.6 mL of a 30 wt-% solution of methylaluminoxane in toluene (Albemarle Corporation).

Comparative Example 47

Preparation of Supported Metallocene Catalyst

The methylaluminoxane treated silica prepared in Comparative Example 46 is placed in a fritted glass filter as a column with a smooth surface. In a separate flask 259 mg of dimethylsilanediyl(2-methyl-4-(4'-tert-butyl phenyl)indenyl)(2-isopropyl-4-(4'-tert-butyl-phenyl)indenyl)zirconium dichloride are mixed with 34 mL of toluene and 16.6 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 14.6 g.

Comparative Example 48

Preparation of Methylaluminoxane Treated Silica

The methylaluminoxane treated silica is prepared according to Comparative Example 19 employing 8.4 g of silica, 42 mL of toluene and 21.3 mL of a 30 wt-% solution of methylaluminoxane in toluene (Albemarle Corporation).

Comparative Example 49

Preparation of Supported Metallocene Catalyst

The methylaluminoxane treated silica prepared in Comparative Example 48 is placed in a fritted glass filter as a column with a smooth surface. In a separate flask 259 mg of dimethylsilanediyl(2-methyl-4-(4'-tert-butylphenyl)indenyl)(2-isopropyl-4-(4'-tert-butyl-phenyl)indenyl)zirconium dichloride are mixed with 34 mL of toluene and 3.9 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 13.6 g.

Comparative Example 50

Preparation of Supported Metallocene Catalyst 11.8 g of the methylaluminoxane treated silica prepared in Comparative Example 30 are suspended in 71 mL of toluene. In a separate flask 247 mg of rac-dimethylsilanediyl(2-methyl-4-(4'-tert-butylphenyl)indenyl)(2-isopropyl-4-(4'-tert-butyl-phenyl)indenyl)zirconium dichloride are mixed with 20 mL of toluene. The metallocene suspension is stirred for 5 minutes and then added to the methylaluminoxane treated silica suspension. The metallocene flask is rinsed with 5 mL of toluene. The catalyst mixture is stirred for two hours at room temperature. Then the solvent is filtered off, the catalyst is washed with three 120 mL portions of isohexane and dried to constant weight in a stream of nitrogen. The catalyst is obtained as free-flowing powder in a yield of 12.6 g.

Example 51

Preparation of Supported Metallocene Catalyst 9.02 g of the methylaluminoxane treated silica prepared in Example 17a are placed in a fritted glass filter as a column with a smooth surface. In a separate flask 133 mg of rac-dimethylsilanediylbis(2-methylindenyl)zirconium dichloride are mixed with 23 mL of toluene and 2.6 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 9.8 g.

Comparative Example 52

Preparation of Methylaluminoxane Treated Silica

The methylaluminoxane treated silica is prepared according to Comparative Example 19, employing 10.25 g of silica, 51 mL of toluene and 10.4 mL of a 30 wt-% solution of methylaluminoxane in toluene (Albemarle Corporation).

Comparative Example 53

Preparation of Supported Metallocene Catalyst

The methylaluminoxane treated silica prepared in Comparative Example 52 is placed in a fritted glass filter as a column with a smooth surface. In a separate flask 244 mg of rac-dimethylsilanediylbis(2-methylindenyl)zirconium dichloride are mixed with 42 mL of toluene and 20.2 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 17.2 g.

Example 54

Preparation of Supported Metallocene Catalyst 14.2 g of the methylaluminoxane treated silica prepared in Example 17a are placed in a fritted glass filter as a column with a smooth surface. In a separate flask 322 mg of rac-dimethylsilanediylbis(2-methyl-4-phenylindenyl)zirconium dichloride are mixed with 35 mL of toluene and 4.1 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 15.3 g.

Comparative Example 55

Preparation of Methylaluminoxane Treated Silica

The methylaluminoxane treated silica is prepared according to Comparative Example 19, employing 8.5 g of silica, 43 mL of toluene and 8.7 mL of a 30 wt-% solution of methylaluminoxane in toluene (Albemarle Corporation).

Comparative Example 56

Preparation of Supported Metallocene Catalyst

The methylaluminoxane treated silica prepared in Comparative Example 55 is placed in a fritted glass filter as a column with a smooth surface. In a separate flask 312 mg of rac-dimethylsilanediylbis(2-methyl-4-phenylindenyl)zirconium dichloride are mixed with 35 mL of toluene and 16.8 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 14.3 g.

Example 57

Preparation of Supported Metallocene Catalyst 13.1 g of the methylaluminoxane treated silica prepared in Example 17a are placed in a fritted glass filter as a column with a smooth surface. In a separate flask 330 mg of rac-cyclohexyl(methyl)silanediylbis(2-methyl-4-(4'-tert-butyl-phenyl)indenyl)zirconium dichloride
are mixed with 33 mL of toluene and 3.8 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 14.9 g.

Comparative Example 58

Preparation of Methylaluminoxane Treated Silica

The methylaluminoxane treated silica is prepared according to Comparative Example 19, employing 9.3 g of silica, 47 mL of toluene and 9.5 mL of a 30 wt-% solution of methylaluminoxane in toluene (Albemarle Corporation).

Comparative Example 59

Preparation of Supported Metallocene Catalyst

The methylaluminoxane treated silica prepared in Comparative Example 58 is placed in a fritted glass filter as a column with a smooth surface. In a separate flask 376 mg of rac-cyclohexyl(methyl)silanediylbis(2-methyl-4-(4'-tert-butyl-phenyl)indenyl)zirconium dichloride are mixed with 38 mL of toluene and 18.3 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 16.2 g.

Example 60

Preparation of Supported Metallocene Catalyst 12.9 g of the methylaluminoxane treated silica prepared in Example 17a are placed in a fritted glass filter as a column with a smooth surface. In a separate flask 298 mg of rac-dimethylsilanediylbis(2-methyl-4-(4'-tert-butyl-phenyl)indenyl)zirconium dichloride are mixed with 33 mL of toluene and 5.4 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 14.3 g.

Example 61

Preparation of Supported Metallocene Catalyst 14.6 g of the methylaluminoxane treated silica prepared in Example 38 are placed in a fritted glass filter as a column with a smooth surface. In a separate flask 314 mg of rac-dimethylsilanediylbis(2-methyl-4-(4'-tert-butyl-phenyl)indenyl)zirconium dichloride are mixed with 42 mL of toluene and 5.8 mL of a 30 wt-% solution of methylaluminoxane in toluene (Albemarle Corporation). The slurry is heated to 40° C. and stirred at this temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 15.6 g.

Comparative Example 62

Preparation of Methylaluminoxane Treated Silica

The methylaluminoxane treated silica is prepared according to Comparative Example 19, employing 7.6 g of silica, 38 mL of toluene and 7.7 mL of a 30 wt-% solution of methylaluminoxane in toluene (Albemarle Corporation).

Comparative Example 63

Preparation of Supported Metallocene Catalyst

The methylaluminoxane treated silica prepared in Comparative Example 62 is placed in a fritted glass filter as a column with a smooth surface. In a separate flask 285 mg of rac-dimethylsilanediylbis(2-methyl-4-(4'-tert-butyl-phenyl)indenyl)zirconium dichloride are mixed with 31 mL of toluene and 15.0 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 13.2 g.

Example 64

Preparation of Supported Metallocene Catalyst 14.4 g of the methylaluminoxane treated silica prepared in Example 17a are placed in a fritted glass filter as a column with a smooth surface. In a separate flask 394 mg of rac-di-n-hexylsilanediylbis(2-methyl-4-(4'-tert-butylphenyl)-indenyl)zirconium dichloride are mixed with 36 mL of toluene and 4.1 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 17.1 g.

Comparative Example 65

Preparation of Methylaluminoxane Treated Silica

The methylaluminoxane treated silica is prepared according to Comparative Example 19, employing 10.8 g of silica, 54 mL of toluene and 11.0 mL of a 30 wt-% solution of methylaluminoxane in toluene (Albemarle Corporation).

Comparative Example 66

Preparation of Supported Metallocene Catalyst

The methylaluminoxane treated silica prepared in Comparative Example 65 is placed in a fritted glass filter as a column with a smooth surface. In a separate flask 476 mg of rac-di-n-hexylsilanediylbis(2-methyl-4-(4'-tert-butylphenyl)-indenyl)zirconium dichloride are mixed with 44 mL of toluene and 21.3 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 17.9 g.

Example 67

Preparation of Supported Metallocene Catalyst 12.9 g of the methylaluminoxane treated silica prepared in Example 17a are placed in a fritted glass filter as a column with a smooth surface. In a separate flask 372 mg of rac-di-n-hexylgermanediylbis(2-methyl-4-(4'-tert-butylphenyl)-indenyl)zirconium dichloride are mixed with 33 mL of toluene and 3.4 mL of a 30 wt-% solution of methylaluminoxane in toluene (Albemarle Corporation). The slurry is stirred at room temperature for one hour to give a deeply colored solution. This solution is carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried to constant weight in a stream of nitrogen. The catalyst is obtained as free-flowing powder in a yield of 14.8 g.

Comparative Example 68

Preparation of Methylaluminoxane Treated Silica

The methylaluminoxane treated silica is prepared according to Comparative Example 19, employing 8.8 g of silica, 44 mL of toluene and 8.9 mL of a 30 wt-% solution of methylaluminoxane in toluene (Albemarle Corporation).

Comparative Example 69

Preparation of Supported Metallocene Catalyst

The methylaluminoxane treated silica prepared in Comparative Example 68 is placed in a fritted glass filter as a column with a smooth surface. In a separate flask 405 mg of rac-di-n-hexylgermanediylbis(2-methyl-4-(4'-tert-butylphenyl)-indenyl)zirconium dichloride are mixed with 36 mL of toluene and 17.3 mL of a 30 wt-% solution of methylaluminoxane in toluene (Albemarle Corporation). The slurry is stirred at room temperature for one hour to give a deeply colored solution. This solution is then carefully added on top of the methylaluminoxane treated silica and slowly filtered off within approximately 30 minutes. When the surface of the colored solution reaches the top of the silica, the filtration process is stopped and the filter cake is carefully and thoroughly stirred by means of a spatula. The catalyst is then allowed to rest for one hour. The residual solvent is filtered off and the catalyst is dried in a nitrogen purge to constant weight. The catalyst is obtained as free-flowing powder in a yield of 14.3 g.

Example 70

Preparation of Supported Metallocene Catalyst 223 mg of rac-dimethylsilanediylbis(2-methyl-4,5-benzoindenyl)zirconium dichloride are dissolved in 3.6 mL of a 30 wt-% solution of methylaluminoxane in toluene (Albemarle Corporation). The solution is diluted with 11 mL of toluene and stirred at room temperature for 1 hour. This solution is then added to 12.4 g of the methylaluminoxane treated silica prepared in Example 17a while stirring. The volume of the impregnation solution is 125% of the pore volume of the support material. After the addition is complete, the mixture is stirred for another 5–10 minutes and then allowed to rest for one hour. The catalyst is dried in a nitrogen purge to constant weight. The catalyst is obtained as free-flowing powder in a yield of 12.9 g.

Example 71

Preparation of Supported Metallocene Catalyst 231 mg of rac-dimethylsilanediylbis(2-methyl-4,5-benzoindenyl)zirconium dichloride are dissolved in 3.7 mL of a 30 wt-% solution of methylaluminoxane in toluene (Albemarle Corporation). The solution is diluted with 14.5 mL of toluene and stirred at room temperature for 1 hour. This solution is then added to 12.9 g of the methylaluminoxane treated silica prepared in Example 17a while stirring. The volume of the impregnation solution is 150% of the pore volume of the support material. After the addition is complete, the mixture is stirred for another 5–10 minutes and then allowed to rest for one hour. The catalyst is dried in a nitrogen purge to constant weight. The catalyst is obtained as free-flowing powder in a yield of 13.3 g.

Example 72

Preparation of Supported Metallocene Catalyst 224 mg of rac-dimethylsilanediylbis(2-methyl-4,5-benzoindenyl)zirconium dichloride are dissolved in 3.6 mL of a 30 wt-% solution of methylaluminoxane in toluene (Albemarle Corporation). The solution is diluted with 19.9 mL of toluene and stirred at room temperature for 1 hour. This solution is then added to 12.5 g of the methylaluminoxane treated silica prepared in Example 17a while stirring. The volume of the impregnation solution is 200% of the pore volume of the support material. After the addition is complete, the mixture is stirred for another 5–10 minutes and then allowed to rest for one hour. The catalyst is dried in a nitrogen purge to constant weight. The catalyst is obtained as free-flowing powder in a yield of 13.5 g.

Example 73

Preparation of Supported Metallocene Catalyst 233 mg of rac-dimethylsilanediylbis(2-methyl-4,5-benzoindenyl)zirconium dichloride are dissolved in 3.7 mL of a 30 wt-% solution of methylaluminoxane in toluene (Albemarle Corporation). The solution is diluted with 26.7 mL of toluene and stirred at room temperature for 1 hour. This solution is then added to 13.0 g of the methylaluminoxane treated silica prepared in Example 17a while stirring. The volume of the impregnation solution is 250% of the pore volume of the support material. After the addition is complete, the mixture is stirred for another 5–10 minutes and then allowed to rest for one hour. The catalyst is dried in a nitrogen purge to constant weight. The catalyst is obtained as free-flowing powder in a yield of 14.0 g.

TABLE 1

Polymerization results (Polymerization Procedure A)

| Polymerization Example | Supported Catalyst | Productivity [g PP/g catalyst × h] |
|---|---|---|
| P 1 | Example 18a | 8,700 |
| P 2 | Example 18b | 7,600 |
| P 3 | Example 18c | 1,900 |
| P 4 | CE Example 20 | 3,800 |
| P 5 | CE Example 22 | 4,200 |
| P 6 | CE Example 24 | 4,500 |
| P 7 | CE Example 26 | 4,400 |
| P 8 | CE Example 27 | 4,700 |
| P 9 | CE Example 29 | 3,300 |
| P 10 | CE Example 31 | 7,400 |
| P 11 | CE Example 33 | 7,200 |
| P 12 | Example 34 | 8,700 |
| P 13 | Example 35 | 7,900 |
| P 14 | Example 37 | 7,700 |
| P 15 | Example 39 | 8,900 |
| P 16 | Example 41 | 8,900 |
| P 17 | Example 42 | 7,500 |
| P 18 | Example 43 | 5,300 |
| P 19 | Example 44 | 4,400 |
| P 20 | Example 45 | 4,800 |
| P 21 | CE Example 47 | 3,100 |
| P 22 | CE Example 49 | 3,800 |
| P 23 | CE Example 50 | 3,400 |
| P 24 | Example 51 | 7,500 |
| P 25 | CE Example 53 | 4,600 |
| P 26 | Example 54 | 6,300 |
| P 27 | CE Example 56 | 2,600 |
| P 28 | Example 57 | 9,300 |
| P 29 | CE Example 59 | 4,200 |
| P 30 | Example 60 | 9,800 |
| P 31 | Example 61 | 10,300 |
| P 32 | CE Example 63 | 4,700 |
| P 33 | Example 64 | 11,400 |
| P 34 | CE Example 66 | 5,100 |
| P 35 | Example 67 | 10,900 |
| P 36 | CE Example 69 | 4,900 |
| P 37 | Example 70 | 7800 |
| P 38 | Example 71 | 8700 |
| P 39 | Example 72 | 7800 |
| P 40 | Example 73 | 7600 |

TABLE 2

Polymerization results using hydrogen as mole weight regulator (Polymerization Procedure B)

| Polymerization Example | Supported Catalyst | Productivity [g PP/g catalyst × h] |
|---|---|---|
| P 41 | Example 18a | 18,000 |
| P 42 | Example 18b | 16,600 |
| P 43 | Example 18c | 3,400 |
| P 44 | CE Example 20 | 6,100 |
| P 45 | CE Example 22 | 7,200 |
| P 46 | CE Example 24 | 8,100 |
| P 47 | CE Example 26 | 8,000 |
| P 48 | CE Example 27 | 8,800 |
| P 49 | CE Example 29 | 5,900 |
| P 50 | CE Example 31 | 11,900 |
| P 51 | CE Example 33 | 13,000 |
| P 52 | Example 34 | 17,600 |
| P 53 | Example 35 | 16,000 |
| P 54 | Example 37 | 15,700 |
| P 55 | Example 39 | 18,100 |
| P 56 | Example 41 | 17,500 |
| P 57 | Example 42 | 16,500 |
| P 58 | Example 43 | 22,400 |
| P 59 | Example 44 | 16,500 |
| P 60 | Example 45 | 18,400 |
| P 61 | CE Example 47 | 12,600 |
| P 62 | CE Example 49 | 15,300 |
| P 63 | CE Example 50 | 15,900 |
| P 64 | Example 51 | 11,700 |
| P 65 | CE Example 53 | 6,900 |
| P 66 | Example 54 | 11,200 |
| P 67 | CE Example 56 | 5,100 |
| P 68 | Example 57 | 21,600 |
| P 69 | CE Example 59 | 7,700 |
| P 70 | Example 60 | 24,100 |
| P 71 | Example 61 | 22,900 |
| P 72 | CE Example 63 | 8,400 |
| P 73 | Example 64 | 24,700 |
| P 74 | CE Example 66 | 9,100 |
| P 75 | Example 67 | 23,000 |
| P 76 | CE Example 69 | 8,600 |
| P 77 | Example 70 | 15,600 |
| P 78 | Example 71 | 16,700 |
| P 79 | Example 72 | 15,900 |
| P 80 | Example 73 | 15,100 |

Polymerization Procedure A

A dry and nitrogen purged 5 dm$^3$ autoclave equipped with a helical stirrer is charged with if desired 100 g of metallocene polymer seed bed, 1 cm$^3$ of triisobutylaluminum (10 wt.-% solution in heptane) and 1500 cm$^3$ of liquid propylene. The mixture is stirred for at least 5 minutes (stirrer speed 200 rpm) at 20° C. Then about 70–100 mg of supported metallocene catalyst, suspended in 5 cm$^3$ of white oil, are injected with 1500 cm$^3$ of liquid propylene. The reactor is heated to an internal temperature of 65° C. within 11 minutes. The polymerization reaction is allowed to proceed at 65° C. for 60 minutes. The polymerization is stopped by releasing the monomer and cooling down the reactor. The polymer is discharged and dried under reduced pressure.

Polymerization Procedure B (Using Hydrogen as Mole Weight Regulator)

A dry and nitrogen purged 5 dm³ autoclave equipped with a helical stirrer is charged with if desired 100 g of metallocene polymer seed bed, 1 cm³ of triisobutylaluminum (10 wt.-% solution in heptane), 24.3 mmole hydrogen and 1500 cm³ of liquid propylene. The mixture is stirred for at least 5 minutes (stirrer speed 200 rpm) at 20° C. Then about 40–70 mg of supported metallocene catalyst, suspended in 5 cm³ of white oil, are injected with 1500 cm³ of liquid propylene. The reactor is heated to an internal temperature of 65° C. within 11 minutes. The polymerization reaction is allowed to proceed at 65° C. for 60 minutes. The polymerization is stopped by releasing the monomer and cooling down the reactor. The polymer is discharged and dried.

Polymerization Procedure C (Propylene/Ethylene Co-Polymerization)

A dry and nitrogen purged 5 dm³ autoclave equipped with a helical stirrer is charged with 0.049 g hydrogen, 1 cm³ of triisobutylaluminum (25 wt.-% solution in heptane) and 1500 cm³ of liquid propylene. The mixture is stirred for at least 5 minutes (stirrer speed 200 rpm) at 20° C. Then approx. 50 mg of the respective metallocene catalyst (see table 4) are suspended in 5 cm³ of white oil and are injected with 1500 cm³ of liquid propylene. The autoclave is heated up to an internal temperature of 65° C. within 11 minutes. The polymerization reaction is allowed to proceed at 65° C. for 60 minutes. The addition of ethylene is started after the injection of the catalyst into the autoclave and continued at a constant rate during the heating up phase and polymerization time. The co-polymerization is stopped by releasing the monomers and cooling down the reactor. The produced co-polymer is dried under reduced pressure at 80° C. (the added co-monomer amounts and the results of the co-polymerizations are summarized in Table 4 and 5).

TABLE 3

Polymer properties

| Polymerization Example | Polymer m.p. [° C.] | MFR [g/10 min] | $M_w$ [kg/mol] | $M_w/M_n$ | Xylene Solubles [wt. %] |
|---|---|---|---|---|---|
| P 1  | 145 | 4.6  | 272  | 2.9 | 1.0 |
| P 18 | 156 | 1.8  | 404  | 3.1 | 1.0 |
| P 24 | 147 | 14   | 193  | 2.7 | 1.2 |
| P 26 | 150 | 0.15 | 856  | 2.7 | 1.1 |
| P 28 | 150 | 0.18 | 1020 | 3.3 | 1.3 |
| P 30 | 151 | 0.30 | 920  | 3.2 | 0.9 |
| P 33 | 153 | 0.16 | 768  | 3.0 | 1.2 |
| P 35 | 151 | 0.21 | 870  | 3.0 | 1.1 |
| P 41 | —   | 65   | —    | —   | —   |
| P 58 | 157 | 35   | —    | —   | —   |
| P 64 | —   | 30   | 200  | 2.8 | —   |
| P 66 | —   | 5.8  | —    | —   | —   |
| P 68 | 152 | 3.7  | —    | —   | —   |
| P 70 | —   | 4.3  | —    | —   | —   |
| P 73 | 152 | 7.6  | —    | —   | —   |
| P 74 | —   | 6.8  | —    | —   | —   |

* — = not determined

TABLE 4

Polymerization Procedure C: Co-polymerization conditions and catalyst productivities

| Polymerization example | Supported Catalyst from Example | Comonomer added [g ethylene] | Catalyst productivity [g copolymer/g catalyst × h] |
|---|---|---|---|
| P 81 | 53 | 25  | 23,900 |
| P 82 | 53 | 50  | 25,100 |
| P 83 | 39 | 30  | 20,600 |
| P 84 | 39 | 60  | 22,100 |
| P 85 | 39 | 300 | 22,000 |
| P 86 | 22 | 25  | 20,900 |

TABLE 5

Polymerization Procedure C: Co-polymer properties

| Polymerization Example | Ethylene content [wt.-%] | Polymer m.p. [° C.] | MFR [dg/min] |
|---|---|---|---|
| P 81 | 2.0  | 145 | 10  |
| P 82 | 3.5  | 138 | 35  |
| P 83 | 2.5  | 150 | 20  |
| P 84 | 4.8  | 135 | 5   |
| P 85 | 25.5 | $T_g = -41$ | 0.5 |
| P 86 | 1.8  | 140 | 100 |

Polymerization Example P 87

Polymerization Example P 85 was repeated but 30 mg of catalyst and 0.05 Ndm³ hydrogen have been used, the polymerisation time was 90 minutes and the addition of the comonomer was not started until 60 minutes after the addition of the catalyst i.e. the amount of ethylene was dosed to the autoclave during the remaining 30 minutes of the polymerisation time. Instead of 300 g, only 200 g of ethylene were added.

The isolated impact co-polymer had a MFR of 10 dg/min. The polymer was fractionated and the homopolymer part (83 wt.-%) showed a melting point of 155° C., while the copolymer rubber part (17 wt.-%) showed a $T_g$ of −53° C. and an ethylene content of 41.5 wt.-%. Injection molded parts produced using the polymer, additivated with 0.05 wt. % calcium stearate, 0.1% Irganox 1010 and Irgafos 168 each, showed an excellent stress whitening behavior.

Polymerization Example P 88

Polymerization Example P 87 was repeated, but instead of 200 g, only 90 g of ethylene were added.

The isolated impact co-polymer had a MFR of 14 dg/min. The polymer was fractionated and the homopolymer part (75 wt.-%) showed a melting point of 156° C., while the copolymer rubber part (25 wt.-%) showed a $T_g$ of −29° C. and an ethylene content of 15.2 wt.-%. Injection molded parts produced using the polymer, additivated with 0.25 wt.-% Millad 3988, 0.05 wt. % calcium stearate, 0.1 wt.-% Irganox 1010 and 0.1 wt.-% Irgafos 168, showed an excellent combination of stiffness, transparency and low temperature impact strength.

Polymerization Example P 89

Polymerization Example P 87 was repeated, but instead of 200 g, only 60 g of ethylene were added.

The isolated impact co-polymer had a MFR of 18 dg/min. The polymer was fractionated and the homopolymer part (81 wt.-%) showed a melting point of 155° C., while the copolymer rubber part (19 wt.-%) showed a $T_g$ of −10° C. and an ethylene content of 12.2 wt.-%. Injection molded parts produced using the polymer, additivated with 0.20 wt.-% Millad 3988, 0.05 wt. % calcium stearate, 0.1 wt.-% Irganox 1010 and 0.1 wt.-% Irgafos 168, showed an excellent combination of stiffness, transparency and impact strength at 0° C.

Polymerization Example P 90

Polymerization Example P 87 was repeated. But the addition of the comonomer was performed in the following manner: After the addition of the catalyst and during the first 60 minutes of the polymerisation, 30 g of ethylene were added and during the remaining 30 minutes of the polymerisation time additional 120 g of ethylene were added.

The isolated random impact co-polymer had a MFR of 8 dg/min. The polymer was fractionated and the random copolymer part (84 wt.-%) showed a melting point of 147° C. and an ethylene content of 2.5 wt.-%, while the copolymer rubber part (16 wt.-%) showed a $T_g$ of −40° C. and an ethylene content of 22.5 wt.-%. Injection molded parts produced using the polymer, additivated with 0.22 wt.-% Millad 3988, 0.05 wt. % calcium stearate, 0.1 wt.-% Irganox 1010 and 0.1 wt.-% Irgafos 168, showed an excellent combination of stiffness, transparency and low temperature impact strength at −30° C.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. A process for the preparation of a catalyst system, comprising the steps of:
   a) combining a support material with a first composition, the first composition comprising a first portion of at least one aluminoxane or mixtures thereof in a first solvent, wherein the first composition contains at least 5 mmole of the aluminoxane per gram of the support material;
   b) heating the combined support material with the first composition to a temperature of from at least 30° C. to about 200° C. to provide an aluminoxane loaded support; and,
   c) contacting the aluminoxane loaded support with a second composition, the second composition comprising at least one metallocene compound, a second solvent, and a cocatalyst, wherein the cocatalyst includes a second portion of at least one aluminoxane, alone or in combination with an ionic compound and/or a Lewis acid.

2. The process of claim 1 wherein the heating step (b) is performed at a temperature of from at least 50° C. to about 160° C.

3. The process of claim 1 wherein the heating step (b) is performed at a temperature of from at least 80° C. to about 140° C.

4. The process of claim 1 wherein the support material is treated to acheive a loss on dryness of less than 0.5 wt% before performing step a).

5. The process of claim 1 wherein the first composition is further defined in that it contains at least about 7 mmoles of the aluminoxane per gram of support material.

6. The process of claim 1 wherein the first composition is further defined in that it contains at least about 10 mmoles of the aluminoxane per gram of support material.

7. The process of claim 1 wherein the first solvent comprises at least one compound selected from the group consisting of pentane, hexane, isohexane, heptane, toluene and xylene.

8. The process of claim 1 wherein the support material is a silica support, the aluminoxane is methylaluminoxane and the first solvent is toluene, and wherein the silica support and the first composition are contacted at a temperature of from about 10° C. to less than 30° C. and kept at said temperature for up to about 12 hours, and wherein heating step (b) is subsequently performed at a temperature of at least 30° C. for from about 30 minutes to about 20 hours.

9. The process of claim 1 wherein the support material is a silica support, the aluminoxane is methylaluminoxane and the first solvent is toluene, and wherein the silica support and the first composition are contacted at a temperature of about 18° C. to 22° C. and kept at said temperature for from about 0.15 hours to about 2 hours, and wherein heating step (b) is subsequently performed at a temperature of at least 30° C. for from about 1 to about 6 hours.

10. The process of claim 1 wherein the support material is a silica support, the aluminoxane is methylaluminoxane and the first solvent is toluene, and wherein the silica support and the first composition are contacted at a temperature of about 18° C. to 22° C. and kept at said temperature for from about 0.15 hours to about 2 hours, and wherein heating step (b) is subsequently performed at a temperature of at least 50° C. for from about 1 to about 6 hours.

11. The process of claim 1 wherein the support material is a silica support, the aluminoxane is methylaluminoxane and the first solvent is toluene, and wherein the silica support and the first composition are contacted at a temperature of about 18° C. to 22° C. and kept at said temperature for from about 0.15 hours to about 2 hours, and wherein heating step (b) is subsequently performed at a temperature of at least 80° C. for from about 1 to about 6 hours.

12. The process of claim 1 wherein the support material is a silica support, the aluminoxane is methylaluminoxane and the first solvent is toluene, and wherein the silica support and the first composition are contacted at a temperature of about 18° C. to 22° C. and kept at said temperature for from about 0.15 hours to about 2 hours, and wherein heating step (b) is subsequently performed at a temperature of at least 110° C. for from about 1 to about 6 hours.

13. The process of claim 1 wherein the contacting step (c) is performed at a temperature between 0° C. to 100° C. for 1 minute to 200 hours.

14. The process of claim 1 wherein the contacting step (c) is performed at a temperature between 20° C. to 30° C. for 1 mm to 200 hours.

15. The process of claim 1 wherein in contacting step (c) the second composition contains at least about 0.5 mmole of the at least one aluminoxane or mixture of aluminoxanes per gram of the support material.

16. The process of claim 1 wherein in contacting step (c) the second composition contains at least about 1.0 mmole of the at least one aluminoxane or mixture of aluminoxanes per gram of the support material.

17. The process of claim 1 wherein in contacting step (c) the aluminoxane loaded support is contacted with the second composition for a period of time of from about 1 minute to about 24 hours.

18. The process of claim 1 wherein in contacting step (c) the aluminoxane loaded support is contacted with the second composition for a period of time of from about 5 minutes to 6 hours.

19. The process of claim 1 wherein contacting step (c) comprises passing the second composition through the aluminoxane loaded support material in a direct flow.

20. The process of claim 1 wherein in contacting step (c) the total volume of the second composition does not exceed 250% of the pore volume of the support material.

21. The process of claim 1 wherein the total amount of aluminoxane used in steps (a) and (c) together is between 6 mmoles and 24 mmoles of aluminoxane per gram of support material.

22. The process of claim 1 wherein the total amount of aluminoxane used in steps (a) and (c) together is between 8 mmoles and 20 mmoles of aluminoxane per gram of support material.

23. The process of claim 1 wherein the total amount of aluminoxane used in steps (a) and (c) together is between 11 mmoles and 18 mmoles of aluminoxane per gram of support material.

24. A process of claim 1 wherein the amount of metallocene compound used is between 0.1 mol% and 1.7 mol% of aluminoxane per gram of support material.

25. The process of claim claim 1 wherein the at least one aluminoxane includes a compound having the formula $$(R\text{-}AL\text{-}O)_p$$

wherein R includes one or more groups selected from alkyl groups having from 1 to about 10 carbon atoms, an aryl group having from 6 to about 18 carbon atoms, benzyl, or hydrogen, and p is an integer of from 2 to about 50.

26. The process of claim 25 wherein R is either methyl, ethyl, isobutyl, n-butyl, phenyl or benzyl.

27. The process of claim 25 wherein R includes at least about 60% methyl radicals and from about 0.01% to about 40% of either hydrogen, isobutyl or n-butyl radicals, based upon the total number of R radicals.

28. The process of claim 25 wherein the at least one aluminoxane includes a compound having the formula $$\left[ O\text{—}Al(R) \right]_{p+2}$$

wherein R includes one or more groups selected from alkyl groups having from 1 to about 10 carbon atoms, an aryl group having from 6 to about 18 carbon atoms, benzyl, or hydrogen, and p is an integer of from 2 to about 50.

29. The process of claim 28 wherein R is either methyl, ethyl, isobutyl, n-butyl, phenyl or benzyl.

30. The process of claim 28 wherein R includes at least about 60% methyl radicals and from about 0.01% to about 40% of either hydrogen, isobutyl or n-butyl radicals, based upon the total number of R radicals.

31. The process of claim 1 wherein the at least one aluminoxane includes a compound having the formula $$R_2Al\text{—}O\text{—}[Al(R)\text{—}O]_p\text{—}AlR_2$$

wherein R includes one or more groups selected from alkyl groups having from 1 to about 10 carbon atoms, an aryl group having from 6 to about 18 carbon atoms, benzyl, or hydrogen, and p is an integer of from 2 to about 50.

32. The process of claim 31 wherein R is either methyl, ethyl, isobutyl, n-butyl, phenyl or benzyl.

33. The process of claim 31 wherein R includes at least about 60% methyl radicals and from about 0.01% to about 40% of either hydrogen, isobutyl or n-butyl radicals, based upon the total number of R radicals.

34. The process of claim 1 wherein the at least one aluminoxane includes a compound having the formula

[cage structure of Al and O atoms with R substituents]

wherein R includes one or more groups selected from alkyl groups having from 1 to about 10 carbon atoms, an aryl group having from 6 to about 18 carbon atoms, benzyl, or hydrogen, and p is an integer of from 2 to about 50.

35. The process of claim 34 wherein R is either methyl, ethyl, isobutyl, n-butyl, phenyl or benzyl.

36. The process of claim 34 wherein R includes at least about 60% methyl radicals and from about 0.01% to about 40% of either hydrogen, isobutyl or n-butyl radicals, based upon the total number of R radicals.

37. The process of claim 1 wherein the first solvent and second solvent are hydrocarbon compounds.

38. The process of claim 37 wherein the first solvent and second solvent are individually selected from the group consisting of pentane, isopentane, hexane, isohexane, heptane, octane, nonane, cyclopentane, cyclohexane, benzene, toluene, ethylbenzene and diethylbenzene.

39. The process of claim 1 wherein the support material comprises a particulate porous solid selected from the group consisting of inorganic compounds and finely divided polymer powder.

40. The process of claim 39 wherein the support material comprises a particulate inorganic compound selected from the group consisting of silicon dioxide, aluminum oxide, aluminosilicates, zeolites, MgO, $ZrO_2$, $TiO_2$, $B_2O_3$, CaO, ZnO, $ThO_2$, $Na_2O$, $K_2O$, $Li_2O$, mixed aluminum and silicon oxides, mixed magnesium aluminum oxides, mixed aluminum magnesium oxides, $Na_2CO_3$, $K_2CO_3$, $CaCO_3$, $MgCl_2$, $Na_2SO_4$, $Al_2(SO_4)_3$, $BaSO_4$, $KNO_3$, $Mg(NO_3)_2$ and $Al(NO_3)_3$.

41. The process of claim 1 wherein the support material is silica.

42. The process of claim 1 wherein the support material is thermally pretreated at a temperature of from about 80° C. to about 1000° C. in an inert gas atmosphere for from about 1 to about 24 hours.

43. The process of claim 1 wherein the support material is thermally pretreated at a temperature of from about 150° C. to about 400° C. in an inert gas atmosphere for from about 1 to about 24 hours.

44. The process of claim 1 for preparing a supported catalyst system wherein the support material is silica with a loss on ignition of 1 wt% or greater.

45. The process of claim 1 for preparing a supported catalyst system wherein the support material is silica with a loss on ignition between 1.5 and 3.5 wt.%.

46. The process of claim 1 wherein the metallocene compound has the formula (1):

where n is 0 or 1, m is 1, 2 or 3 q is 1, 2 or 3 and the sum of m and q equals the oxidation state of $M^1$ $L^1$ are identical or different and are each a substituted or unsubstituted mononuclear or polynuclear hydrocarbon radical or (a) hetero atom(s) containing hydrocarbon radical(s) that coordinates to $M^1$, $R^1$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and two or three $R^1$ can form one or more ring system(s), $M^1$ is a metal of group IVb of the Periodic Table of the Elements, $R^9$ is a bridging group linking two ligands $L^1$ selected from

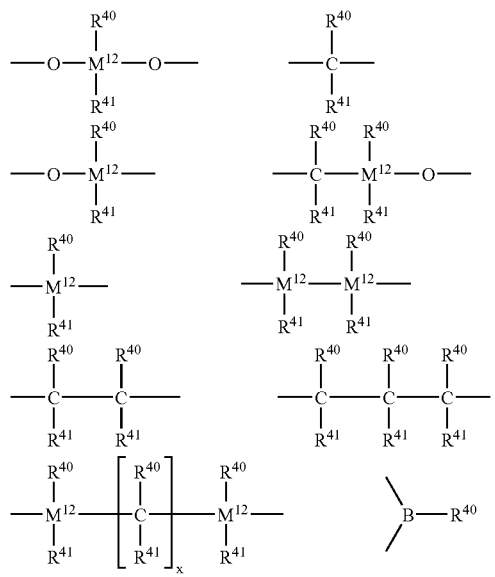

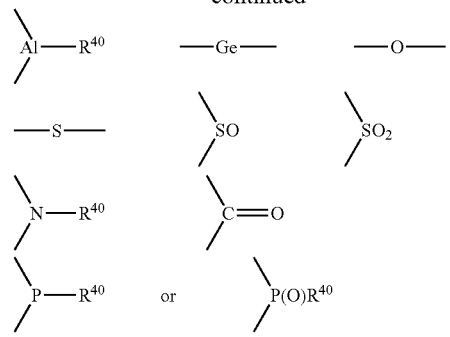

where $R^{40}$ and $R^{41}$, even when bearing the same index, can be identical or different and are each a hydrogen atom, a $C_1$–$C_{40}$ group selected from an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms, wherein $R^{40}$ and $R^{41}$ together with the atoms connecting them can form one or more cyclic systems or $R^{40}$ and/or $R^{41}$ can contain additional hetero atoms selected from Si, B, Al, O, S, N, P, Cl and Br, x is an integer from 1 to 18, $M^{12}$ is silicon, germanium or tin, and $R^9$ can link two units of the formula 1 to one another, or $R^9$ forms a $R^9$-$Z^1$ group, with $R^9$ being linked to one $L^1$ group and $Z^1$ being linked to $M^1$, where $Z^1$ comprises nitrogen, phosphorus, oxygen or sulfur such as —O—, —S—, —$NR^{42}$ or $PR^{42}$—, where $R^{42}$ is a hydrogen atom, a $C_1$–$C_{40}$ group such as an alkyl group having from 1 to about 30 carbon atoms, a cycloalkyl group of from 3 to 10 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms.

47. The process of claim 46 wherein the $L^1$ hydrocarbon radicals are selected from the group consisting of substituted or unsubstituted cyclopentadienyl, indenyl, tetrahydroindenyl, azurenyl, fluorenyl, azapentalenyl, thiapentalenyl or oxapentalenyl.

48. The process of claim 1 wherein the metallocene compound has the formula 1a:

$$R^9L^1L^2M^1R^1R^2 \quad (1a)$$

where

L¹ and L² are identical or different and are each a substituted mononuclear or polynuclear hydrocarbon radical or (a) hetero atom(s) containing hydrocarbon radical(s) which can form a sandwich structure with the central atom M¹, R¹ and R² are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2{}^{32}$ group, where $R^{32}$ is an alkyl group of from 1 to about 10 carbon atoms or an aryl group of from 6 to about 14 carbon atoms, and R¹ and R² can form one or more ring system(s), M¹ is a metal of group IVb of the Periodic Table of the Elements, R⁹ is a bridge between the ligands L¹ and L²,

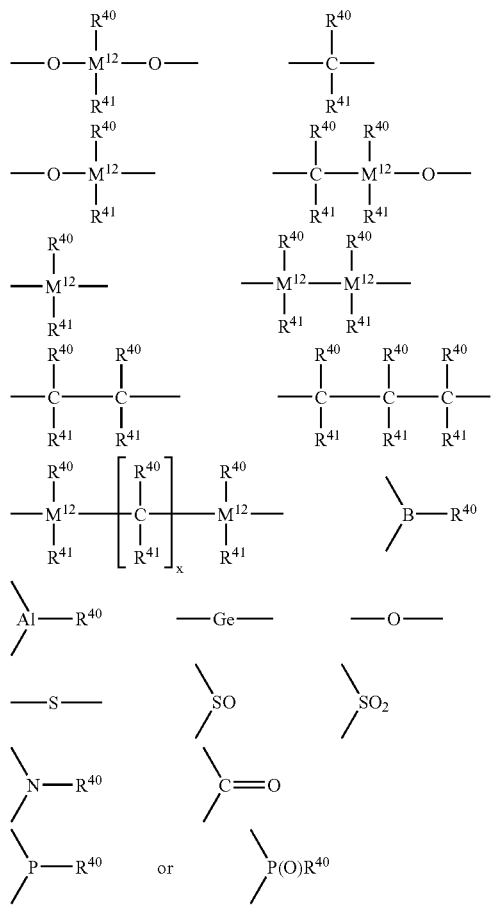

where

R⁴⁰ and R⁴¹, even when bearing the same index, can be identical or different and are each a hydrogen atom, a $C_1-C_{40}$ group such as an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, or an arylalkenyl group of from 8 to about 40 carbon atoms. R⁴⁰ and R⁴¹ together with the atoms connecting them can form one or more cyclic systems or R⁴⁰ and/or R⁴¹ can contain additional hetero atoms selected from the group consisting of Si, B, Al, O, S, N, P, Cl and Br, x is an integer from 1 to 18, M¹² is silicon, germanium or tin, and R⁹ may also link two units of the formula (1a) to one another.

49. The process of claim 48 wherein:

M¹ is zirconium or hafnium,

L1 and L2 are identical or different and are each a substituted cyclopentadienyl, indenyl, tetrahydroindenyl, azurenyl, fluorenyl, azapentalenyl, thiapentalenyl or oxapentalenyl, which can form a sandwich structure with the central atom M¹, R⁹ is R⁴⁰R⁴¹Si=, R⁴⁰R⁴¹Ge=, R⁴⁰R⁴¹C=or —(R⁴⁰R⁴¹C—CR⁴⁰R⁴¹)—, where R⁴⁰ and R⁴¹ are identical or different and are each a hydrogen atom, a hydrocarbon group of from 1 to about 30 carbon atoms, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl or an arylsilyl group.

50. The process of claim 48 wherein M¹ is zirconium and L¹ and L² are identical or different and are each a substituted indenyl, azurenyl, fluorenyl, azapentalenyl, thiapentalenyl or oxapentalenyl, which can form a sandwich structure with the central atom M¹, and the bridging unit R⁹ is R⁴⁰R⁴¹Si= or R⁴⁰R⁴¹Ge=, where R⁴⁰ and R⁴¹ are identical or different and are methyl, ethyl, propyl, butyl, pentyl, hexyl, heptyl, octyl, nonyl, decyl, undecyl, dodecyl, cyclo-pentyl, cyclopentadienyl, cyclohexyl, phenyl, benzyl, trimethylsilyl or 3,3,3-trifluoropropyl.

51. The process of claim 48 wherein the metallocene compound has formula 1b below:

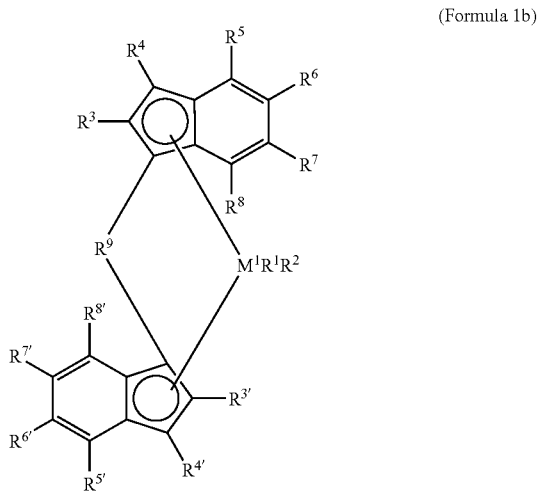

(Formula 1b)

wherein

M¹ is a metal of group IVb of the Periodic Table of the Elements,

R¹ and R² are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a NR²³² group, where R³² is an alkyl group of from 1 to about 10 carbon atoms or an aryl group of from 6 to about 14 carbon atoms and R¹ and R² may form one or more ring system(s), R³, R⁴, R⁵, R⁶, R⁷, R⁸ and also R³', R⁴', R⁵', R⁶', R⁷' and R⁸' are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, an alkyl(aryl)silyl group or an arylsilyl group, with the proviso that R³ and R³' are not hydrogen, wherein said groups may contain one or more hetero atoms selected from the groups consisting of Si, B, Al, O, S, N, P, F, Cl and Br, and two adjacent radicals R⁵, R⁶ or R⁵', R⁶', or R⁶, R⁷ or R⁶', R⁷', or R⁷, R⁸ or R⁷', R⁸' in each case may form a hydrocarbon ring system and the bridging unit R⁹ has the meaning set forth above with respect to formula (1a).

52. The process of claim 51 wherein:

M¹ is zirconium or hafnium,

R¹ and R² are identical or different and are an alkyl group of from 1 to about 10 carbon atoms, an alkoxy group of from 1 to about 10 carbon atoms, an aryloxy group of from 6 to about 10 carbon atoms or a halogen atom, or R¹ and R² together may form one or more ring system(s), R³ and R³', are identical or different and are each a linear, cyclic or branched hydrocarbon group which may be halogenated, for example an alkyl group of from 1 to 10 carbon atoms or an alkenyl group of from 2 to about 10 carbon atoms, R⁴, R⁵ R⁶, R⁷, R⁸ and also R⁴', R⁵', R⁶', R⁷' and R⁸' are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 10 carbon atoms, which may contain one ore more hetero atoms selected form the group consisting of Si, B, Al, O, S, N, P, F, Cl and Br, and the two adjacent radicals R⁵, R⁶ and R⁵', R⁶' can form a hydrocarbon ring system, R⁹ is R⁴⁰R⁴¹Si=, R⁴⁰R⁴¹Ge=, R⁴⁰R⁴¹C= or —(R⁴⁰R⁴¹C—CR⁴⁰R⁴¹)—, where R⁴⁰ and R⁴¹ are identical or different and are each a hydrogen atom, an alkyl group of from 1 to 10 carbon atoms, an aryl group of from 6 to about 40 carbon atoms, an arylalkyl group of from 7 to about 14 carbon atoms or an alkylaryl group of from 7 to about 14 carbon atoms or a substituted or unsubstituted alkylsilyl group, an alkyl(aryl) silyl or an arylsilyl group.

53. The process of claim 51 wherein:

M¹ is zirconium,

R¹ and R² are identical or different and are methyl, chlorine or phenolate,

R³ and R³', are identical or different and are each a linear, cyclic or branched hydrocarbon group which may be halogenated, for example an alkyl group of from 1 to about 10 carbon atoms or an alkenyl group of from 2 to about 10 carbon atoms, R⁴ and also R⁴' are hydrogen, R⁵, R⁶, R⁷, R⁸ and also R⁵', R⁶', R⁷', R⁸' are identical or different and are each a hydrogen atom or a linear, cyclic or branched alkyl group of from 1 to about 10 carbon atoms, or an aryl group of from 6 to about 10 carbon atoms and/or the two adjacent radicals R⁵, R⁶ and R⁵', R⁶' respectively together may form a ring system, R⁹ is R⁴⁰R⁴¹Si= or R⁴⁰R⁴¹Ge=, where R⁴⁰ and R⁴¹ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, benzyl, trimethylsilyl or 3,3,3-trifluoropropyl.

54. The process of claim 48 wherein the metallocene compound has formula 1c:

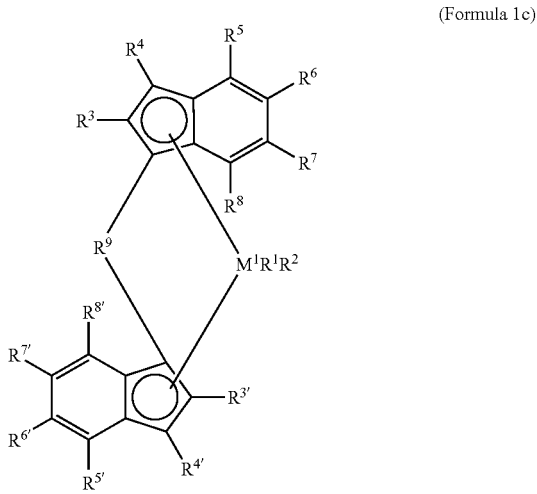

(Formula 1c)

where the substituents and indices have the following meanings:

M¹ is a metal of group IVb of the Periodic Table of the Elements,

R¹ and R² are identical or different and are each a hydrogen atom, an alkyl group of from 1 to 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a NR²³² group, where R³² is an alkyl group of from 1 to about 10 carbon atoms or an aryl group of from 6 to about 14 carbon atoms, and R¹ and R² may form one or more ring system(s), R³, R⁴, R⁵, R⁶, R⁷, R⁸ and also R³', R⁴', R⁵', R⁶', R⁷' and R⁸' are identical or different and are each a hydrogen atom, a linear, cyclic or branched hydrocarbon group, for example an alkyl group of from 1 to 10 carbon atoms, an alkenyl group of from 2 to about 10 carbon atoms, an arenyl group of from 6 to about 20 carbon atoms, an arylalkyl group of from 7 to about 40 carbon atoms, an alkylaryl group of from 7 to about 40 carbon atoms, or an arylakenyl group of from 8 to about 40 carbon atoms, a substituted or unsubstituted alkylsilyl or arylsilyl group, with the proviso that $R^3$ and $R^{3'}$ are not hydrogen and that $R^5$ and $R^{5'}$ are identical or different and are each a substituted or unsubstituted aryl group of from 6 to about 40 carbon atoms, the hydrocarbon groups may contain one or more hetero atoms selected from the group consisting of Si, B, Al, O, S, N, P, F, Cl and Br, and the bridging unit $R^9$ has the meaning set forth above with respect to formula 1a.

55. The process of claim 54 wherein:

$M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms, or a halogen atom, and $R^1$ and $R^2$ may form one or more ring system(s), $R^3$ and $R^{3'}$, are identical or different and are each a linear, cyclic or branched group which may be halogenated, for example an alkyl group of from 1 to about 10 carbon atoms or an alkenyl group of from 2 to about 10 carbon atoms, $R^4$, $R^6$, $R^7$, $R^8$ and also $R^{4'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br, $R^5$ and $R^{5'}$ are identical or different and are each a substituted or unsubstituted aryl group of from 6 to about 40 carbon atoms, $R^9$ is $R^{40}R^{41}Si=$, $R^{40}R^{41}Ge=$, $R\ R^{41}C=$ or $-(R^{40}R^{41}C-CR^{40}R^{41})-$, where $R^{40}$ and $R^{41}$ are identical or different and are each a hydrogen atom, a $C_1$–$C_{30}$-hydrocarbon group, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl or an arylsilyl group.

56. The process of claim 54 wherein:

$M^1$ is zirconium, $R^1$ and $R^2$ are identical and are methyl, chlorine, or phenolate, $R^3$ and $R^{3'}$ are identical or different and are each a linear, cyclic or branched methyl, ethyl, propyl, butyl, pentyl or hexyl, $R^4$ and also $R^{4'}$ are hydrogen, $R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br, $R^5$ and $R^{5'}$ are identical or different and are phenyl, naphthyl, para-($C_1$–$C_{10}$-alkyl)phenyl, para-($C_1$–$C_{10}$-fluoroalkyl)phenyl, meta-($C_1$–$C_{10}$-alkyl)phenyl, meta-($C_1$–$C_{10}$-alkyl)phenyl, meta, metá-($C_1$–$C_{10}$-alkyl)$_2$phenyl or meta, metá-($C_1$–$C_{10}$-fluoroalkyl)$_2$phenyl, $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, benzyl, trimethylsilyl or 3,3,3-trifluoropropyl.

57. The process of claim 48 wherein the metallocene compound has the formula 1d:

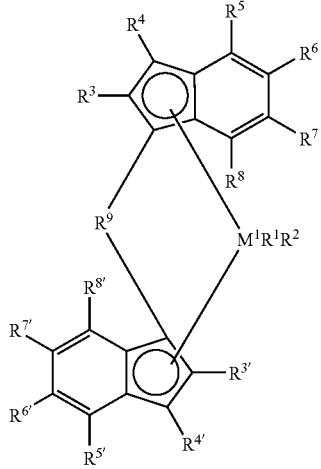

(Formula 1d)

wherein:

$M^1$ is a metal of group IVb of the Periodic Table of the Elements, $R^1$ and $R^2$ are identical or different and are each a hydrogen atom, an alkyl group of from 1 to about 10 carbon atoms, an alkoxy group of from 1 to about 10 carbon atoms, an aryl group of from 6 to 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms, or an aryl group of from 6 to about 14 carbon atoms, or $R^1$ and $R^2$ together may form one or more ring system(s), $R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, a substituted or unsubstituted alkylsilyl or arylsilyl group, with the proviso that $R^5$ and $R^{5'}$ are identical or different and are each a substituted or unsubstituted aryl group of from 6 to about 40 carbon atoms, the hydrocarbon groups can contain one or more hetero atoms selected from the group consisting of Si, B, Al, O, S, N, P, F, Cl and Br, $R^3$ is a hydrocarbon group, not cyclic or branched in the α-position, for example an alkyl group of from 1 to 20 carbon atoms, an aryl substituted alkyl group of from 7 to about 40 carbon atoms, or an aryl substituted alkenyl group of from 8 to about 40 carbon atoms, the hydrocarbon groups can contain one or more hetero atoms selected from the group consisting of Si, B, Al, O, S, N, P, F, Cl and Br, $R^{3'}$ is a in α-position or in β-position cyclic or branched hydrocarbon group, for example an alkyl group of from 3 to about 20 carbon atoms, an alkenyl group of from 3 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms, the hydrocarbon groups may contain one or more hetero atoms selected from the group consisting of Si, B, Al, O, S, N, P, F, Cl and Br, and the bridging unit $R^9$ has the meaning mentioned above with respect to formula 1a.

58. The process of claim 57 wherein:

$M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, and $R^1$ and $R^2$ may form one or more ring system(s), $R^3$ is a linear alkyl group of from 1 to about 10 carbon atoms or an alkenyl group of from 2 to 10 carbon atoms, which can be halogenated, $R^{3'}$ is a in α-position or in β-position cyclic or branched alkyl group of from 3 to about 20 carbon atoms, an alkenyl group of from 3 to about 20 carbon atoms, an alkylaryl group of from 7 to about 20 carbon atoms, or a trimethylsilyl group, $R^4$, $R^6$, $R^7$, $R^8$ and also $R^{4'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br, $R^5$ and $R^{5'}$ are identical or different and are each a substituted or unsubstituted aryl group of from 6 to about 40 carbon atoms, like phenyl, naphthyl, para-($C_1$–$C_{10}$-alkyl)phenyl, meta-($C_1$–$C_{10}$-alkyl)phenyl, meta, metá-($C_1$–$C_{10}$-alkyl)$_2$phenyl, $R^9$ is $R^4R^{41}Si=$, $R^{40}R^{41}Ge=$, $R^{40}R^{41}C=$ or —($R^{40}R^{41}C$—$CR^{40}R^{41}$)—, where $R^{40}$ and $R^{41}$ are identical or different and are each a hydrogen atom, a $C_1$–$C_{30}$ group, in particular an alkyl group of from 1 to about 10 carbon atoms, an aryl group of from 6 to about 40 carbon atoms, an arylalkyl group of from 7 to 14 carbon atoms, an alkylaryl group of from 7 to 14 carbon atoms or a substituted or unsubstituted alkylsilyl group, an alkyl(aryl)silyl or an arylsilyl group.

59. The process of claim 57 wherein:

$M^1$ is zirconium, $R^1$ and $R^2$ are identical and are methyl, chlorine, or phenolate, $R^3$ is methyl, ethyl, n-propyl, n-butyl, n-pentyl or n-hexyl, $R^{3'}$ is iso-propyl, iso-butyl, n-butyl, sec-butyl, cyclobutyl, 1-methyl-butyl, 1-ethyl-butyl, 1-methyl-pentyl, cyclopentyl, cyclohexyl, cyclopent-2-enyl, cyclopent-3-enyl, cyclohex-2-enyl, cyclohex-3-enyl, para-methyl-cyclohexyl or trimethylsilyl, $R^4$ and also $R^{4'}$ are hydrogen, and $R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br, $R^5$ and $R^{5'}$ are identical or different and are phenyl, p-isopropyl-phenyl, p-tert.-butyl-phenyl, p-s-butyl-phenyl, p-cyclohexyl, p-trimethylsilyl-phenyl, p-adamantyl-phenyl, p-(trisfluor)trimethyl-phenyl or m,m'-dimethyl-phenyl, $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclo-pentyl, cyclo-pentadienyl, cyclohexyl, phenyl, benzyl, trimethylsilyl or 3,3,3-trifluoropropyl.

60. The process of claim 1 wherein the at least one metallocene compound is selected from the group consisting of:

A-(2-isopropyl-4-(p-isopropyl-phenyl)indenyl)(2-methyl-4-(p-isopropyl-phenyl)-indenyl)zirconiumdichloride, A-(2-isopropyl-4-(p-tert. butyl-phenyl)indenyl)(2-methyl-4-(p-tert. butyl-phenyl)-indenyl)zirconiumdichloride, A-(2-isopropyl-4-(p-tert. butyl-phenyl)indenyl)(2,7-dimethyl-4-(p-tert. butyl-phenyl)indenyl)zirconiumdichloride, A-(2-isopropyl-4-(p-tert. butyl-phenyl)indenyl)(2,5,6,7-tetramethyl-4-(p-tert. butyl-phenyl)indenyl)zirconiumdichloride, A-(2-isopropyl-6-methyl-4-(p-tert. butyl-phenyl)indenyl)(2,6-dimethyl-4-(p-tert. butyl-phenyl)indenyl)zirconiumdichloride, A-(2-isopropyl-4-(p-sec. butyl-phenyl)indenyl)(2-methyl-4-(p-sec. butyl-phenyl)-indenyl)zirconiumdichloride, A-(2-isopropyl-4-(p-cyclohexyl-phenyl)indenyl)(2-methyl-4-(p-cyclohexyl-phenyl)-indenyl)zirconiumdichloride, A-(2-isopropyl-4-(p-trimethylsilyl-phenyl)indenyl)(2-methyl-4-(p-trimethylsilyl-phenyl)indenyl)zirconiumdichloride, A-(2-isopropyl-4-(p-adamantyl-phenyl)indenyl)(2-methyl-4-(p-adamantyl-phenyl)-indenyl)zirconiumdichloride, A-(2-isopropyl-4-(p-tris(trifluoromethyl)methyl-phenyl)indenyl)(2-methyl-4-(p-tris(trifluoromethyl)methyl-phenyl)indenyl)zirconiumdichloride, A-(2-isopropyl-4-phenyl-indenyl)(2-methyl-4-(p-tert. butyl-phenyl)indenyl)-zirconiumdichloride;

A-(2-isopropyl-4-(p-tert. butyl-phenyl)indenyl)(2-methyl-4-phenyl-indenyl)-zirconiumdichloride, A-(2-isopropyl-4-(p-tert. butyl-phenyl)indenyl)(2,7-dimethyl-4-phenyl-indenyl)-zirconiumdichloride, A-(2-isopropyl-4-(p-tert. butyl-phenyl)indenyl)(2,5,6,7-tetramethyl-4-phenyl-indenyl)zirconiumdichloride, A-(2-isopropyl-6-methyl-4-(p-tert. butyl-phenyl)indenyl)(2,6-dimethyl-4-phenyl-indenyl)zirconiumdichloride, A-(2-isopropyl-4-phenyl-indenyl)(2,7-dimethyl-4-(p-tert. butyl-phenyl)indenyl)-zirconiumdichloride, A-(2-isopropyl-4-phenyl-indenyl)(2,5,6,7-tetramethyl-4-(p-tert. butyl-phenyl)-indenyl)zirconiumdichloride, A-(2-isopropyl-6-methyl-4-phenyl-indenyl)(2,6-dimethyl-4-(p-tert. butyl-phenyl)-indenyl)zirconiumdichloride, A-(2-isopropyl-4-(p-tert. butyl-phenyl)indenyl)(2-methyl-4-(4-naphthyl)-indenyl)-indenyl)zirconiumdichloride, A-(2-isopropyl-4-(4-naphthyl)-indenyl)indenyl )(2-methyl-4-(p-tert. butyl-phenyl)-indenyl)zirconiumdichloride, A-bis(4-naphthyl-indenyl)zirconiumdichloride, A-bis(2-methyl-benzo-indenyl)zirconiumdichloride A-bis(2-methyl-indenyl )zirconiumdichloride, A-bis(2-methyl-4-(1-naphthyl)-indenyl)zirconiumdichloride, A-bis(2-methyl-4-(2-naphthyl)-indenyl)zirconiumdichloride, A-bis(2-methyl-4-phenyl-indenyl)zirconiumdichloride, A-bis(2-methyl-4-t-butyl-indenyl)zirconiumdichloride, A-bis(2-methyl-4-isopropyl-indenyl)zirconiumdichloride,
A-bis(2-methyl-4-ethyl-indenyl)zirconiumdichloride,
A-bis(2-methyl-4-acenaphth-indenyl)zirconiumdichloride,
A-bis(2,4-dimethyl-indenyl)zirconiumdichloride,
A-bis(2-ethyl-indenyl)zirconiumdichloride,
A-bis(2-ethyl-4-ethyl-indenyl)zirconiumdichloride,
A-bis(2-ethyl-4-phenyl-indenyl)zirconiumdichloride,
A-bis(2-methyl-4,6-diisopropyl-indenyl)zirconiumdichloride,
A-bis(2-methyl-4,5-diisopropyl-indenyl)zirconiumdichloride,
A-bis(2,4,6-trimethyl-indenyl)zirconiumdichloride,
A-bis(2,5,6-trimethyl-indenyl)zirconiumdichloride,
A-bis(2,4,7-trimethyl-indenyl)zirconiumdichloride,
A-bis(2-methyl-5-isobutyl-indenyl)zirconiumdichloride,
A-bis(2-methyl-5-t-butyl-indenyl)zirconiumdichloride,
A-bis(2-methyl-4-(tert-butyl-phenyl)-indenyl)zirconiumdichloride,
A-bis(2-methyl-4-(4-methyl-phenyl)-indenyl)zirconiumdichloride,
A-bis(2-methyl-4-(4-ethyl-phenyl)-indenyl)zirconiumdichloride,
A-bis(2-methyl-4-(4-trifluoromethyl-phenyl)-indenyl)zirconiumdichloride,
A-bis(2-methyl-4-(4-methoxy-phenyl)-indenyl)zirconiumdichloride,
A-bis(2-ethyl-4-(4-tert-butyl-phenyl)-indenyl)zirconiumdichloride,
A-bis(2-ethyl-4-(4-methyl-phenyl)-indenyl)zirconiumdichloride,
A-bis(2-ethyl-4-(4-ethyl-phenyl)-indenyl)zirconiumdichloride,
A-bis(2-ethyl-4-(4-trifluoromethyl-phenyl)-indenyl)zirconiumdichloride,
A-bis(2-ethyl-4-(4-methoxy-phenyl)-indenyl)zirconiumdichloride,
A-bis(2-methyl-4-(4-tert-butyl-phenyl)-indenyl)zirconiumdimethyl,
A-bis(2-methyl-4-(4-methyl-phenyl)-indenyl)zirconiumdimethyl,
A-bis(2-methyl-4-(4-ethyl-phenyl)-indenyl)zirconiumdimethyl,
A-bis(2-methyl-4-(4-trifluoromethyl-phenyl)-indenyl)zirconiumdimethyl,
A-bis(2-methyl-4-(4-methoxy-phenyl)-indenyl)zirconiumdimethyl,
A-bis(2-ethyl-4-(4-tert-butyl-phenyl)-indenyl)zirconiumdimethyl,
A-bis(2-ethyl-4-(4-methyl-phenyl)-indenyl)zirconiumdimethyl,
A-bis(2-ethyl-4-(4-ethyl-phenyl)-indenyl)zirconiumdimethyl,
A-bis(2-ethyl-4-(4-trifluoromethyl-phenyl)-indenyl)zirconiumdimethyl,
A-bis(2-ethyl-4-(4-methoxy-phenyl)-indenyl)zirconiumdimethyl,
A-bis(2-isopropyl-4-(tert-butyl-phenyl)-indenyl)zirconiumdichloride,
A-bis(2-isopropyl-4-(4-methyl-phenyl)-indenyl)zirconiumdichloride,
A-bis(2-isopropyl-4-(4-ethyl-phenyl)-indenyl)zirconiumdichloride,
A-bis(2-isopropyl-4-(4-trifluoromethyl-phenyl)-indenyl)zirconiumdichloride,
A-bis(2-isopropyl-4-(4-methoxy-phenyl)-indenyl)zirconiumdichloride,
A-bis(2-isopropyl-4-(4'-tert.-butyl-phenyl)-indenyl)zirconiumdichloride,
A-bis(2-isopropyl-4-(4'-tert.-butyl-phenyl)-indenyl)hafniumdichloride,
A-bis(2-isopropyl-4-(4'-tert.-butyl-phenyl)-indenyl)titaniumdichloride,
A-bis(2-isopropyl-4-(4'-methyl-phenyl)-indenyl)zirconiumdichloride,
A-bis(2-isopropyl-4-(4'-n-propyl-phenyl)-indenyl)zirconiumdichloride,
A-bis(2-isopropyl-4-(4'-n-butyl-phenyl)-indenyl)zirconiumdichloride,
A-bis(2-isopropyl-4-(4'-hexyl-phenyl)-indenyl)zirconiumdichloride,
A-bis(2-isopropyl-4-(4'-sec-butyl-phenyl)-indenyl)zirconiumdichloride,
A-bis(2-isopropyl-4-phenyl)-indenyl)zirconiumdichloride,
A-bis(2-isopropyl-4-(4'-methyl-phenyl)-indenyl)zirconiumdichloride,
A-bis(2-isopropyl-4-(4'-ethyl-phenyl)-indenyl)zirconiumdichloride,
A-bis(2-isopropyl-4-(4'-n-propyl-phenyl)-indenyl)zirconiumdichloride,
A-bis(2-isopropyl-4-(4'-n-butyl-phenyl)-indenyl)zirconiumdichloride,
A-bis(2-isopropyl-4-(4'-hexyl-phenyl)-indenyl)zirconiumdichloride,
A-bis(2-isopropyl-4-(4'-pentyl-phenyl)-indenyl)zirconiumdichloride,
A-bis(2-isopropyl-4-(4'-cyclohexyl-phenyl)-indenyl)zirconiumdichloride,
A-bis(2-isopropyl-4-(4'-sec-butyl-phenyl)-indenyl)zirconiumdichloride,
A-bis(2-isopropyl-4-(4'-tert.-butyl-phenyl)-indenyl)zirconiumdichloride,
A-bis(2-methyl-4-(4'-tert.-butyl-phenyl)-indenyl)zirconiumdichloride,
A-bis(2-methyl-4-(4'-tert.-butyl-phenyl)-indenyl)hafniumdichloride,
A-bis(2-methyl-4-(4'-tert.-butyl-phenyl)-indenyl)titaniumdichloride,
A-bis(2-methyl-4-(4'-methyl-phenyl)-indenyl)zirconiumdichloride,
A-bis(2-methyl-4-(4'-n-propyl-phenyl)-indenyl)zirconiumdichloride,
A-bis(2-methyl-4-(4'-n-butyl-phenyl)-indenyl)zirconiumdichloride,
A-bis(2-methyl-4-(4'-hexyl-phenyl)-indenyl)zirconiumdichloride,
A-bis(2-methyl-4-(4'-sec-butyl-phenyl)-indenyl)zirconiumdichloride,
A-bis(2-ethyl-4-phenyl-indenyl)zirconiumdichloride,
A-bis(2-ethyl-4-(4'-methyl-phenyl)-indenyl)zirconiumdichloride,
A-bis(2-ethyl-4-(4'-ethyl-phenyl)-indenyl)zirconiumdichloride,
A-bis(2-ethyl-4-(4'-n-propyl-phenyl)-indenyl)zirconiumdichloride,
A-bis(2-ethyl-4-(4'-n-butyl-phenyl)-indenyl)zirconiumdichloride,
A-bis(2-ethyl-4-(4'-hexyl-phenyl)-indenyl)zirconiumdichloride,
A-bis(2-ethyl-4-(4'-pentyl-phenyl)-indenyl)zirconiumdichloride, A-bis(2-ethyl-4-(4'-cyclohexyl-phenyl)-indenyl)zirconiumdichloride,
A-bis(2-ethyl-4-(4'-sec-butyl-phenyl)-indenyl)zirconiumdichloride,
A-bis(2-ethyl-4-(4'-tert.-butyl-phenyl)-indenyl)zirconiumdichloride,
A-bis(2-n-propyl-4-phenyl-indenyl)zirconiumdichloride,
A-bis(2-n-propyl-4-(4'-methyl-phenyl)-indenyl)zirconiumdichloride,
A-bis(2-n-propyl-4-(4'-ethyl-phenyl)-indenyl)zirconiumdichloride,
A-bis(2-n-propyl-4-(4'-iso-propyl-phenyl)-indenyl)zirconiumdichloride,
A-bis(2-n-propyl-4-(4'-n-butyl-phenyl)-indenyl)zirconiumdichloride,
A-bis(2-n-propyl-4-(4'-hexyl-phenyl)-indenyl)zirconiumdichloride,
A-bis(2-n-propyl-4-(4'-cyclohexyl-phenyl)-indenyl)zirconiumdichloride,
A-bis(2-n-propyl-4-(4'-sec-butyl-phenyl)-indenyl)zirconiumdichloride,
A-bis(2-n-propyl-4-(4'-tert.-butyl-phenyl)-indenyl)zirconiumdichloride,
A-bis(2-n-butyl-4-phenyl-indenyl)zirconiumdichloride,
A-bis(2-n-butyl-4-(4'-methyl-phenyl)-indenyl)zirconiumdichloride,
A-bis(2-n-butyl-4-(4'-ethyl-phenyl)-indenyl)zirconiumdichloride,
A-bis(2-n-butyl-4-(4'-n-propyl-phenyl)-indenyl)zirconiumdichloride,
A-bis(2-n-butyl-4-(4'-iso-propyl-phenyl)-indenyl)zirconiumdichloride,
A-bis(2-n-butyl-4-(4'-n-butyl-phenyl)-indenyl)zirconiumdichloride,
A-bis(2-n-butyl-4-(4'-hexyl-phenyl)-indenyl)zirconiumdichloride,
A-bis(2-n-butyl-4-(4'-cyclohexyl-phenyl)-indenyl)zirconiumdichloride,
A-bis(2-n-butyl-4-(4'-sec-butyl-phenyl)-indenyl)zirconiumdichloride,
A-bis(2-n-butyl-4-(4'-tert.-butyl-phenyl)-indenyl)zirconiumdichloride,
A-bis(2-hexyl-4-phenyl-indenyl)zirconiumdichloride,
A-bis(2-hexyl-4-(4'-methyl-phenyl)-indenyl)zirconiumdichloride,
A-bis(2-hexyl-4-(4'-ethyl-phenyl)-indenyl)zirconiumdichloride,
A-bis(2-hexyl-4-(4'-n-propyl-phenyl)-indenyl)zirconiumdichloride,
A-bis(2-hexyl-4-(4'-iso-propyl-phenyl)-indenyl)zirconiumdichloride,
A-bis(2-hexyl-4-(4'-n-butyl-phenyl)-indenyl)zirconiumdichloride,
A-bis(2-hexyl-4-(4'-n-hexyl-phenyl)-indenyl)zirconiumdichloride,
A-bis(2-hexyl-4-(4'-cyclohexyl-phenyl)-indenyl)zirconiumdichloride,
A-bis(2-hexyl-4-(4'-sec-butyl-phenyl)-indenyl)zirconiumdichloride,
A-bis(2-hexyl-4-(4'-tert.-butyl-phenyl)-indenyl)zirconiumdichloride,
A-bis(2-methyl-4-(4'-tert.-butyl-phenyl)-indenyl)zirconiumbis(dimethylamine),
A-bis(2-ethyl-4-(4'-tert.-butyl-phenyl)-indenyl)zirconiumdibenzyl,
A-bis(2-methyl-4-(4'-tert.-butyl-phenyl)-indenyl)zirconiumdimethyl,
A-(2-methyl-4-azapentalene)(2-methyl-4-(4'-methyl-phenyl)-indenyl)zirconiumdichloride,
A-(2-methyl-5-azapentalene)(2-methyl-4-(4'-methyl-phenyl)-indenyl)zirconiumdichloride,
A-(2-methyl-6-azapentalene)(2-methyl-4-(4'-methyl-phenyl)-indenyl)zirconiumdichloride,
A-(2-methyl-4-azapentalene)(2-methyl-4-(4'-ethyl-phenyl)-indenyl)zirconiumdichloride,
A-(2-methyl-4-thiapentalene)(2-methyl-4-(4'-n-propyl-phenyl)-indenyl)-zirconiumdichloride,
A-(2-methyl-4-azapentalene)(2-methyl-4-(4'-isopropyl-phenyl)-indenyl)-zirconiumdichloride,
A-(2-methyl-6-azapentalene)(2-methyl-4-(4'-isopropyl-phenyl)-indenyl)-zirconiumdichloride,
A-(2,5-dimethyl-6-thiapentalene)(2-methyl-4-(4'-isopropyl-phenyl)-indenyl)-zirconiumdichloride,
A-(2-methyl-6-oxapentalen)(2-methyl-4-(4'-isopropyl-phenyl)-indenyl)zirconiumdichloride,
A-(2-methyl-6-azapentalene)(2-methyl-4-(4'-n-butyl-phenyl)-indenyl)-zirconiumdichloride,
A-(2-methyl-5-thiapentalene)(2-methyl-4-(4'-n-butyl-phenyl)-indenyl)-zirconiumdichloride,
A-(2-methyl-4-oxapentalene)(2-methyl-4-(4'-n-butyl-phenyl)-indenyl)-zirconiumdichloride,
A-(2-methyl-4-thiapentalene)(2-methyl-4-(4'-s-butyl-phenyl)-indenyl)-zirconiumdichloride,
A-(2-methyl-4-oxapentalene)(2-methyl-4-(4'-s-butyl-phenyl)-indenyl)-zirconiumdichloride,
A-(2-methyl-4-azapentalene)(2-methyl-4-(4'-tert-butyl-phenyl)-indenyl)-zirconiumdichloride,
A-(2-methyl-6-azapentalene)(2-methyl-4-(4'-tert-butyl-phenyl)-indenyl)-zirconiumdichloride,
A-(2-methyl-4-azapentalene)(2-methyl-4-(4'-n-pentyl-phenyl)-indenyl)-zirconiumdichloride,
A-(2-methyl-N-phenyl-6-azapentalene)(2-methyl-4-(4'-n-pentyl-phenyl)-indenyl)-zirconiumdichloride,
A-(2-methyl-4-oxapentalene)(2-methyl-4-(4'-n-pentyl-phenyl)-indenyl)-zirconiumdichloride,
A-(2-methyl-4-azapentalene)(2-methyl-4-(4'-n-hexyl-phenyl)-indenyl)-zirconiumdichloride,
A-(2-methyl-4-thiapentalene)(2-methyl-4-(4'-n-hexyl-phenyl)-indenyl)-zirconiumdichloride,
A-(2-methyl-6-thiapentalene)(2-methyl-4-(4'-n-hexyl-phenyl)-indenyl)-zirconiumdichloride,
A-(2,5-dimethyl-4-thiapentalene)(2-methyl-4-(4'-n-hexyl-phenyl)-indenyl)-zirconiumdichloride,
A-(2,5-dimethyl-6-thiapentalene)(2-methyl-4-(4'-n-hexyl-phenyl)-indenyl)-zirconiumdichloride,
A-(2,5-dimethyl-6-thiapentalene)(2-methyl-4-(4'-cyclohexyl-phenyl)-indenyl)-zirconiumdichloride,
A-(2-methyl-4-azapentalene)(2-methyl-4-(4'-trimethylsilyl-phenyl)-indenyl)-zirconiumdichloride,
A-(2-methyl-4-thiapentalene)(2-methyl-4-(4'-trimethylsilyl-phenyl)-indenyl)-zirconiumdichloride,
A-(2-methyl-5-thiapentalene)(2-methyl-4-(4'-trimethylsilyl-phenyl)-indenyl)-zirconiumdichloride,
A-(2-methyl-6-thiapentalene)(2-methyl-4-(4'-trimethylsilyl-phenyl)-indenyl)-zirconiumdichloride,
A-(2,5-dimethyl-4-azapentalene)(2-methyl-4-(4'-adamantyl-phenyl)-indenyl)-zirconiumdichloride,
A-(2-methyl-4-thiapentalene)(2-methyl-4-(4'-adamantyl-phenyl)-indenyl)-zirconiumdichloride,
A-(2-methyl-6-thiapentalene)(2-methyl-4-(4'-adamantyl-phenyl)-indenyl)-zirconiumdichloride,
A-(2,5-dimethyl-4-thiapentalene)(2-methyl-4-(4'-adamantyl-phenyl )-indenyl)-zirconiumdichloride, A-(2-methyl-4-azapentalene)(2-methyl-4-(4'-tris(trifluoromethyl)methyl-phenyl)-indenyl)-zirconiumdichloride,
A-(2,5-dimethyl-4-azapentalene)(2-methyl-4-(4'-tris(trifluoromethyl)methyl-phenyl)-indenyl)zirconiumdichloride,
A-(2-methyl-4-thiapentalene)(2-methyl-4-(4'-tris(trifluoromethyl)methyl-phenyl)-indenyl)zirconiumdichloride,
A-(2-methyl-6-thiapentalene)(2-methyl-4-(4'-tris(trifluoromethyl)methyl-phenyl)-indenyl)zirconiumdichloride,
A-(2-methyl-4-azapentalene)(2-ethyl-4-(4'-tert-butyl-phenyl)-indenyl)-zirconiumdichloride,
A-(2-methyl-5-azapentalene)(2-n-butyl-4-(4'-tert-butyl-phenyl)-indenyl)-zirconiumdichloride,
A-(2-methyl-N-phenyl-6-azapentalene)(2-methyl-4-(4'-tert-butyl-phenyl)-indenyl)-zirconiumdichloride,
A-(2-methyl-4-azapentalene)(2-methylindenyl)zirconiumdichloride,
A-(2-methyl-N-phenyl-4-azapentalene)(2-methylindenyl)zirconiumdichloride,
A-(2-methyl-4-thiapentalene)(2-methylindenyl)zirconiumdichloride,
A-(2-methyl-5-thiapentalene)(2-methylindenyl)zirconiumdichloride,
A-(2-methyl-6-thiapentalene)(2-methylindenyl )zirconiumdichloride,
A-(2-methyl-4-azapentalene)(indenyl)zirconiumdichloride,
A-(2-methyl-5-azapentalene)(indenyl)zirconiumdichloride,
A-(2-methyl-6-azapentalene)(indenyl)zirconiumdichloride,
A-(2-methyl-N-phenyl-4-azapentalene)(indenyl)zirconiumdichloride,
A-(2-methyl-N-phenyl-5-azapentalene)(indenyl)zirconiumdichloride,
A-(2-methyl-N-phenyl-6-azapentalene)(indenyl)zirconiumdichloride,
A-(2,5-dimethyl-N-phenyl-6-azapentalene)(indenyl)zirconiumdichloride,
A-(2-methyl-4-thiapentalene)(indenyl)zirconiumdichloride,
A-(2-methyl-5-thiapentalene)(indenyl)zirconiumdichloride,
A-(2-methyl-6-thiapentalene)(indenyl)zirconiumdichloride,
A-(2,5-dimethyl-4-thiapentalene)(indenyl)zirconiumdichloride,
A-(2-methyl-4-azapentalene)(2-methyl-4-phenyl-indenyl)zirconiumdichloride,
A-(2-methyl-5-azapentalene)(2-methyl-4-phenyl-indenyl)zirconiumdichloride,
A-(2-methyl-6-azapentalene)(2-methyl-4-phenyl-indenyl)zirconiumdichloride,
A-(2-methyl-N-phenyl-4-azapentalene)(2-methyl-4-phenyl-indenyl)zirconiumdichloride,
A-(2-methyl-N-phenyl-5-azapentalene)(2-methyl-4-phenyl-indenyl)zirconiumdichloride,
A-(2-methyl-4-thiapentalene)(2-methyl-4-phenyl-indenyl)zirconiumdichloride,
A-(2-methyl-5-thiapentalene)(2-methyl-4-phenyl-indenyl)zirconiumdichloride,
A-(2-methyl-6-thiapentalene)(2-methyl-4-phenyl-indenyl)zirconiumdichloride,
A-(2-methyl-4-oxapentalene)(2-methyl-4-phenyl-indenyl)zirconiumdichloride,
A-(2-methyl-4-azapentalene)(2-methyl-4,5-benzo-indenyl)zirconiumdichloride,
A-(2-methyl-N-phenyl-4-azapentalene)(2-methyl-4,5-benzo-indenyl)zirconiumdichloride,
A-(2-methyl-N-phenyl-5-azapentalene)(2-methyl-4,5-benzo-indenyl)zirconiumdichloride,
A-(2-methyl-N-phenyl-6-azapentalene)(2-methyl-4,5-benzo-indenyl)zirconiumdichloride,
A-(2-methyl-4-thiapentalene)(2-methyl-4,5-benzo-indenyl)zirconiumdichloride,
A-(2-methyl-5-thiapentalene)(2-methyl-4,5-benzo-indenyl)zirconiumdichloride,
A-(2-methyl-6-thiapentalene)(2-methyl-4,5-benzo-indenyl)zirconiumdichloride,
A-(2-methyl-4-oxapentalene)(2-methyl-4,5-benzo-indenyl)zirconiumdichloride,
A-(2-methyl-5-oxapentalene)(2-methyl-4,5-benzo-indenyl)zirconiumdichloride,
A-(2-methyl-6-oxapentalene)(2-methyl-4,5-benzo-indenyl)zirconiumdichloride,
A-bis(2-methyl-4-azapentalene)zirconiumdichloride,
A-bis(2-methyl-N-phenyl-4-azapentalene)zirconiumdichloride, and
A-bis(2-methyl-4-thiapentalene)zirconiumdichloride,
wherein A is Dimethylsilanediyl, Diethylsilanediyl, Dipropylsilanediyl, Dibutylsilanediyl, Dipentylsilanediyl, Dihexylsilanediyl, Diheptylsilanediyl, Dioctylsilanediyl, Dinonanylsilanediyl, Didecanylsilanediyl, Diundecanylsilanediyl, Didodecanylsilanediyl, Dimethylgermanediyl, Diethylgermanediyl, Dipropylgermanediyl, Dibutylgermanediyl, Dipentylgermanediyl, Dihexylgermanediyl, Diheptylgermanediyl, Dioctylgermanediyl, Dinonanylgermanediyl, Didecanylgermanediyl, Diundecanylgermanediyl or Didodecanylgermanediyl, Hexyl(methyl)germanediyl, Ethyl(methyl)germanediyl, Ethyl(methyl)silanediyl, Propyl(methyl)silanediyl, 3,3,3-trifluoropropyl(methyl)silanediyl, Propyl(ethyl)silanediyl, Butyl(methyl)silanediyl, Butyl(ethyl)silanediyl, Butyl(propyl)silanediyl, Pentyl(methyl)silanediyl, Pentyl(ethyl)silanediyl, Pentyl(propyl)silanediyl, Pentyl(butyl)silanediyl, Hexyl(methyl)silanediyl, Hexyl(ethyl)silanediyl or Hexyl(propyl)silanediyl, Hexyl(butyl)silanediyl or Hexyl(pentyl)silanediyl, including all structural isomers.

61. The process of claim 1 wherein the contacting step (c) is performed in combination with a Lewis acid compound having the formula $M^2X^1X^2X^3$ wherein $M^2$ is selected from boron, aluminum or gallium, and $X^1$, $X^2$ and $X^3$ are the same or different and are each individually hydrogen, an alkyl group of from 1 to about 20 carbon atoms, an aryl group of from 6 to about 15 carbon atoms, or an alkaryl, aralkyl, halo-alkyl or haloaryl group having 1 to about 10 carbon atoms in the alkyl radical and from 6 to about 20 carbon atoms in the aryl radical, wherein the halogen component can be fluorine, chlorine, bromine or iodine.

62. The process of claim 1 wherein the contacting step (c) is performed in combination with a Lewis acid selected from the group consisting of trimethylaluminium, triethylaluminum, triisobutylaluminum, iisobutylaluminum hydride, tributylaluminum, trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris (3,5-dimethyl-phenyl)borane, tris(3,5-difluorophenyl)borane and tris(3,4,5-trifluorophenyl)borane.

63. The process of claim 1 wherein the contacting step (c) is performed in combination with an ionic compound which comprises a non-coordinating anion selected from the group consisting of tetrakis (pentafluorophenyl) borate, tetraphenylborate, $SbF_6^-$, $CF_3SO_3^-$ and $ClO_4^-$.

64. A process for preparing a supported catalyst system comprising the steps:
   a) contacting a support material with a first composition, said first composition comprising a first portion of at least one aluminoxane or mixtures thereof in a first solvent, wherein the first composition contains at least about 5 mmoles of aluminoxane per gram of the support material, at a temperature of about 10° C. to 30° C. followed by keeping the mixture at about 20° C. for 0 to 12 hours, subsequently heating the resulting mixture to a temperature of 30° C. to 200° C. and keeping the mixture at 30° C. to 200° C. for 30 minutes to 20 hours, optionally followed by removing all or part of the first solvent and/or optionally followed by one or more washing step(s) using a solvent to provide an aluminoxane loaded support material;
   b) suspending and/or dissolving, respectively, at least one metallocene and a second portion of an aluminoxane or of a mixture of aluminoxanes, which may or may not be the same as the first portion of the at least one aluminoxane or of a mixture thereof, or of an ionic compound and/or a Lewis acid in a second solvent, which may or may not be the same as the first solvent, or suspension medium at a temperature of 0 to 100° C., optionally followed by a preactivation time of 1 minute to 200 hours at a temperature of 10 to 100° to provide an impregnation solution;
   c) applying the impregnation solution prepared in step (b) to the aluminoxane loaded support material produced in step (a), at a temperature of 10 to 100° C. and a contact time of 1 minute to 24 hours to provide a supported catalyst;
   d) removing the major part of the solvent from the supported catalyst and optionally washing the supported catalyst with a suitable solvent;
   e) isolating the supported catalyst; and,
   f) optionally prepolymerizing the resulting supported catalyst with one or more olefinic monomer(s), to obtain a prepolymerized supported catalyst system.

65. A process for preparing a supported catalyst system comprising the steps:
   a) contacting a support material with a first composition which includes at least 5 mmol of an aluminoxane or of a mixture of aluminoxanes per g support material in a first solvent at a temperature of about 20° C. followed by keeping the mixture at about 20° C. for 0.15 to 2 hours, subsequently heating the resulting mixture to a temperature of 50° C. to 160° C. and keeping the mixture at 50° C. to 160° C. for 1 to 6 hours, optionally followed by removing all or part of the first solvent and/or optionally followed by one or more washing step(s) using a solvent to provide an aluminoxane loaded support material;
   b) suspending and/or dissolving, respectively, at least one metallocene and at least 0.5 mmole of a second portion of an aluminoxane or of a mixture of aluminoxanes per g support material in a second solvent or suspension medium, where the metallocene is used in an amount of at least 0.1 mol% of the total amount of aluminoxane or mixture of aluminoxane per g support material, at a temperature of 20 to 50° C., optionally followed by a preactivation time of 1 minute to 200 hours at a temperature of 20 to 30° to provide an impregnation solution,
   c) applying the impregnation solution prepared in step (b) to the aluminoxane loaded support material produced in step (a), at a temperature of 10° C. to 100° C. and a contact time of 1 minute to 24 hours to provide a supported catalyst;
   d) removing the major part of the solvent from the supported catalyst;
   e) optionally washing the supported catalyst with a suitable solvent, and/or drying the supported catalyst at temperatures of 30° C. to 60° C.; and,
   f) optionally prepolymerizing the supported catalyst with one or more olefinic monomer(s), to obtain a prepolymerized supported catalyst system.

66. A process for preparing a supported catalyst system comprising the steps:
   a) contacting an optionally thermally pretreated silica support material with at least 10 mmol of an aluminoxane per g support material in a suitable solvent such as toluene at a temperature of about 20° C. followed by subsequently heating the resulting mixture to a temperature of 80° C. to 140° C. and keeping the mixture at 80° C. to 140° C. for 1 to 6 hours, optionally followed by removing all or part of the suitable solvent such as toluene, and/or optionally followed by one or more washing step(s) using a solvent to provide an aluminoxane loaded support material;
   b) suspending and/or dissolving, respectively, at least one metallocene and at least 0.5 mmole of a second portion of an aluminoxane per g support material in toluene, where the metallocene is used in an amount of at least 0.1 mol% of the total amount of aluminoxane or mixture of aluminoxane per g support material, at a temperature of 20 to 50° C., optionally followed by a preactivation time of 1 minute to 200 hours at a temperature of 20 to 30° to provide an impregnation fluid,
   c) applying the impregnation fluid prepared in step (b) to the aluminoxane loaded support material produced in step (a), at a temperature of 10 to 100° C. and a contact time of 1 minute to 24 hours to provide a supported catalyst;
   d) removing the major part of the toluene from the supported catalyst;
   e) optionally washing the supported catalyst with a suitable solvent, and/or drying the supported catalyst at temperatures of 30° C. to 60° C.; and,
   f) optionally prepolymerizing the supported catalyst with one or more olefinic monomer(s), to obtain a prepolymerized supported catalyst system.

67. A process for preparing a supported catalyst system comprising the steps:
   a) contacting an optionally thermally pretreated silica support material with a weight loss on dryness of 0.5 wt.% or less and a weight loss on ignition of 1.0 wt.% or greater with a first composition which includes at least 10 mmol of methylaluminoxane per gram support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a solvent to provide an aluminoxane loaded support material;

b) Suspending and/or dissolving, respectively, at least one metallocene and at least 1 mmole of a second portion of methylaluminoxane per g support material in toluene, where the metallocene is used in an amount of at least 0.1 mol% of the total amount of aluminoxane per g support material, at a temperature of 20 to 50° C., optionally followed by a preactivation time of 1 minute to 200 hours at a temperature of 20 to 30° to provide an impregnation fluid;

c) applying the impregnation fluid prepared in step (b) to the methylaluminoxane loaded support material produced in step (a), by passing the impregnation fluid through the methylaluminoxane loaded support material in a direct flow or by using an incipient wetness impregnation technique, where the volume of the impregnation fluid or the total liquid volume used in the impregnation step, respectively, does not exceed 250% of total pore volume of the support material, at a temperature of 10° C. to 100° C. and a contact time of 1 minute to 24 hours to provide a supported catalyst;

d) removing the major part of the toluene from the supported catalyst;

e) optionally washing the supported catalyst with a suitable solvent, and/or drying the resulting supported catalyst at temperatures of 30° C. to 60° C.; and, f) optionally prepolymerizing the resulting supported catalyst with one or more olefinic monomer(s), to obtain a prepolymerized supported catalyst system.

68. A process for preparing a supported catalyst system comprising the steps:

a) contacting an optionally thermally pretreated silica support material with a weight loss on dryness of 0.3 wt.% or less and a weight loss on ignition between 1.5 and 3.5 wt.%, with at least 10 mmol of methylaluminoxane per gram support material in toluene at a temperature of about 20° C. followed by subsequently heating the resulting mixture to a temperature of 110° C. and keeping the mixture at 110° C. for 1 to 6 hours, optionally followed by removing all or part of the toluene, and/or optionally followed by one or more washing step(s) using a solvent to provide an aluminoxane loaded support material;

b) suspending and/or dissolving, respectively, at least one metallocene and at least 1 mmole of a second portion of methylaluminoxane per g support material in toluene, where the metallocene is used in an amount of at least 0.1 mol% of the total amount of aluminoxane per g support material, at a temperature of 20 to 50° C., optionally followed by a preactivation time of 1 minute to 200 hours at a temperature of 20 to 30° C. to provide an impregnation fluid;

c) applying the impregnation fluid prepared in step (b) to the methylaluminoxane loaded support material produced in step (a), by passing the impregnation fluid through the aluminoxane loaded support material in a direct flow or by using an incipient wetness impregnation technique, where the volume of the impregnation suspension or solution or the total liquid volume used in the impregnation step, respectively, does not exceed 250% of the total pore volume of the support material, at a temperature of 10° C. to 100° C. and a contact time of 1 minute to 24 hours to provide a supported catalyst;

d) removing the major part of the toluene from the supported catalyst;

e) optionally washing the supported catalyst with a suitable solvent, and/or drying the supported catalyst at a temperature of from about 30° C. to 60° C.; and, f) optionally prepolymerizing the supported catalyst with one or more olefinic monomer(s), to obtain a prepolymerized supported catalyst system.

69. A process for the polymerization of olefins comprising:

a) preparing a catalyst system in accordance with the process of claim 1; and, b) contacting one or more olefins each having from about 2 to about 20 carbon atoms under polymerization reaction conditions with the catalyst system prepared in accordance with the process of claim 1.

70. The process of claim 69 wherein at least one olefin is a 1-olefin.

71. The process of claim 69 wherein at least one olefin has the formula $$R'''\!\!-\!\!CH\!\!=\!\!CH\!\!-\!\!R''$$

wherein $R'''$ and $R''$ can be identical or different and are each individually a hydrogen atom or a radical having from 1 to about 20 carbon atoms or $R'''$ and $R''$ together can form one or more rings.

72. The process of claim 69 wherein the olefins include ethylene and one or more 1-olefins having from 4 to about 20 carbon atoms.

73. The process of claim 69 wherein the olefins include propylene.

74. The process of claim 69 wherein the olefins include propylene and ethylene.

75. The process of claim 4 wherein the support material is treated to acheive a loss on dryness of about 0.3% or less before performing step a).

76. The process of claim 64 wherein the support material is treated to achieve a loss on dryness of less than 0.5% before performing step (a).

77. The process of claim 65 wherein the support material is treated to achieve a loss on dryness of less than 0.5% before performing step (a).

78. The process of claim 66 wherein the support material is treated to achieve a loss on dryness of less than 0.5% before performing step (a).

* * * * *